US012227253B2

(12) United States Patent
Kramer et al.

(10) Patent No.: US 12,227,253 B2
(45) Date of Patent: Feb. 18, 2025

(54) TWO-WHEELED VEHICLE WITH FAIRING COUPLED TO DOWN TUBE ASSEMBLY

(71) Applicant: Indian Motorcycle International, LLC, Medina, MN (US)

(72) Inventors: Tyler J. Kramer, St. Paul, MN (US); Jeffrey D. Oltmans, North Branch, MN (US); Andrew O. Glaeser, Forest Lake, MN (US); Juho Pekka Wuollet, East Bethel, MN (US); Kent A. Underland, Willmar, MN (US); Cal W. Johnson, Gem Lake, MN (US); Ronald A. Vorndran, Osceola, WI (US); G. Jay McKoskey, Forest Lake, MN (US); Jeffrey M. O'Halloran, Lindstrom, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 657 days.

(21) Appl. No.: 17/440,464

(22) PCT Filed: Mar. 17, 2020

(86) PCT No.: PCT/US2020/023159
§ 371 (c)(1),
(2) Date: Sep. 17, 2021

(87) PCT Pub. No.: WO2020/197857
PCT Pub. Date: Oct. 1, 2020

(65) Prior Publication Data
US 2022/0161884 A1 May 26, 2022

Related U.S. Application Data

(60) Provisional application No. 62/822,435, filed on Mar. 22, 2019.

(51) Int. Cl.
*B62J 17/02* (2006.01)
*B62J 17/04* (2006.01)
(Continued)

(52) U.S. Cl.
CPC ............... *B62J 41/00* (2020.02); *B62J 17/02* (2013.01); *B62J 17/04* (2013.01); *B62J 17/10* (2020.02);
(Continued)

(58) Field of Classification Search
CPC .......... B62J 17/02; B62J 17/04; B62K 11/02; B62K 11/04
See application file for complete search history.

(56) References Cited

U.S. PATENT DOCUMENTS 4,331,344 A * 5/1982 Vetter ...................... B62J 17/02
 280/270
4,423,901 A * 1/1984 Shumard .................. B62J 17/00
 296/78.1
(Continued)

FOREIGN PATENT DOCUMENTS

CA 2532624 A1 11/2006
CA 2890734 A1 5/2014
(Continued)

OTHER PUBLICATIONS

Machine translation of JP 3125318, published Jan. 15, 2001 to Suzuki Motor Co. (Year: 2001).*
(Continued)

*Primary Examiner* — Daniel J Colilla
(74) *Attorney, Agent, or Firm* — Faegre Drinker Biddle & Reath LLP

(57) ABSTRACT

A two-wheeled vehicle includes a frame, a plurality of ground-engaging members for supporting the frame, and an engine supported by the frame and operably coupled to the
(Continued)

ground-engaging members. Additionally, the two-wheel vehicle includes a down tube extending downwardly from a front end of the frame. A front fairing is supported on the down tube.

5 Claims, 78 Drawing Sheets

(51) Int. Cl.
    *B62J 17/10* (2020.01)
    *B62J 41/00* (2020.01)
    *B62J 50/22* (2020.01)
    *B62K 11/04* (2006.01)
    *F01N 1/02* (2006.01)
    *F02M 25/06* (2016.01)

(52) U.S. Cl.
CPC ............... *B62J 50/22* (2020.02); *B62K 11/04* (2013.01); *F01N 1/02* (2013.01); *F02M 25/06* (2013.01)

(56) References Cited

U.S. PATENT DOCUMENTS

| | | |
|---|---|---|
| 4,709,774 A | 12/1987 | Saito |
| 5,046,554 A | 9/1991 | Iwasaki et al. |
| D389,794 S | 1/1998 | Davidson |
| D426,174 S | 6/2000 | Sofue et al. |
| D444,419 S | 7/2001 | Kamata et al. |
| D465,493 S | 11/2002 | Hervig et al. |
| D509,638 S | 9/2005 | Moritz et al. |
| D512,951 S | 12/2005 | Alsop |
| D521,163 S | 5/2006 | Song |
| D521,417 S | 5/2006 | Stahel et al. |
| D541,195 S | 4/2007 | Bracy et al. |
| D567,715 S | 4/2008 | Brew et al. |
| D600,373 S | 9/2009 | Brew et al. |
| D600,374 S | 9/2009 | Brew et al. |
| D618,596 S | 6/2010 | Song |
| D624,853 S | 10/2010 | Song et al. |
| 7,883,136 B2 | 2/2011 | Tomolillo |
| D656,068 S | 3/2012 | Song et al. |
| D656,867 S | 4/2012 | Uemoto et al. |
| D683,270 S | 5/2013 | Song |
| D683,271 S | 5/2013 | Song |
| D716,702 S | 11/2014 | Song et al. |
| D722,538 S | 2/2015 | Song et al. |
| D732,436 S | 6/2015 | Christoph et al. |
| D737,192 S | 8/2015 | Yaffe |
| D744,906 S | 12/2015 | Song et al. |
| D789,275 S | 6/2017 | Richie |
| D802,486 S | 11/2017 | Mugikura |
| D808,867 S | 1/2018 | Chui et al. |
| D906,182 S | 12/2020 | Song et al. |
| D911,879 S | 3/2021 | Christoph et al. |
| D971,793 S | 12/2022 | Dunn et al. |
| 2009/0206628 A1 | 8/2009 | Misaki |
| 2014/0131128 A1 | 5/2014 | Schuhmacher |
| 2014/0131129 A1 | 5/2014 | Galsworthy |
| 2015/0130209 A1 | 5/2015 | Hamlin et al. |
| 2016/0244116 A1 | 8/2016 | Komatsu et al. |
| 2017/0183059 A1 | 6/2017 | Yamamoto |
| 2019/0061511 A1 | 2/2019 | Kinoshita et al. |
| 2019/0063301 A1 | 2/2019 | Morotomi et al. |

FOREIGN PATENT DOCUMENTS

| | | | |
|---|---|---|---|
| CN | 1376606 A | | 10/2002 |
| CN | 102431616 A | | 5/2012 |
| CN | 105143028 B | | 2/2018 |
| JP | 53-149349 U | | 11/1978 |
| JP | S5757178 | | 4/1982 |
| JP | 6055526 | | 4/1985 |
| JP | 61226385 A | * | 10/1986 |
| JP | S6357384 | | 3/1988 |
| JP | H08230740 | | 9/1996 |
| JP | 3125318 | | 1/2001 |
| JP | 2016-068844 A | | 5/2016 |
| JP | 2017-119478 A | | 7/2017 |
| JP | 2017-141678 A | | 8/2017 |
| JP | 2019-038290 A | | 3/2019 |
| WO | 2008/088809 A2 | | 7/2008 |

OTHER PUBLICATIONS

Invitation to Pay Additional Fees received for PCT Patent Application No. PCT/US2020/023159, mailed on Jun. 26, 2020, 14 pages.
International Search Report and Written Opinion issued by the International Searching Authority, dated Sep. 23, 2020, for International Patent Application No. PCT/US2020/023159; 21 pages.
International Preliminary Report on Patentability issued by the International Preliminary Examining Authority, dated Jun. 10, 2021, for International Patent Application No. PCT/US2020/023159; 31 pages.
Zig Wheels, Indian Chieftain Dark Horse—Road Test Review, posted Apr. 25, 2017, [online], [visited Jun. 21, 2021], Internet, <URL:https://www.zigwheels.com/reviews-advice/reviews/indian-chieftain-dark-horse-road-test-review/27856/> (Year: 2017).
Zig Wheels, Three New Indian Bikes Confirmed in Leaked Document, posted May 4, 2019, [online], [visited Jun. 21, 2021], Internet, <URL: https://www.zigwheels.com/news-features/news/new-1770cc-indian-motorcycles-bagger-to-be-called-raptor-leaked-doc-reveals-more-details/33735/> (Year: 2019).

* cited by examiner

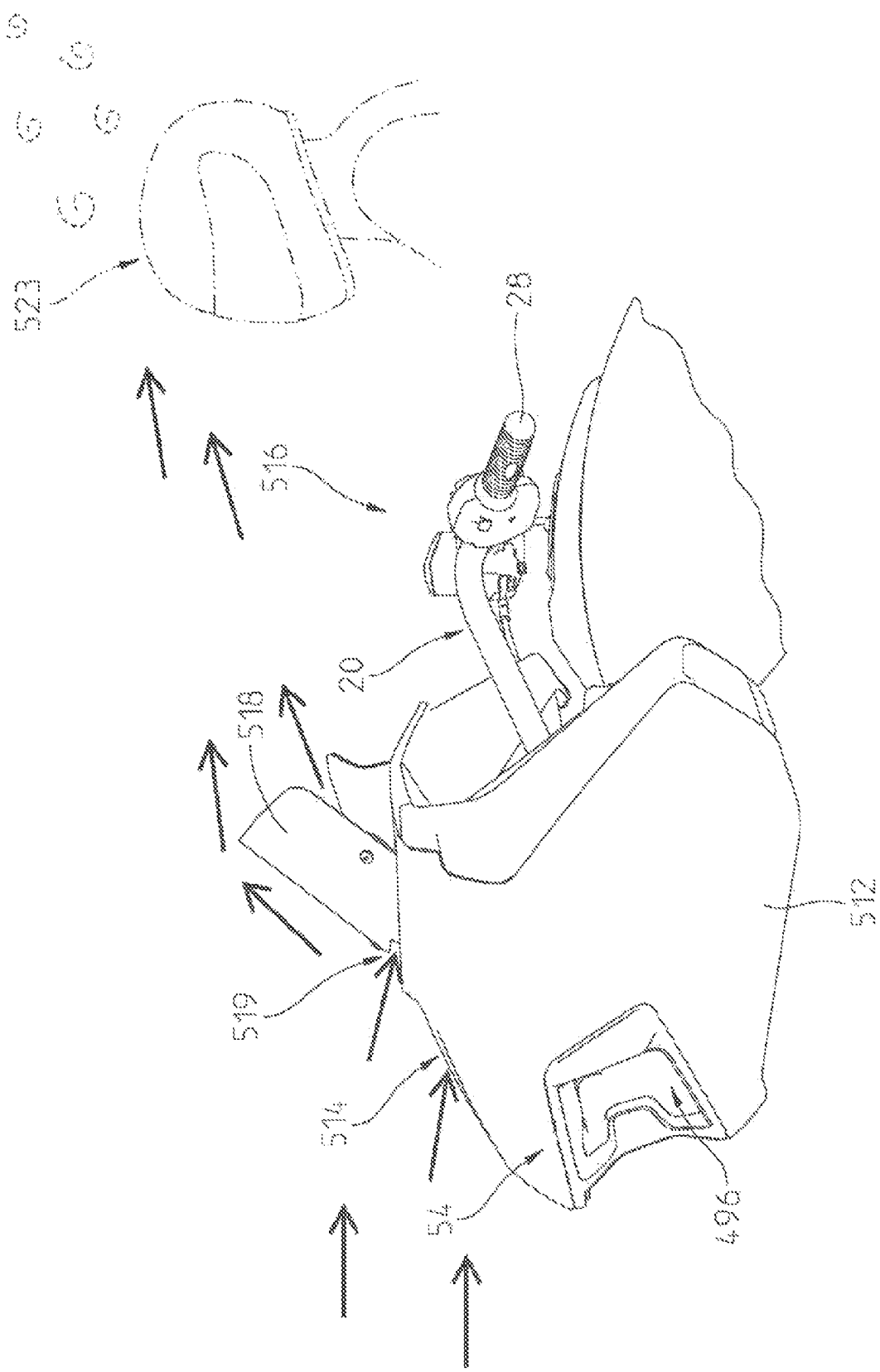

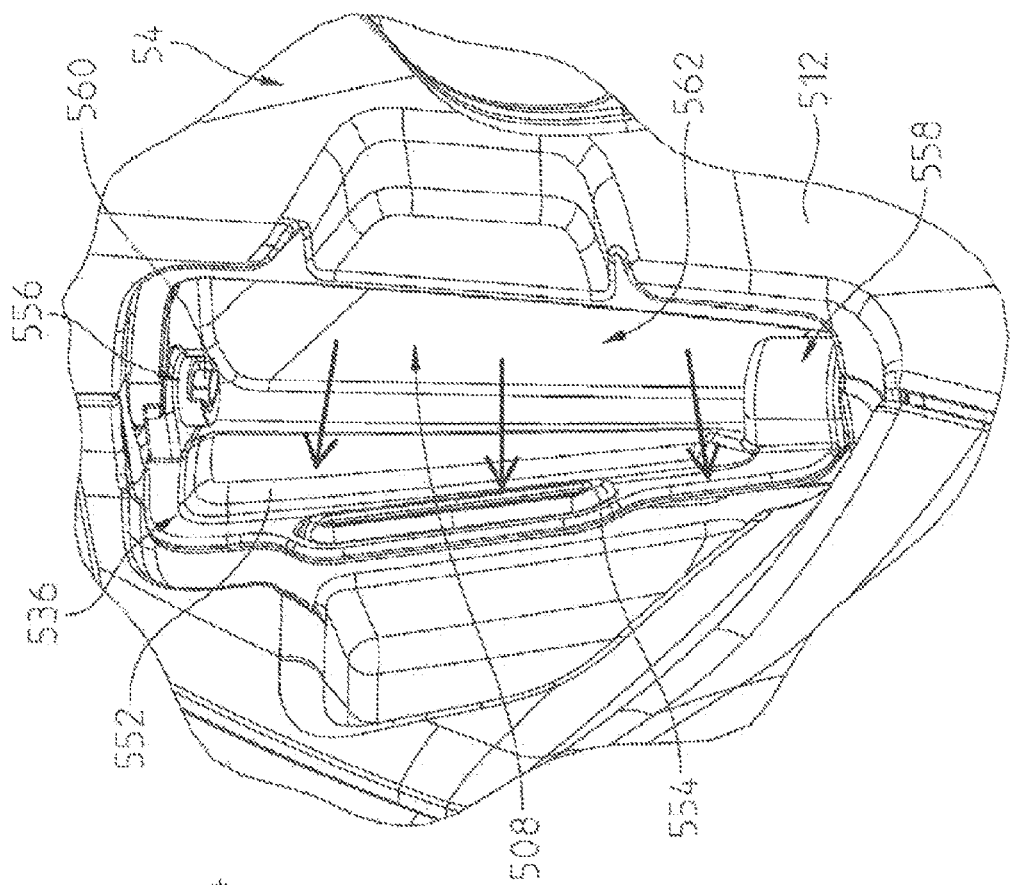
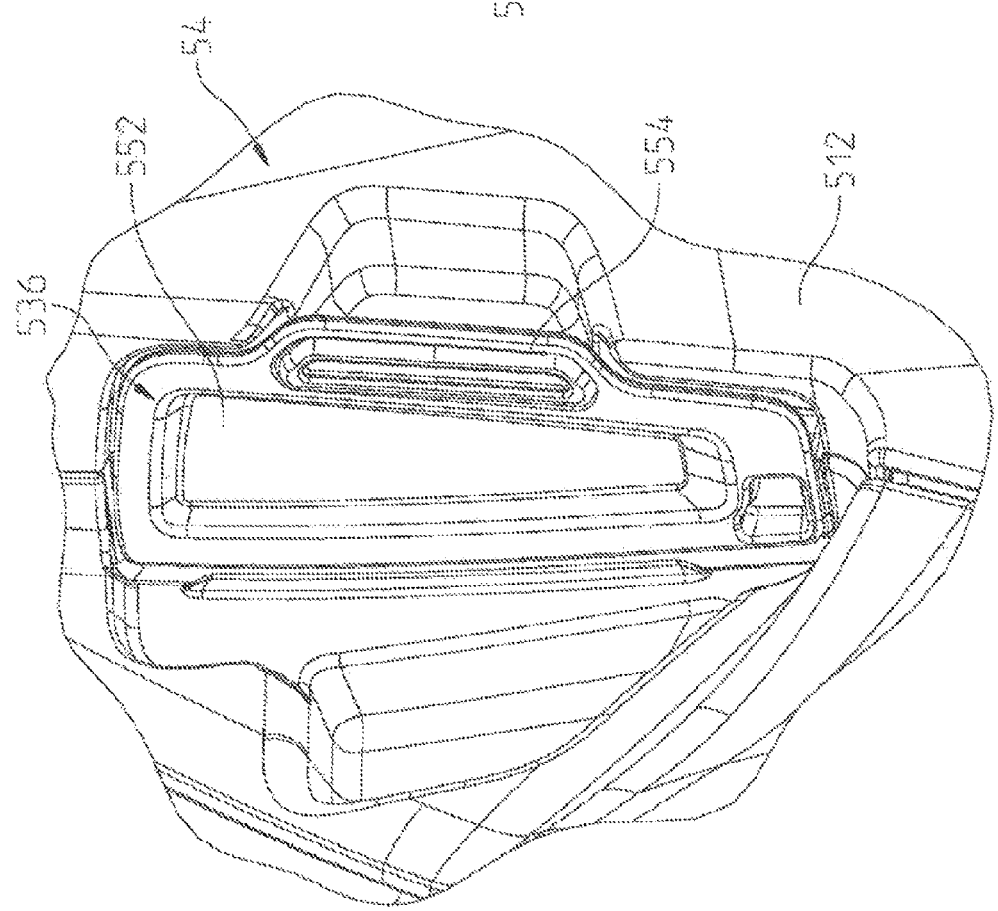

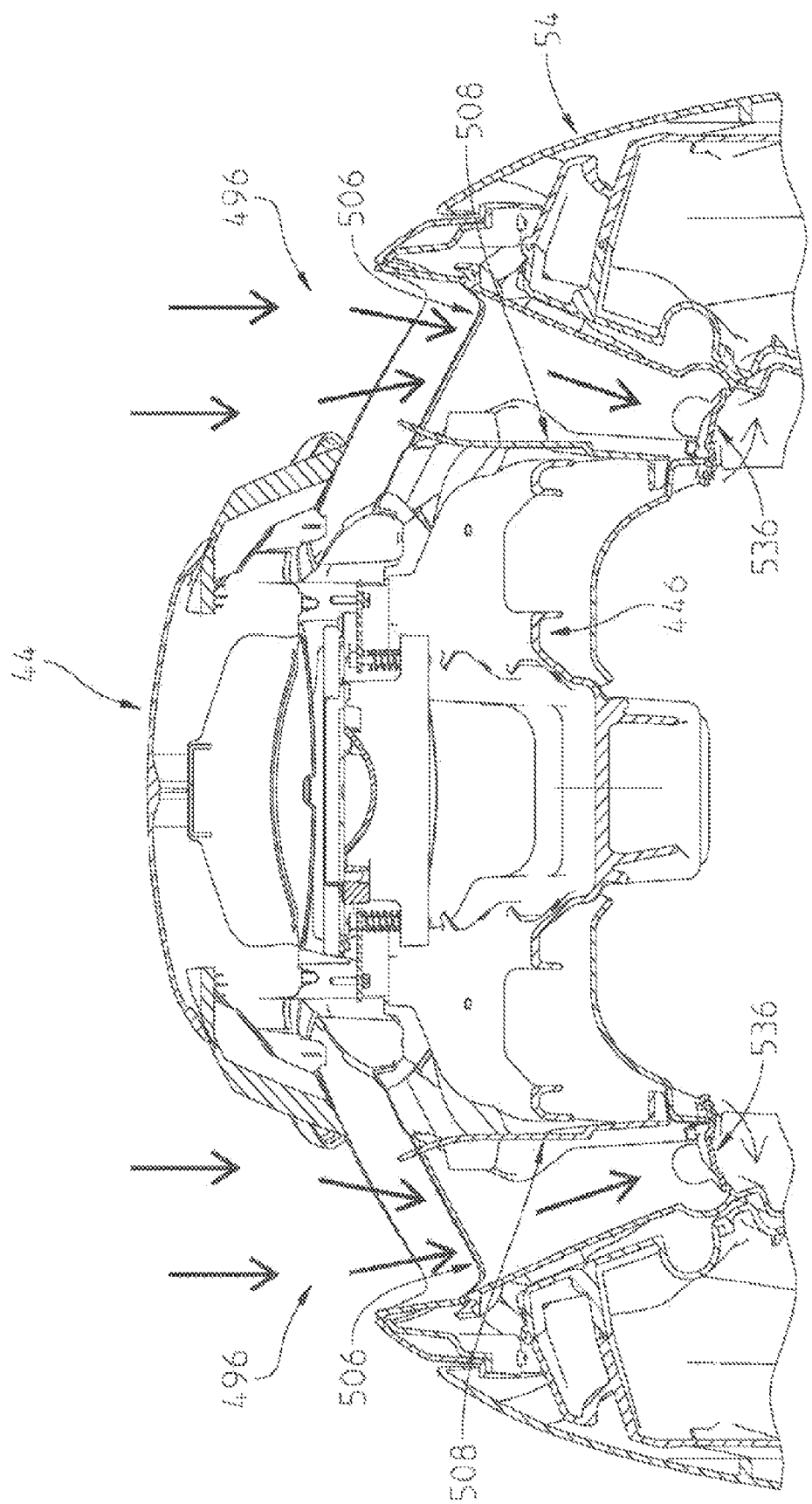

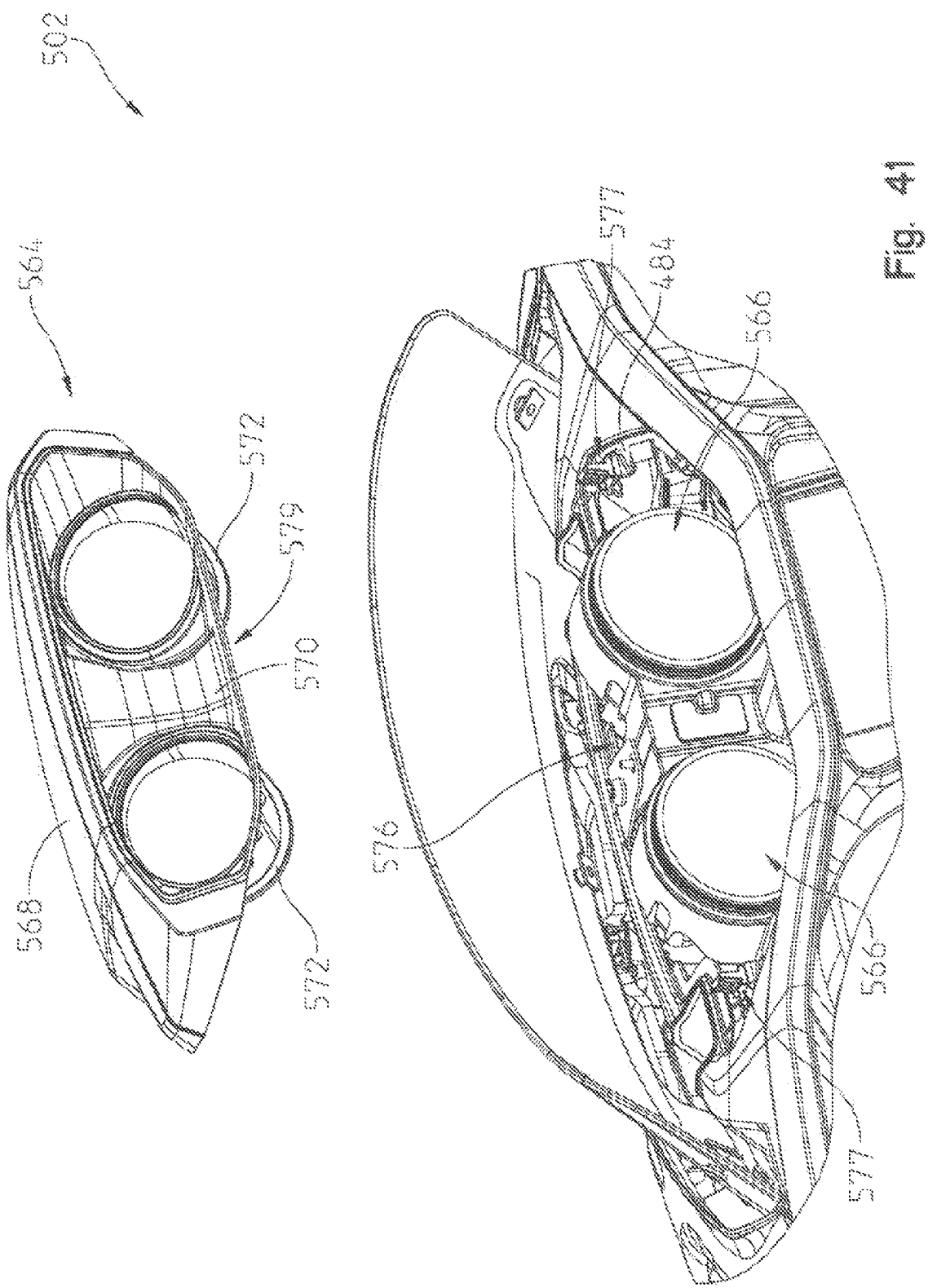

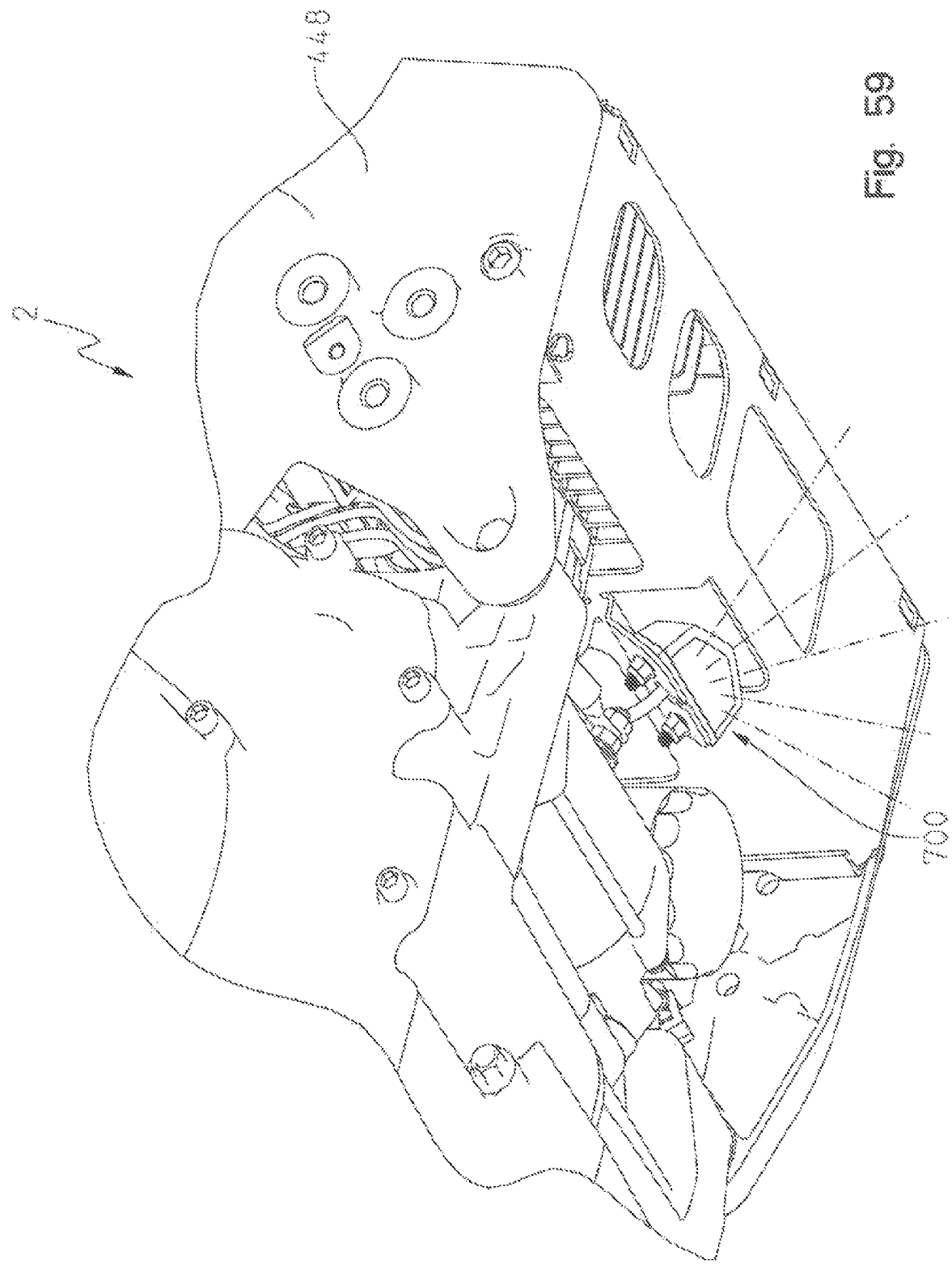

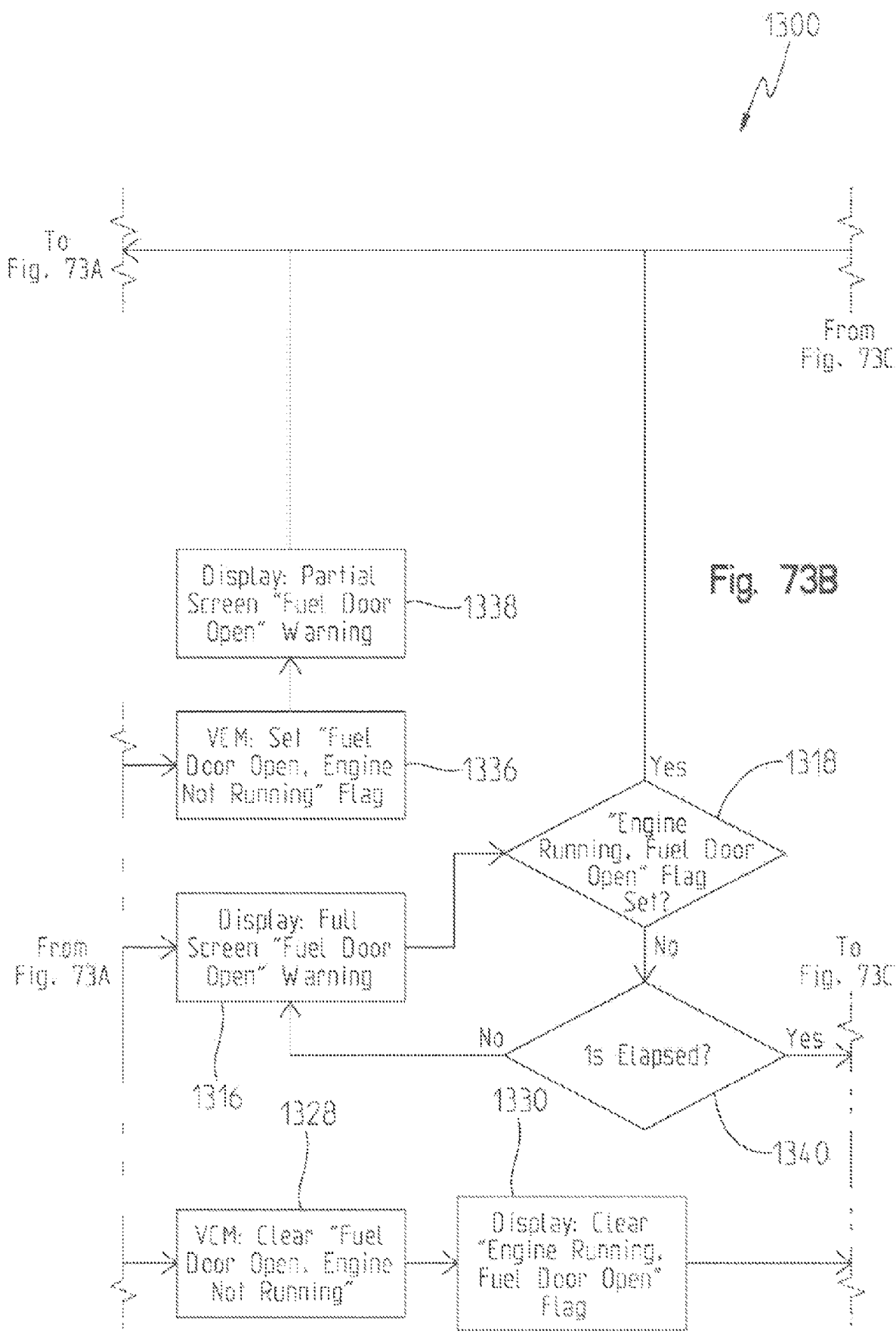

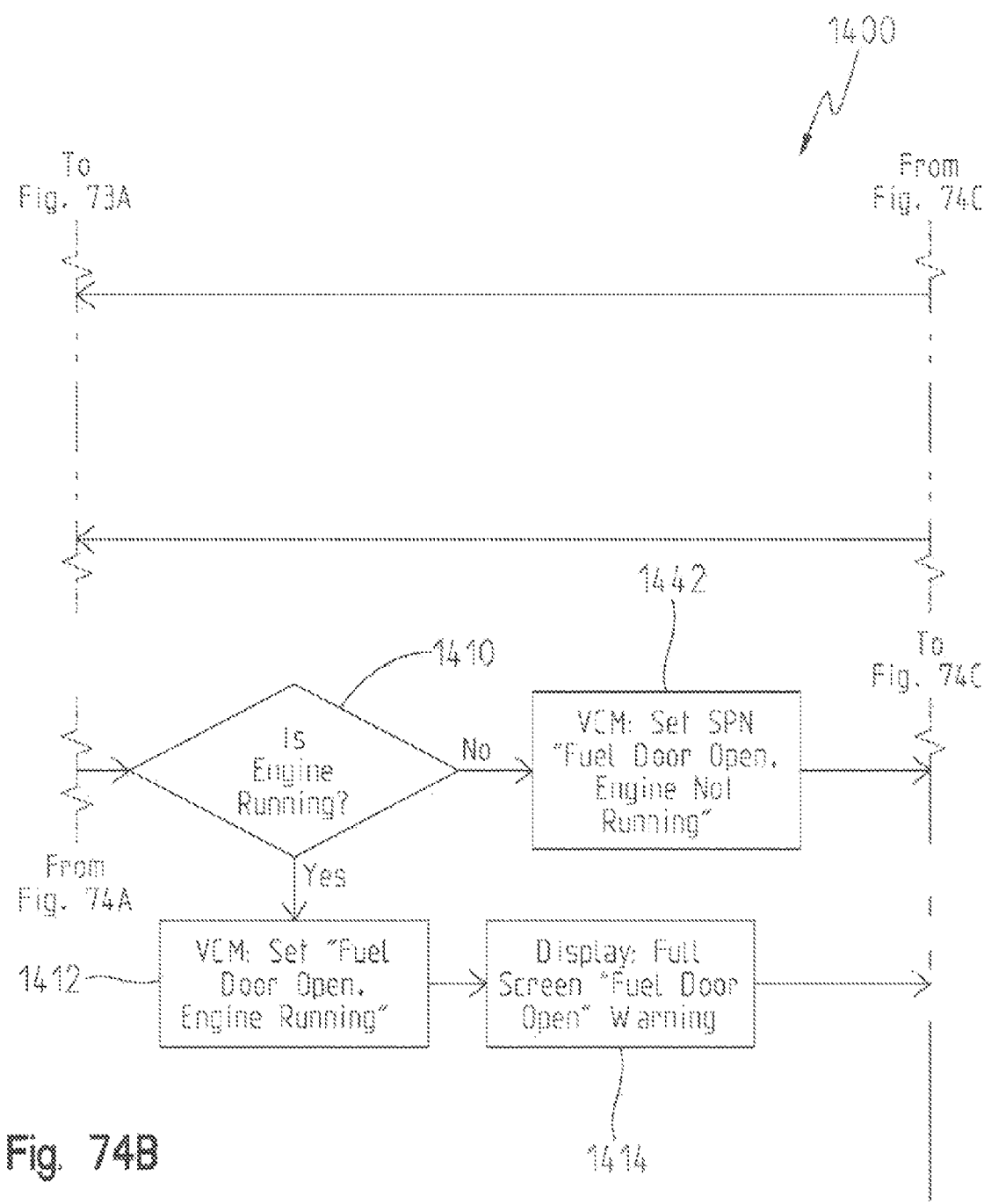
Fig. 74B
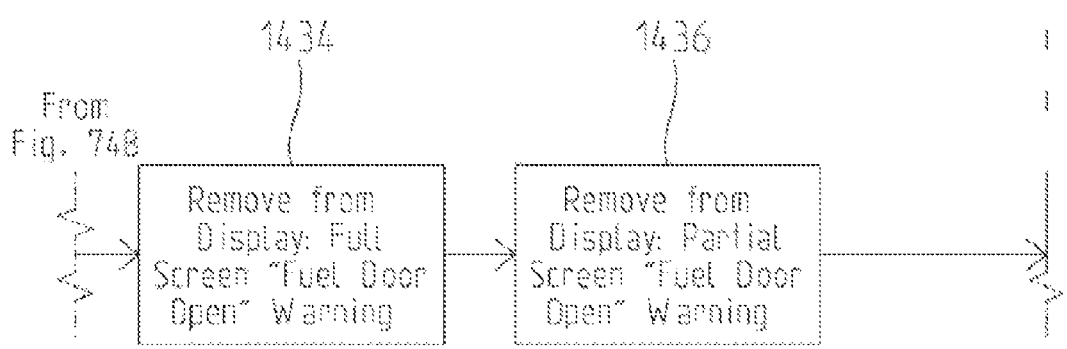

TWO-WHEELED VEHICLE WITH FAIRING COUPLED TO DOWN TUBE ASSEMBLY

CROSS-REFERENCE TO RELATED APPLICATIONS

The present application is a national stage entry of International (PCT) Patent Application Number PCT/US2020/023159, filed Mar. 17, 2020, which in turn claims the benefit of U.S. Provisional Application No. 62/822,435, filed Mar. 22, 2019, titled TWO-WHEELED VEHICLE, which was co-filed with U.S. Design application Ser. No. 29/684,633, the complete disclosures of which are all expressly incorporated by reference herein.

FIELD OF THE DISCLOSURE

The present disclosure relates to a two-wheel vehicle and, more particularly, to a motorcycle having accessories, such as a windshield and a cargo area, for increased comfort of the rider.

BACKGROUND

Conventional two-wheeled vehicles include a frame for supporting an operator. The frame may also support a passenger rearward of the driver. An engine is typically positioned below the driver and is coupled to the frame. The front of the vehicle may include a fairing positioned forward of the driver and supported by the frame or the front triple clamps of the vehicle. Additionally, the vehicle may include cargo and infotainment feature for additional comfort and convenience for the rider. The rear of the vehicle may include a cargo area, for example saddlebags, extending laterally outward from the frame.

SUMMARY OF THE DISCLOSURE

According to an illustrative embodiment of the present disclosure, a two-wheeled vehicle is providing comprising a frame assembly extending longitudinally from a front end to a second end. The frame assembly includes a forward frame member and a down tube assembly coupled to the forward frame member. The two-wheeled vehicle further comprises a plurality of ground-engaging members supporting the frame assembly on a ground surface and a fairing coupled to the forward frame member and the down tube assembly.

In an example thereof, the two-wheeled vehicle further comprises a bracket coupled to the down tube assembly and the fairing. In a variation thereof, the two-wheeled vehicle further comprises a steering assembly, the forward frame member includes a head tube configured to receive a portion of the steering assembly, and the bracket extends from a position longitudinally forward of the head tube to a position longitudinally rearward of the head tube. In another variation thereof, the fairing comprising an outer fairing member and an inner fairing member, and the bracket is coupled to the inner fairing member. In a further variation thereof the bracket includes a generally vertical leg coupled to the down tube assembly and a generally horizontal leg coupled to the inner fairing ember. In yet another variation thereof, the down tube assembly supports a radiator.

According to another illustrative embodiment of the present disclosure, a two-wheel vehicle is provided comprising a frame, a plurality of ground-engaging members supporting the frame on a ground surface, an engine supported by the frame intermediate the plurality of intermediate ground-engaging members, and a cooling system coupled to the frame intermediate a first one of the plurality of ground engaging members and the engine. The cooling system includes a fan and a shroud surrounding at least a portion of the fan, and the shroud includes a plurality of apertures adapted to direct airflow laterally outward from the fan.

In an example thereof, the two-wheeled vehicle further comprises at least one opening adapted to direct airflow rearwardly from the fan. In another example thereof, the two-wheeled vehicle further comprises at least one opening positioned vertically below the fan and adapted to direct airflow from the fan downward. In a further example thereof, the plurality of apertures includes at least a first aperture adapted to direct airflow laterally outward in a first direction, a second aperture adapted to direct airflow in a second direction different from the first direction, and a third aperture adapted to directed airflow in a third direction different from the first and second directions. In yet a further example thereof, the shroud is configured to at least partially receive a coolant conduit.

According to a further illustrative embodiment of the present disclosure, a two-wheeled vehicle is provided comprising a frame having a main frame portion defining an air box, a plurality of ground-engaging members supporting the frame on a ground surface, an engine supported by the frame, and an air breather fluidly coupled to the engine and the main frame portion.

In an example thereof, the engine includes a valve cover, and the air breather is coupled to the valve cover. In another example thereof, the air breather cooperates with the engine and the air box to flow air from the engine upwardly into the air box and recirculate the air to the engine. In a variation thereof, the airbox includes an air filter, the air filter positioned forward of the air breather. In a further variation thereof, the air breather is coupled to the main frame portion at a lowest vertical portion of the main frame portion. In yet a further variation thereof, the air breather is configured to receive a mixture of oil and air, and the main frame portion is configured to collect oil separated from the mixture of oil and air and flow the oil into the engine through the air breather.

According to another illustrative embodiment of the present disclosure, a two-wheeled vehicle is provided comprising a frame, a plurality of ground-engaging members supporting the frame on a ground surface, an engine supported by the frame, and an exhaust system fluidly coupled to the engine. The exhaust system includes a muffler having a cylindrical housing extending from a first end to a second end and a first baffle supported within the housing proximate the first end of the cylindrical housing. The second end of the cylindrical housing includes a muffler tip.

In an example thereof, the muffler further includes an outlet pipe supported within the cylindrical housing by a second baffle, and the outlet pipe is coupled to the muffler tip. In a variation thereof, the first end and the first baffle define a first interior chamber of the cylindrical housing, and the first baffle and the second baffle define a second interior chamber of the cylindrical housing. In another variation thereof, the outlet pipe includes a plurality of radially spaced apertures, and the radially spaced apertures are located between the second baffle and the muffler tip. In another example, a length between the first end and the second end defines the length of the cylindrical housing, and the first baffle is positioned within a first half of the length of the cylindrical housing. In a variation thereof, the first baffle is positioned within a first third of the length of the cylindrical housing.

According to a further illustrative embodiment of the present disclosure, a two-wheeled vehicle is provided comprising a frame assembly including a forward frame portion and a rearward frame portion, a body assembly coupled to the frame assembly and including a fairing positioned at the forward frame portion, a plurality of ground-engaging members configured to support the frame assembly and body assembly, an operator area including a seat supported by the frame assembly, and a windshield assembly supported by the forward frame portion and positioned forward of the seat. The windshield assembly includes a windshield member having a recess and being configured to move in a generally vertical direction relative to the fairing. When the windshield member is in a first position, the recess of the windshield member cooperates with the fairing to define an air opening, and when the windshield member is in a second position, the recess of the windshield member is concealed by the fairing.

In an example thereof, the recess is defined in lowermost extent of the windshield member. In a variation thereof, a size of the air opening increases in the direction of movement of the windshield member. In another example thereof, airflow through the air opening directs air upwardly along a rear side of the windshield member. In a further example thereof, the body assembly further includes a console member positioned with the operator area, and the console member cooperates with the air opening to direct air upwardly. In a variation thereof, a front surface of the console member is angled upwardly from the air opening and a rear surface of the console member includes opening for receiving at least one of a display and a gauge.

According to another illustrative embodiment of the present disclosure, a two-wheeled vehicle is provided comprising a frame assembly including a forward frame portion and a rearward frame portion, a body assembly coupled to the frame assembly and including a fairing positioned at the forward frame portion, a plurality of ground-engaging members configured to support the frame assembly and body assembly, an operator area including a seat supported by the frame assembly, aa windshield assembly supported by the forward frame portion and positioned forward of the seat and including a windshield member, and an air vent defined by a portion of the fairing and a portion of the windshield assembly and configured to be selectively opened and closed in response to an input.

In an example thereof, the air vent is defined by a recess of the windshield member and an upper portion of the fairing. In another example thereof, the input for opening and closing the air vent is at least one of a selective operator input, a condition of the vehicle, and an ambient condition. In a further example thereof, the air vent is positioned to direct air flow into the operator area and above a head of a rider when the rider is seated in an upright position on the seat. In yet a further example thereof, a size of the air vent is defined by a position of the windshield member. In a variation thereof, the windshield member is movable in a generally vertical direction between a plurality of positions, and an uppermost position of the windshield member maximizes the size of the air vent, and a lowermost position of the windshield member closes the air vent and inhibits air flow between the windshield member and the fairing.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The above mentioned and other features of the invention, and the manner of attaining them, will become more apparent and the invention itself will be better understood by reference to the following description of embodiments of the invention taken in conjunction with the accompanying drawings:

FIG. 37 is a side view of front fairing, the windshield assembly, and an operator area, with an operator shown in phantom and diagrammatic arrows indicating a flow of air over and through the front fairing and the windshield assembly when the windshield is in the extended position;

FIG. 38 is a perspective view of an adjustable louver located at one end of an internal passageway of the front fairing and shown in a closed configuration;

FIG. 39 is a perspective view of the adjustable louvre shown in an open configuration with diagrammatic arrows indicating a flow of air through the internal passageway;

FIG. 40 is a cross-sectional view of the front fairing of FIG. 32 with diagrammatic arrows indicating a flow of air through the internal passageway of the front fairing of FIG. 39;

FIG. 41 is an exploded view of a display and a display trim member of the front fairing;

FIG. 59 is an underside perspective view of the two-wheeled vehicle of FIG. 1, shown with a puddle light illuminated;

FIG. 60 is an underside view of a clutch housing and a clutch cable coupled to a crankcase housing;

FIG. 72 is a schematic diagram of a fourth operational process for unlocking the fuel door when the ignition on;

FIGS. 73A-73C are a schematic diagram of a fifth operational process for locking the fuel door when the ignition is on; and FIGS. 74A-74C are schematic diagram of a sixth operational process of the unlock system of FIG. 69, wherein an ignition of the two-wheeled vehicle is on, the unlock system is operating at normal system functionality, and an operator turns on an engine of the two-wheeled vehicle of FIG. 1.

Figure 1:
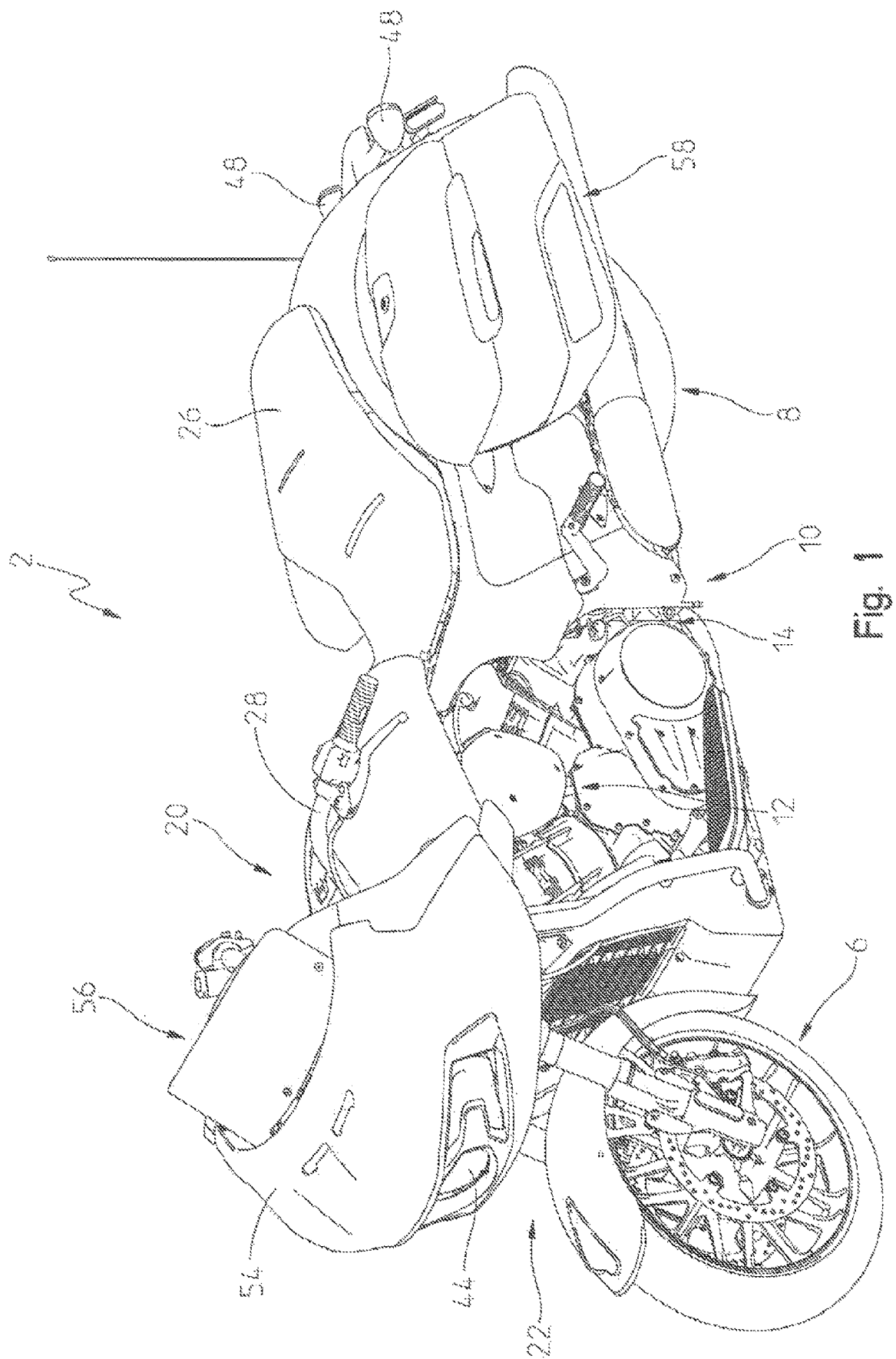
FIG. 1 is a left front perspective view of an illustrative two-wheeled vehicle.
Figure 2:
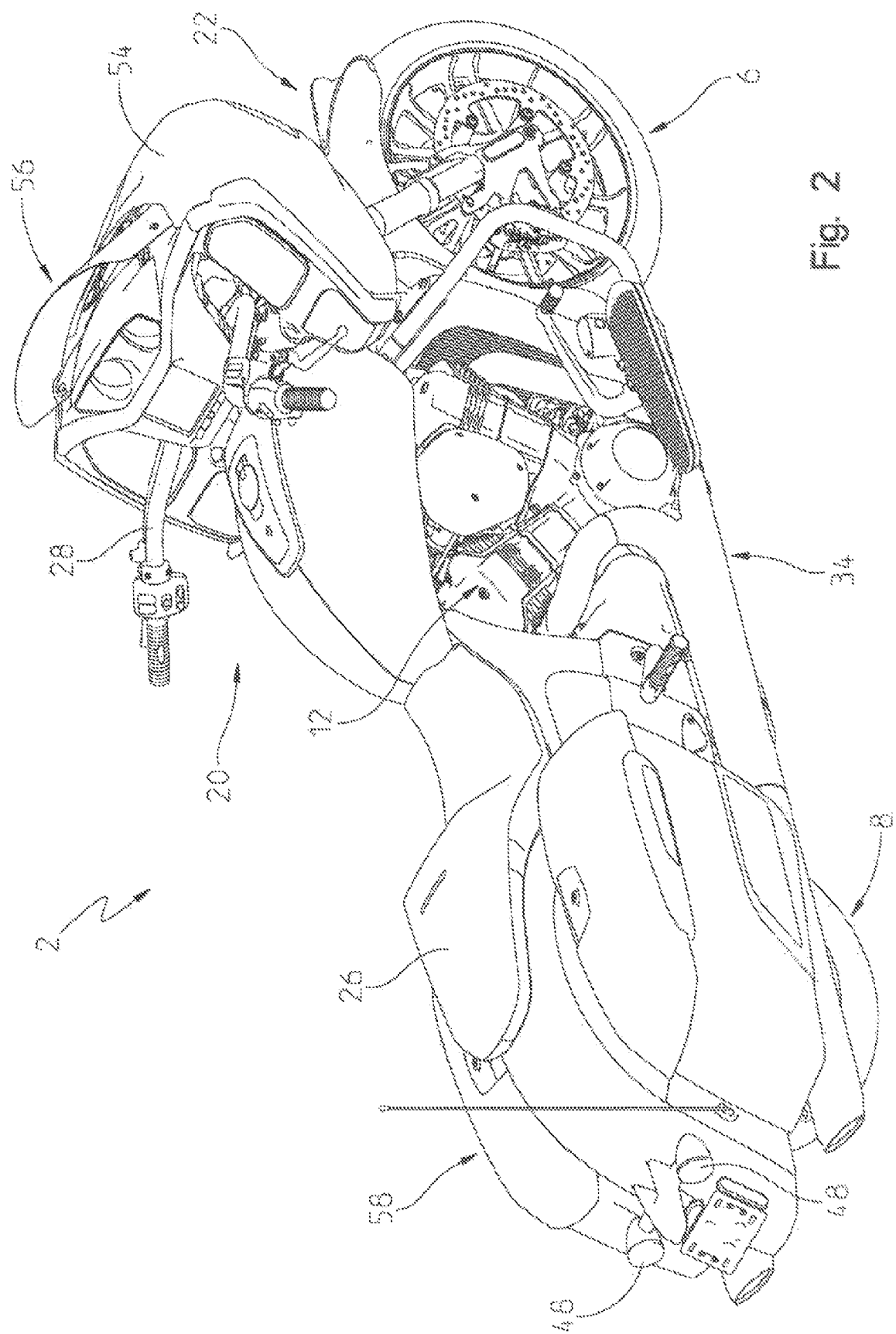
FIG. 2 is a right rear perspective view of the two-wheeled vehicle of FIG. 1.
Figure 3:
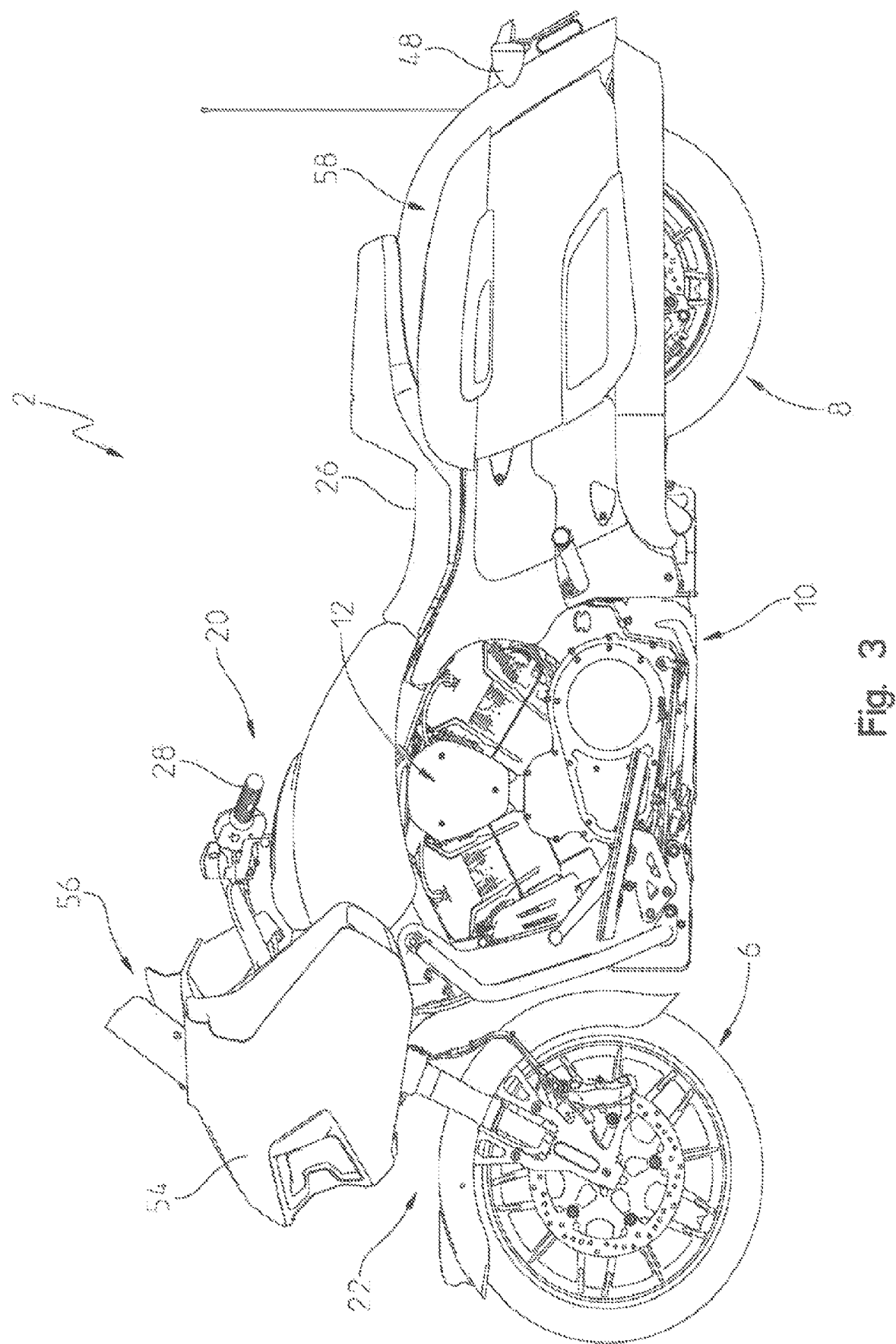
FIG. 3 is a left side view of the two-wheeled vehicle of FIG. 1.
Figure 4:
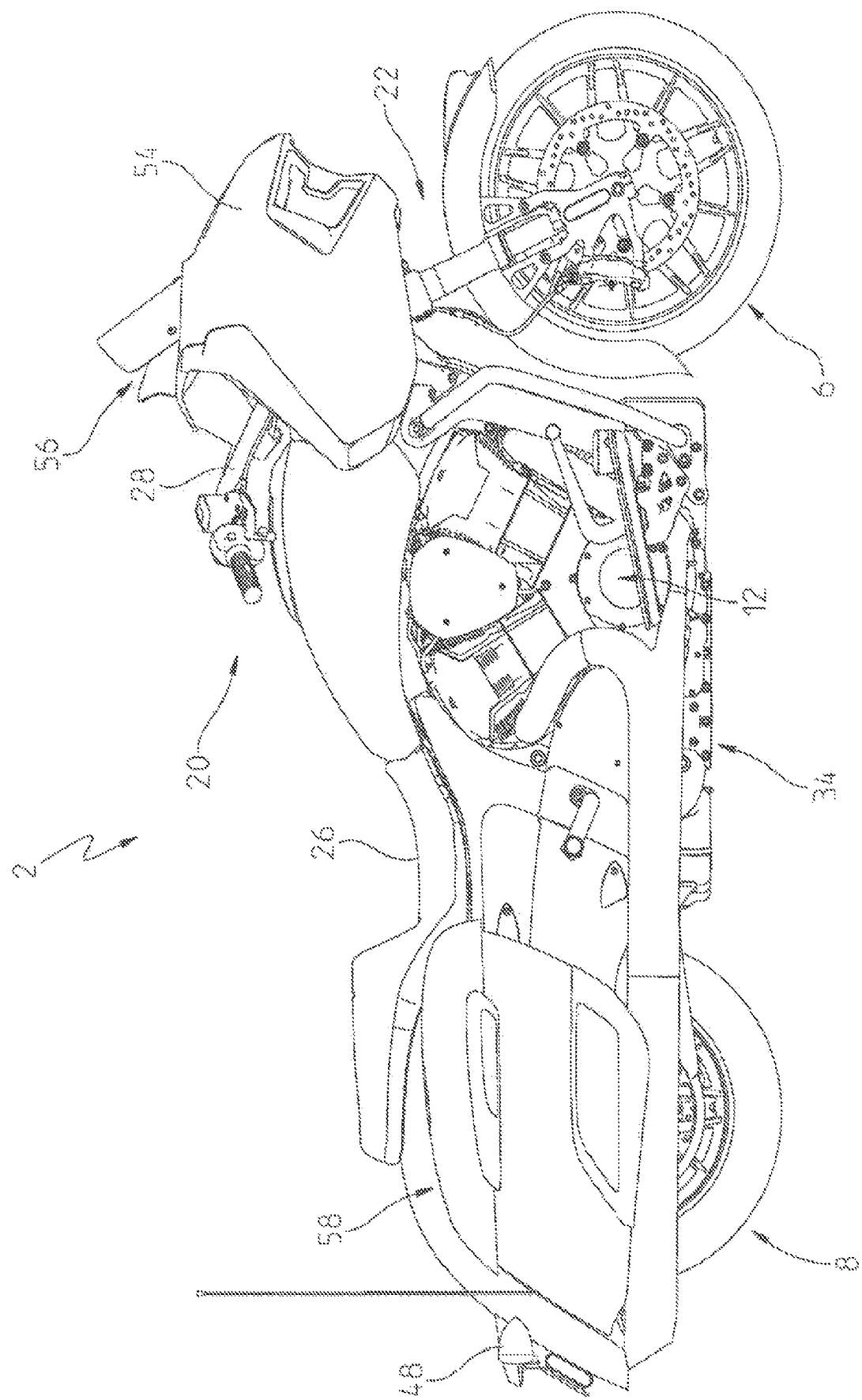
FIG. 4 is a right side view of the two-wheeled vehicle of FIG. 1.
Figure 5:
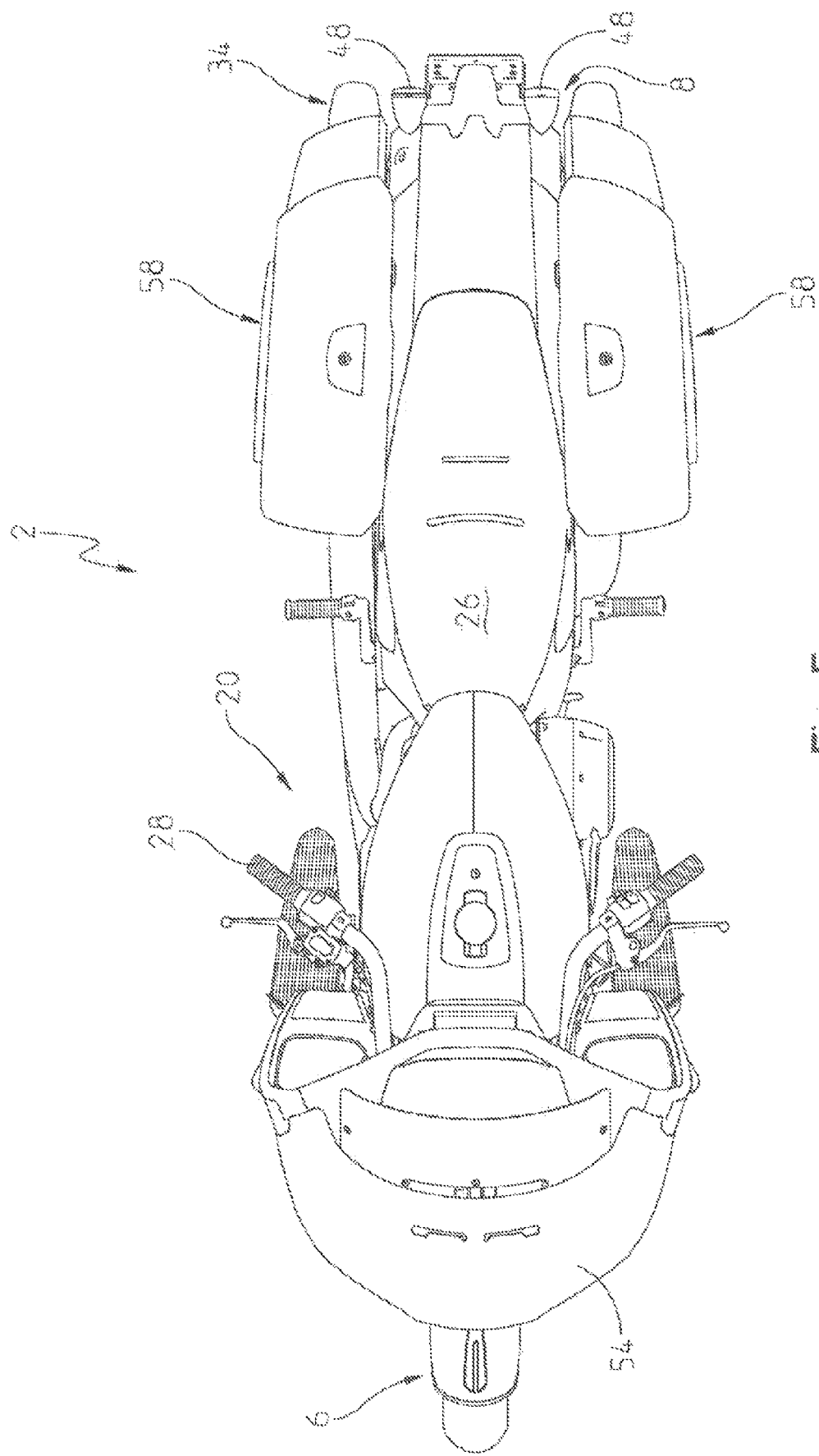
FIG. 5 is a top view of the two-wheeled vehicle of FIG. 1.
Figure 7:
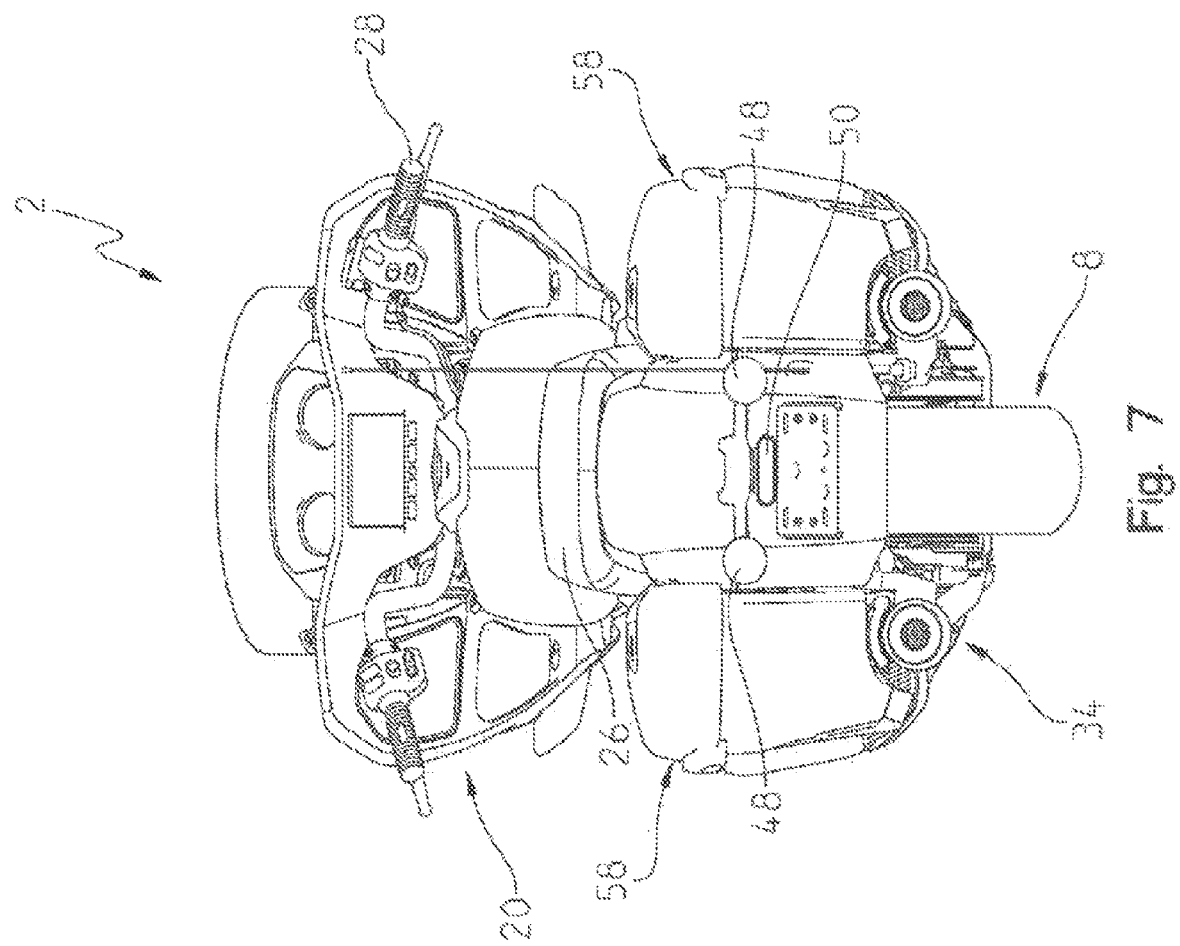
FIG. 7 is a rear view of the two-wheeled vehicle of FIG. 1.
Figure 6:
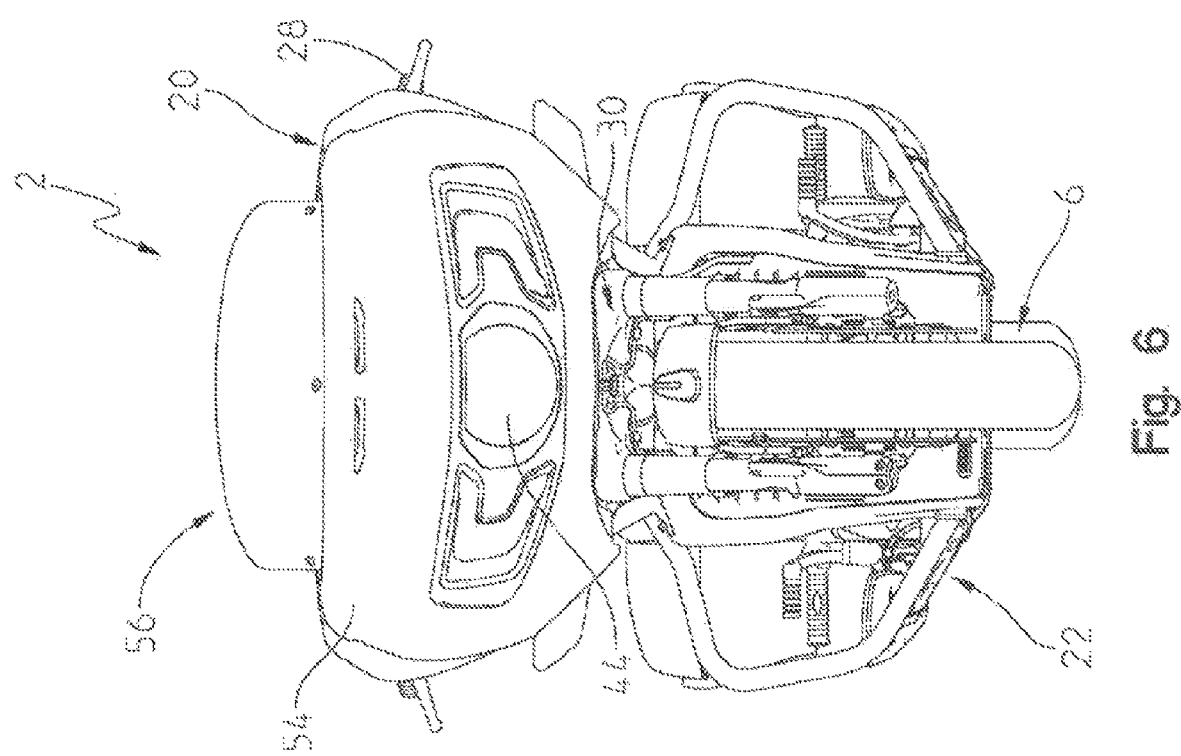
FIG. 6 is a front view of the two-wheeled vehicle of FIG. 1.

Corresponding reference characters indicate corresponding parts throughout the several views. Although the drawings represent embodiments of various features and components according to the present disclosure, the drawings are not necessarily to scale, and certain features may be exaggerated to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood that the invention may have application to other types of vehicles such as all-terrain vehicles, motorcycles, watercraft, utility vehicles, scooters, golf carts, and mopeds.

With references to FIGS. 1-7, an illustrative embodiment of a vehicle 2 is shown. As illustrated, vehicle 2 is a two-wheeled vehicle, such as a motorcycle. Illustratively, vehicle 2 includes a frame assembly 4 supported by at least one ground-engaging member, specifically a front ground-engaging member, illustratively a front wheel 6, and a rear-ground engaging member, illustratively a rear wheel 8. Vehicle 2 travels relative to a ground surface on front wheel 6 and rear wheel 8. Frame assembly 4 includes at least a main frame portion 66 and a rear frame assembly 67, as disclosed herein. While vehicle 2 is shown as a two-wheeled vehicle, various embodiments of the present disclosure are also operable with vehicles comprising more than two wheels (e.g., three, four, six, etc. wheels). In addition, it is understood that the various embodiments of the present disclosure are also operable with ground-engaging members other than wheels, such as, for example, tracks, skis, or sleds.

Rear wheel 8 is coupled to a powertrain assembly 10 to propel vehicle 2 through rear wheel 8. Powertrain assembly 10 includes a transmission 14 coupled to an engine 12 to provide power to rear wheel 8. In the illustrative embodiment shown, engine 12 is a V-twin spark-ignition gasoline engine available from Polaris Industries Inc., located at 2100 Highway 55 in Medina, Minnesota 55340, however, any type of engine may be used. For example, electric motors and other suitable torque-generating machines, including hybrids, are operable with the various embodiments of the present disclosure.

Vehicle 2 includes a steering assembly 20, a front suspension assembly 22, a rear suspension assembly 24 (FIG. 52), and a seat 26. Steering assembly 20 includes handlebars 28 that may be moved or rotated about a steering axis by an operator to rotate front wheel 6 either to the left or the right. Steering assembly 20 includes a gripping portion, comprised of hand grips and operator controls for the comfort of the operator while operating vehicle 2. Steering assembly 20 is illustratively coupled to vehicle 2 by a triple clamp assembly 30 (see FIG. 6). Vehicle 2 further includes engine operating systems such as an air intake system 32 and exhaust system 34. Operator controls are also provided for operating and controlling vehicle 2, which may include a vehicle starting system, an electronic throttle control ("ETC"), vehicle speed controls, and vehicle braking systems. Additional systems and components may also be provided such as headlight 44, front turn signals, rear turn signals 48, rear light 50, auxiliary lights, windshield assembly 56, and saddlebag assembly 58.

Figure 8:
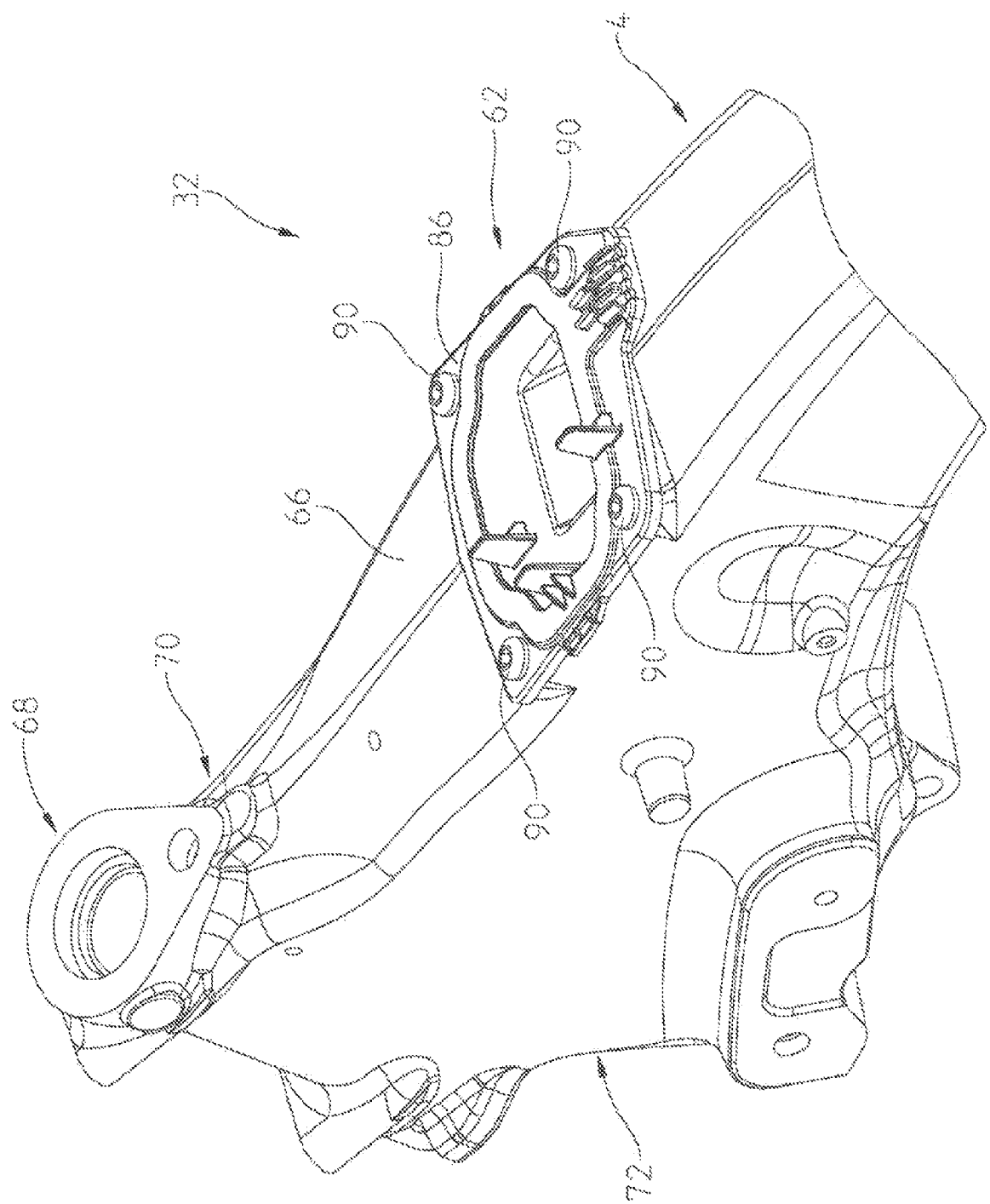
FIG. 8 is a left perspective view of a main frame portion of a frame assembly of the two-wheeled vehicle of FIG. 1 with an air filter cover.
Figure 9:
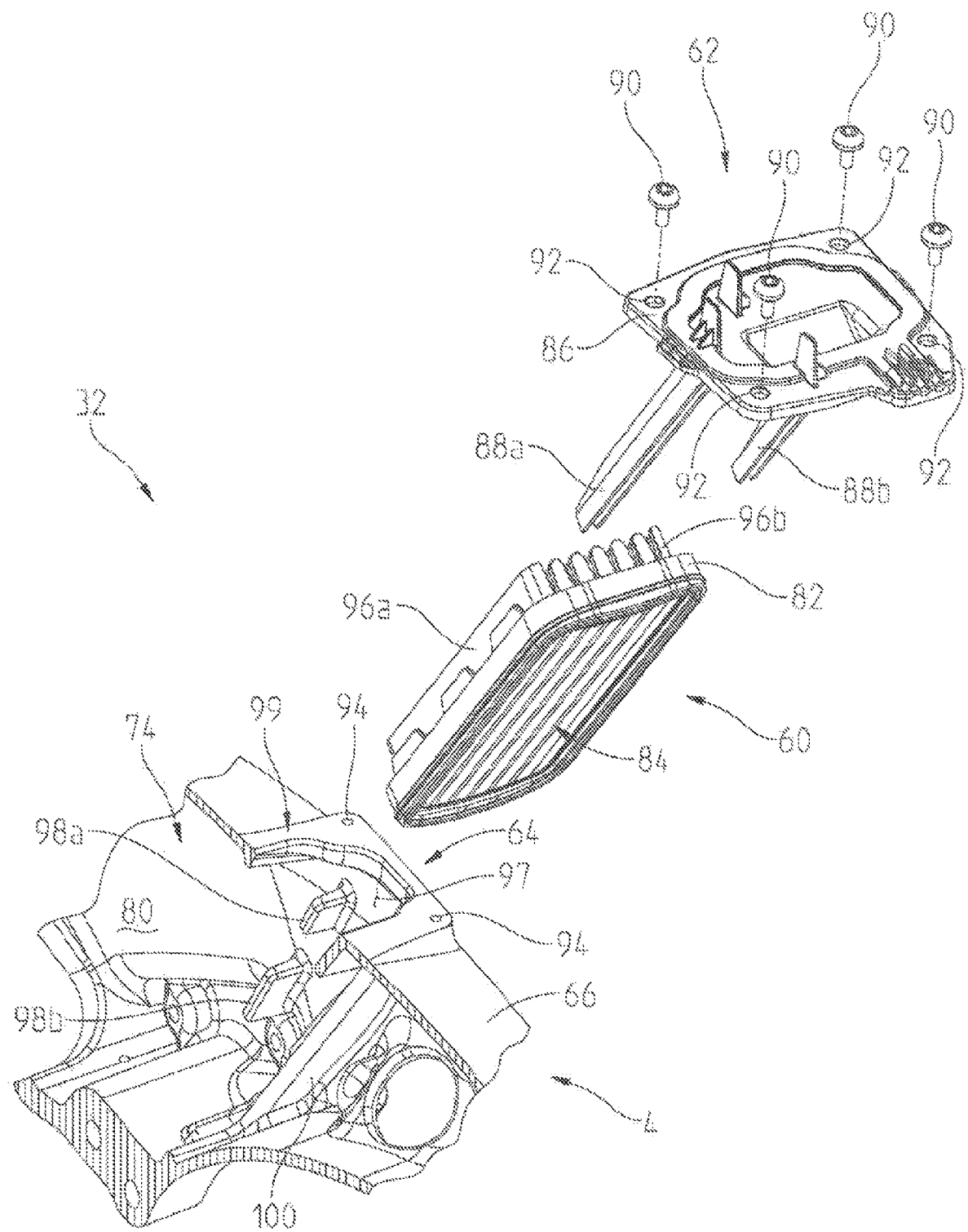
FIG. 9 is an exploded view of a cross-section of the main frame portion shown in FIG. 8, the air filter cover, and an air filter.

With reference now to FIGS. 8 and 9, air intake system 32 is shown in more detail. Air intake system 32 provides air to powertrain assembly 10, particularly engine 12, and illustratively includes an air filter 60 and an air filter cover 62. In the illustrative embodiment shown, air filter 60 and air filter cover 62 are received within an air filter portion 64 of main frame portion 66 of frame assembly 4. More specifically, main frame portion 66 includes a head tube 68 positioned at a forward end 70 and configured to couple with a portion of steering assembly 20. Positioned vertically below head tube 68 is an air intake port 72 (see FIG. 13). Air intake port 72 is fluidly coupled to a first end of an air box or channel 74 extending through at least a portion of an interior 80 of main frame portion 66. As such, interior 80 of main frame portion 66 defines air box 74. As disclosed further herein, air filter 60 is positioned longitudinally intermediate air intake port 72 and an air outlet port (not shown). As such, air that flows into air box 74 through air intake port 72 flows through filter 60 and is cleaned or otherwise filtered of any particulate matter or contaminants before exiting air box 74 through the air outlet port and entering engine 12 through torque tubes (not shown).

In the illustrative embodiment shown, air filter 60 includes a frame 82 surrounding and supporting a filter medium 84. Frame 82 may comprise a rigid material. An advantage, among others, of a rigid frame 82 is that air filter 60 will better retain its shape as well as seal against air filter portion 64 when seated against interior surfaces of main frame portion 66. Air filter 60 is secured within air filter portion 64 using air filter cover 62. In the embodiment shown, air filter cover 62 includes a base 86 with opposed prongs 88, illustratively prongs 88a, 88b, extending downwardly from base 86. Base 86 is configured to couple to main frame portion 66 using, for example, a plurality of fasteners 90. Illustratively, base 86 includes a plurality of apertures 92 configured to receive a respective one of fasteners 90. Similarly, main frame portion 66 includes a plurality of apertures 94 surrounding an opening 99 which provides access to air filter portion 64. Apertures 92 of air filter cover 62 align with apertures 94 of main frame portion 66 such that both apertures 92, 94 are configured to receive a respective one of fasteners 90 to couple air filter cover 62 to main frame portion 66. Opposed prongs 88 are adapted to secure air filter 60 therebetween such that filter 60 is positioned generally laterally intermediate prongs 88. In the embodiment shown, opposed prongs 88 extend along opposite sides, illustratively sides 96a, 96b, respectively, of filter medium 84 and filter frame 82.

Within air filter portion 64, a plurality of tabs 98 extend inwardly from an interior surface of a wall 97 of main frame portion 66. In the embodiment shown, air filter portion 64 includes an upper tab 98a and a lower tab 98b extending inwardly from interior wall 97 and vertically spaced apart from one another. In addition, air filter portion 64 includes a mounting flange 100 extending inwardly from interior wall 97. Mounting flange 100 extends circumferentially around the inner surface of main frame portion 66 and is angled relative to a vertical axis of vehicle 2. Mounting flange 100 provides a sealing surface against which frame 82 of air filter 60 may be sealed. More specifically, upper tab 98a and lower tab 98b are longitudinally spaced apart from mounting flange 100 to accommodate air filter 60 and air filter cover 62 when installed. In the embodiment shown, lower tab 98b is longitudinally spaced closer to mounting flange 100 than upper tab 98a is longitudinal spaced to mounting flange 100.

When air filter 60 is secured between opposed prongs 88 of air filter cover 62 and air filter 60 and air filter cover 62 are inserted into air filter portion 64 through opening 99, air filter 60 and opposed prongs 88 of air filter cover 62 will be longitudinally positioned between tabs 98 and mounting flange 100 such that tabs 98 contact a forward surface of prongs 88 and mounting flange 100 contacts a rearward surface of filter 60. Because lower tab 98b is longitudinally spaced closer to mounting flange 100, prongs 88 compress air filter 60 against mounting flange 100. As a result, frame 82 forms a seal with at least mounting flange 100. Air filter cover 62 may then be secured to main portion 66 using fasteners 90.

Figure 10:
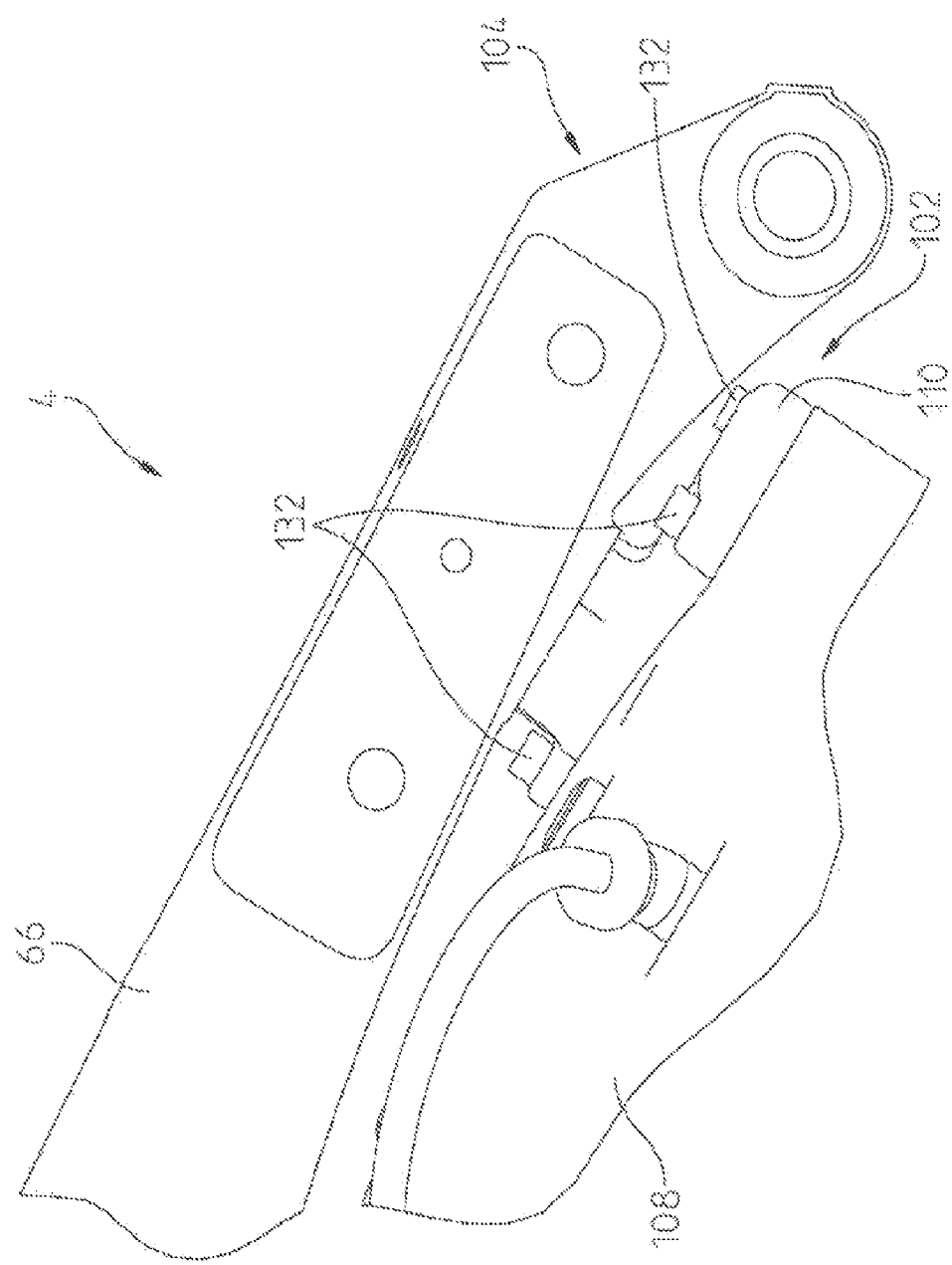
FIG. 10 is a left side view of a rear end of the main frame portion of FIG. 8 coupled to an air breather.
Figure 11:
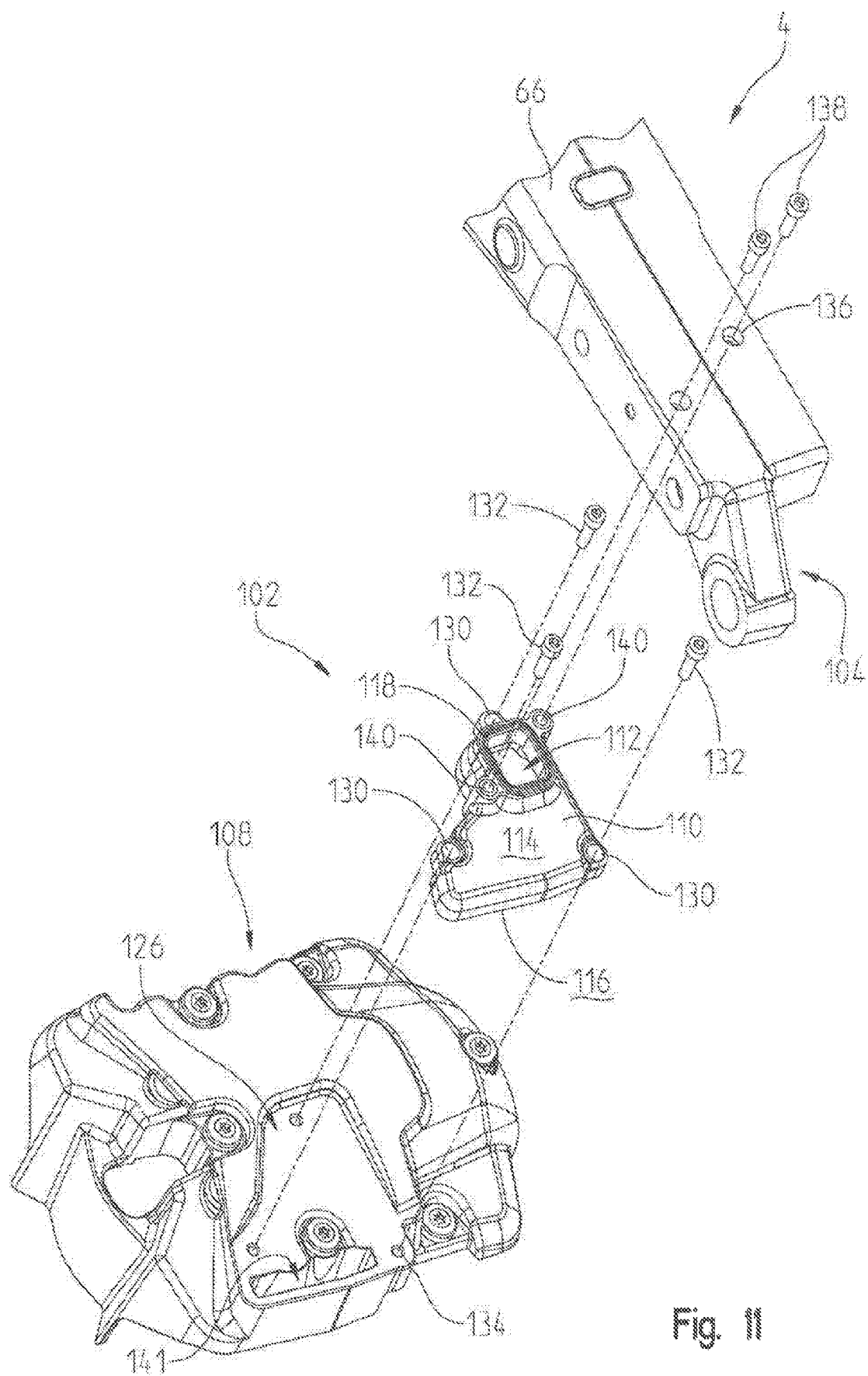
FIG. 11 is an exploded view of the main frame portion, the air breather, and a valve cover.
Figure 12:
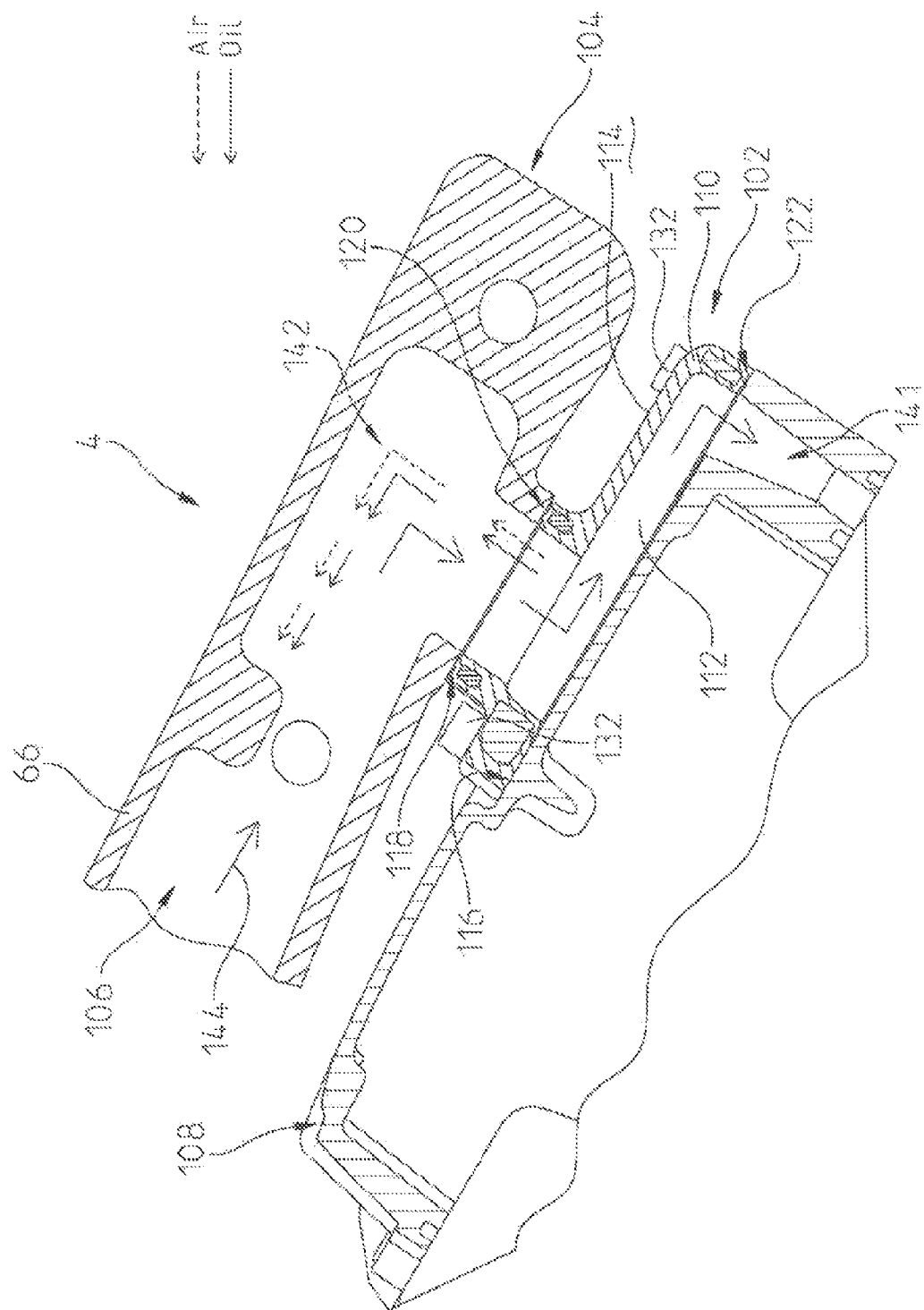
FIG. 12 is a cross-sectional view of the main frame portion, the air breather, and the valve cover of FIG. 11 coupled together.

Turning now to FIGS. 10-12, an air breather 102 of engine 12 is shown. Air breather 102 is positioned proximate a rearward end 104 of main frame portion 66 and is fluidly coupled to an inner chamber 106 of main portion 66, which is rearward of filter 60. Air breather 102 is further fluidly coupled to a cam cover or valve cover 108 of one of the cylinder heads of engine 12, illustratively the rearward cylinder head. In the embodiment shown, air breather 102 comprises a base 110 including a fluid passageway 112. Fluid passageway 112 extends from an upper surface 114 of base 110 to a lower surface 116 of base 110 located opposite upper surface 114. Upper surface 114 includes a mounting flange 118 adapted to mate with a mounting flange 120 of rearward end 104. In the embodiment shown, mounting flange 118 of upper surface 114 and mounting flange 120 of rearward end 104 comprise generally planar surfaces. Similarly, lower surface 116 includes a mounting flange 122 adapted to be received within a recess 126 of valve cover 108 and is directly coupled to valve cover 108. Air breather 102 further includes a gasket or seal for sealing valve cover 108 to main frame portion 66. In the illustrative embodiment shown, the seal is overmolded to air breather 102. In one embodiment, base 110 comprises an elastomer. An advantage, among others, of base 110 comprising an elastomer is that vibrations from engine 12 may be isolated. To properly mate with mounting flange 120 of rearward end 104, mounting flange 118 may comprise an aluminum ring inserted into base 110.

Base 110 illustratively includes a plurality of apertures 130 configured to receive a respective one of fasteners 132. Similarly, valve cover 108 includes a plurality of apertures 134 that correspond to a respective one of apertures 130 and are configured to securely receive a respective one of fasteners 132 for coupling base 110 to valve cover 108. In the illustrative embodiment shown, fasteners 132 are screws or bolts for threadably engaging apertures 134. Rearward end 104 of main portion 66 illustratively includes a plurality of apertures 136 configured to receive a respective one of fasteners 138. Similarly, base 110 further includes another plurality of apertures 140 that correspond to a respective one of apertures 136 and are configured to receive a respective one of fasteners 138 for coupling air breather 102 to main frame portion 66. In the embodiment shown, fasteners 138 are screws or bolts. It is contemplated, however, that either of fasteners 132 and fasteners 138 may comprise a variety of fasteners suitable for securely fastening air breather 102 to main frame portion 66 and valve cover 108.

Turning specifically to FIG. 12, air breather 102 provides an outlet for excess crankcase gases that build-up during normal operation of engine 12. More specifically, air breather 102 provides an outlet for the air to exit engine 12 and flow into main frame portion 66. The air exiting engine 12 through air breather 102 may include oil suspended in the air, or an air-oil mixture. This air-oil mixture exits a port 141 of valve cover 108 and passes through air breather 102 along fluid passageway 112. From air breather 102, the air-oil mixture enters inner chamber 106 of rearward end 104 of main frame portion 66. The flow path of the air-oil mixture is schematically illustrated with arrows 142 in FIG. 12. When the air-oil mixture enters inner chamber 106, the air-oil mixture cools sufficiently to permit the suspended oil to separate from the air. This separated oil collects within inner chamber 106. In the embodiment shown, inner chamber 106 is positioned vertically higher than air breather 102 and valve cover 108. As a result, the separated oil within inner chamber 106 will flow back into fluid passageway 112 of air breather 102 and re-enter engine 12 due, at least in part to, gravity, given that air breather 102 is generally positioned at the lowest point of main frame portion 66. This pathway of the separated oil is schematically illustrated with arrows 144 in FIG. 12. The air separated from the oil also returns to engine 12 through the torque tubes such this air mixes with the filtered air from air box 74. An advantage, among others, of air breather 102 is that oil expelled with excess crankcase gases during the normal operation of engine 12 may be returned to engine 12 or powertrain 10 as opposed to being expelled outside of engine 12.

Figure 13:
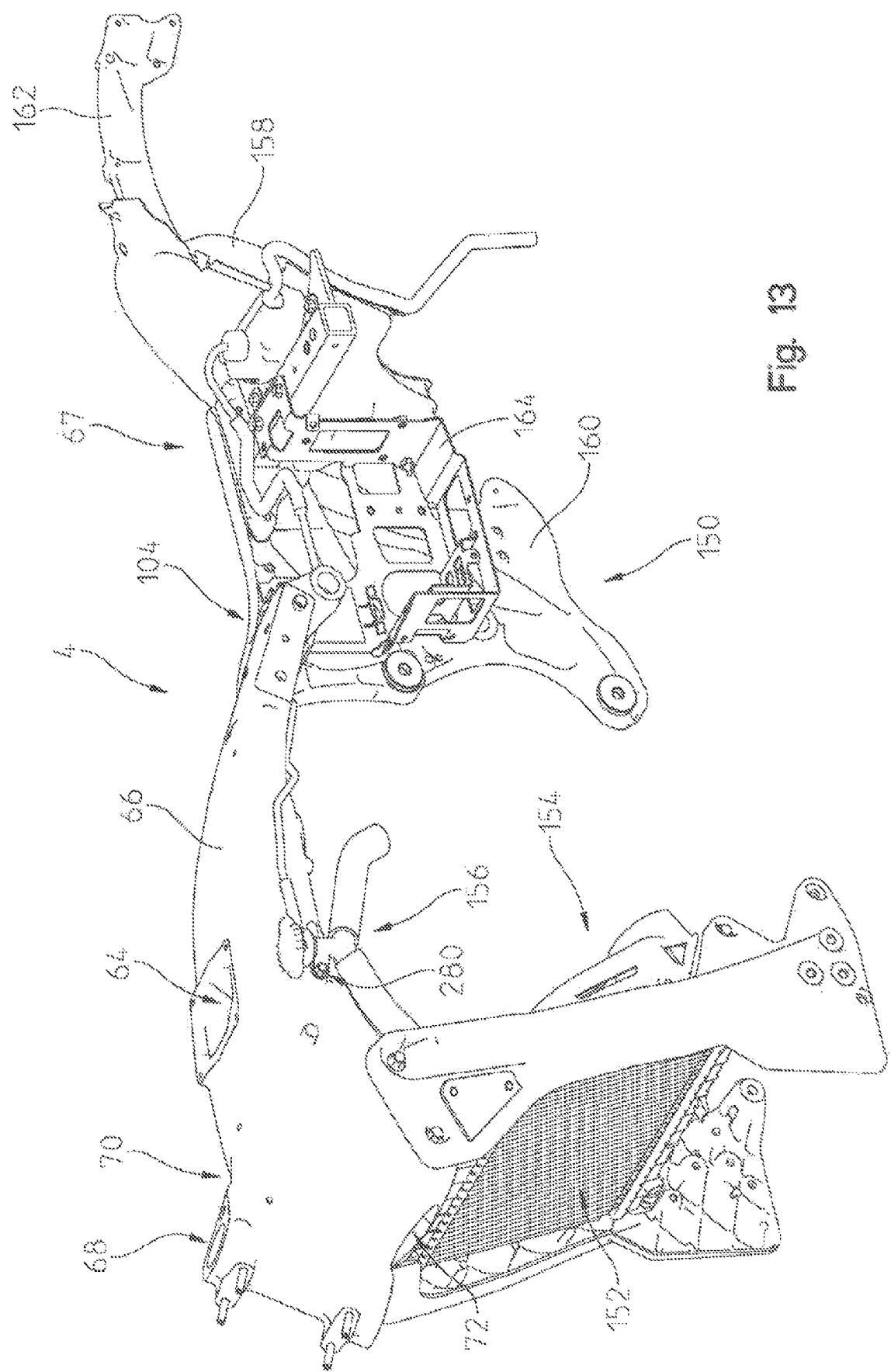
FIG. 13 is a left front perspective of the frame assembly and a cooling system of the two-wheeled vehicle.

Turning now to FIGS. 13-18, a cooling system 150 of vehicle 2 is shown. Cooling system 150 provides liquid cooling of engine 12 using a coolant having, for example, a high thermal capacity and low viscosity. Referring initially to FIG. 13, cooling system 150 includes a radiator 152, a fan assembly 154, a fill assembly including a filler neck 156, and a coolant overflow bottle 158. Radiator 152 and fan assembly 154 are illustratively positioned at forward end 70 of vehicle 2. Filler neck 156 is positioned longitudinally rearward of radiator 152 and fan assembly 154 and vertically higher than radiator 152 and coolant bottle 158.

Frame assembly 4 further includes a rear frame assembly 67 coupled to main frame portion 66. More specifically, side frames 160 of rear frame assembly 67 are coupled to rearward end 104 of main frame portion 66 and illustratively extend longitudinally rearward of main frame portion 66. Rear frame assembly 67 further includes rear frame extension 162 extending rearward of side frames 160. As shown in at least FIG. 13, an ABS bracket 164 is coupled to at least one of side frames 160. ABS bracket 164 is adapted to support a power source, such as a battery (not shown), for providing power to the electrical components of the vehicle 2. In the embodiment shown, coolant bottle 158 is coupled to ABS bracket 164. As a result, filler neck 156 is positioned longitudinally intermediate radiator 152 and coolant bottle 158. Similarly, ABS bracket 164 is positioned longitudinally intermediate filler neck 156 and coolant bottle 158.

Figure 14:
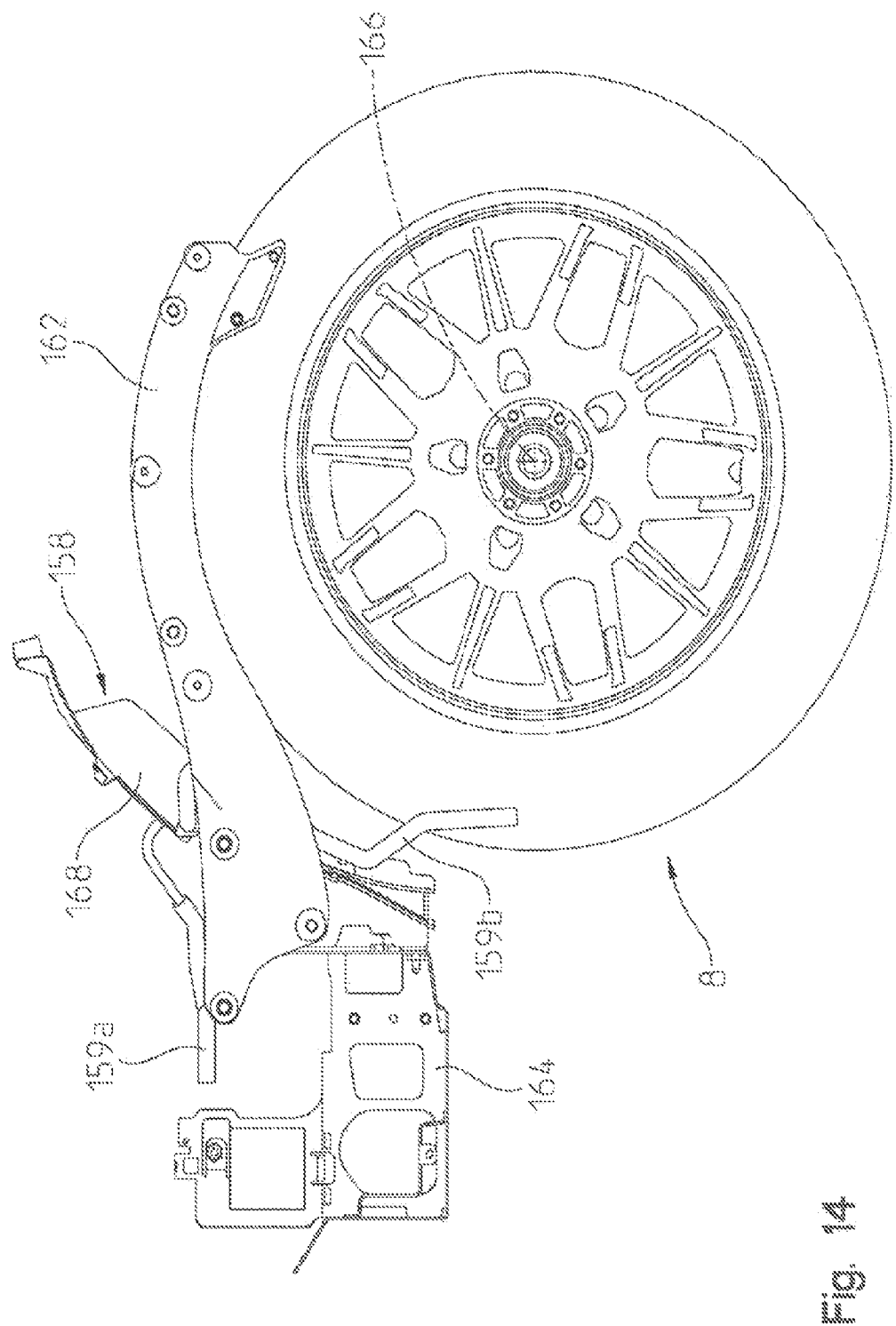
FIG. 14 is a left side view of a portion of the cooling system, a rear frame portion, and a rear ground-engaging member of the two-wheeled vehicle.
Figure 15:
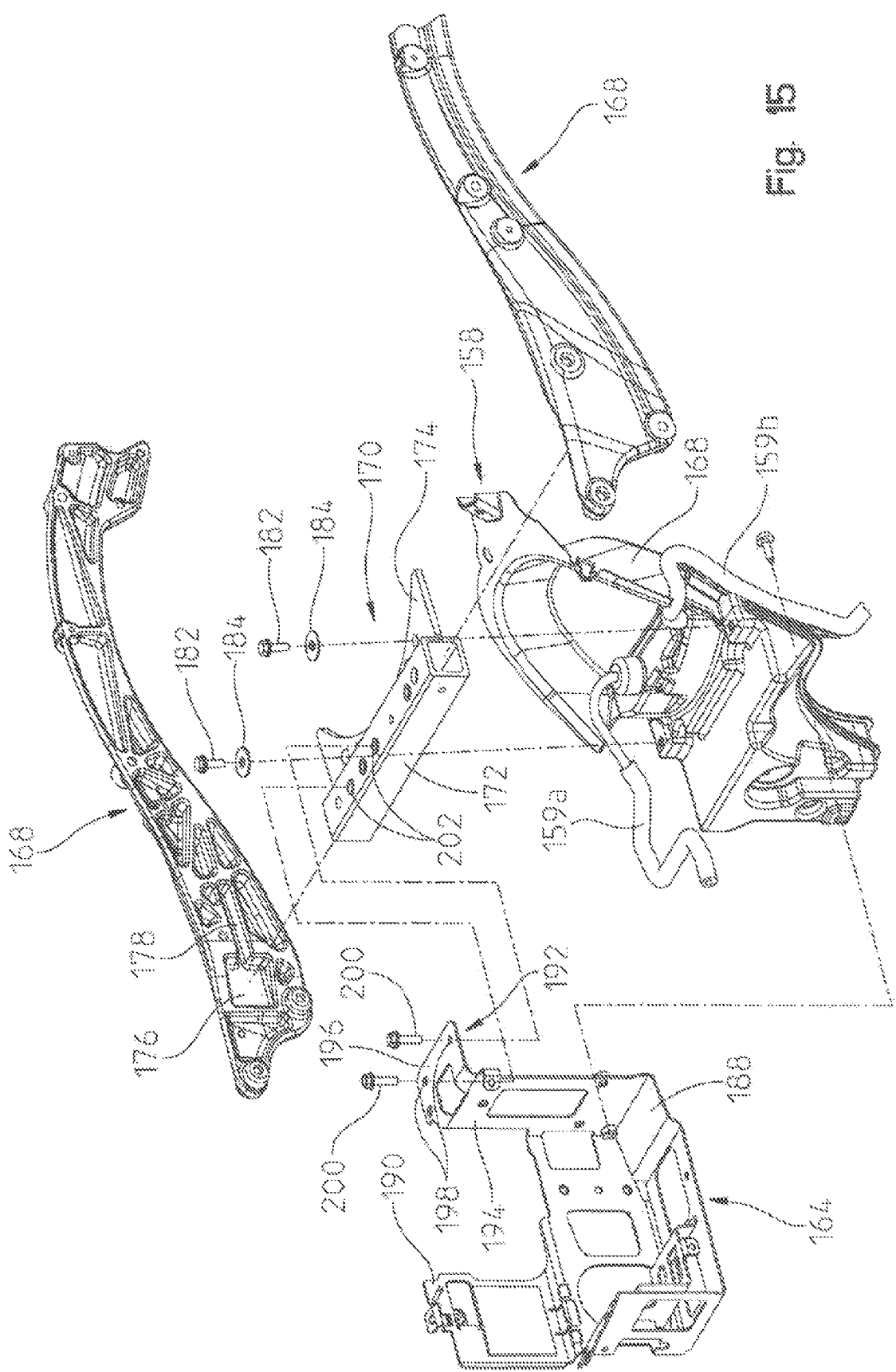
FIG. 15 is an exploded view of the portion of the cooling system and the rear frame portion of FIG. 14.

Referring now to FIGS. 14 and 15, coolant bottle 158, rear frame extension 162, ABS bracket 164, and rear wheel 8 are shown in more detail. Rear wheel 8 illustratively rotates about an axis of rotation 166 during forward or reverse operation of vehicle 2. In the embodiment shown, coolant bottle 158 is positioned longitudinally forward of axis 166. In addition, coolant bottle 158 is positioned vertically higher than axis 166 and is positioned directly over, or in vertical alignment, with a portion of the tire of rear wheel 8. Moreover, coolant bottle 158 comprises a curvilinear body 168 and illustratively forms an internal debris shield of vehicle 2. In addition, coolant bottle 158 includes conduits 159, illustratively conduits 159a, 159b, which fluidly couple coolant bottle 158 to the remainder of cooling system 150. More specifically, conduits 159 fluidly couple the remainder of cooling system 150 to an interior storage volume of coolant bottle 158. The interior storage volume of coolant bottle 158 is adapted to hold additional coolant of cooling system 150 or act as an expansion tank for coolant during operation of engine 12.

Referring specifically to FIG. 15, a cross tube 170 is provided having a substantially square tube portion 172 and a depending plate portion 174, which are received in a complementary square opening 176 and slot 178 respectively. Coolant bottle 158 is coupled to plate portion 174 of cross tube 170. More specifically, plate portion 174 illustratively includes a plurality of apertures 180 configured to receive a respective fastener 182. In the illustrative embodiment shown, a washer 184 is placed between respective ones of fastener 182 and plate portion 174. coolant bottle 158 similarly includes a plurality of apertures 186 that correspond to a respective one of apertures 180 and are configured to securely receive a respective one of fastener 182 for coupling coolant bottle 158 to cross tube 170. In the illustrative embodiment shown, fastener 182 illustratively comprises a bolt for threadably engaging apertures 186.

ABS bracket 164 includes a basket 188 adapted to support the battery (not shown) and a lateral hanger 190 and a longitudinal hanger 192. Lateral hanger 190 is configured to couple ABS bracket 164 to one of side frames 160 (see FIG. 13). Similarly, longitudinal hanger 192 is configured to couple ABS bracket 164 to cross tube 170. More specifically, longitudinal hanger 192 includes a vertical portion 194 extending vertically upward from basket 188 and horizontal tab 196 extending horizontally from a distal end of vertical portion 194 along a longitudinal axis of vehicle 2. Horizontal tab 196 includes a plurality of apertures 198 configured to receive a respective one of fasteners 200. Similarly, tube portion 172 illustrative includes a plurality of apertures 202 that correspond to a respective one of apertures 198 and are configured to securely receive a respective one of fasteners 200 for coupling horizontal tab 196 to tube portion 172 of cross tube 170.

Figure 16:
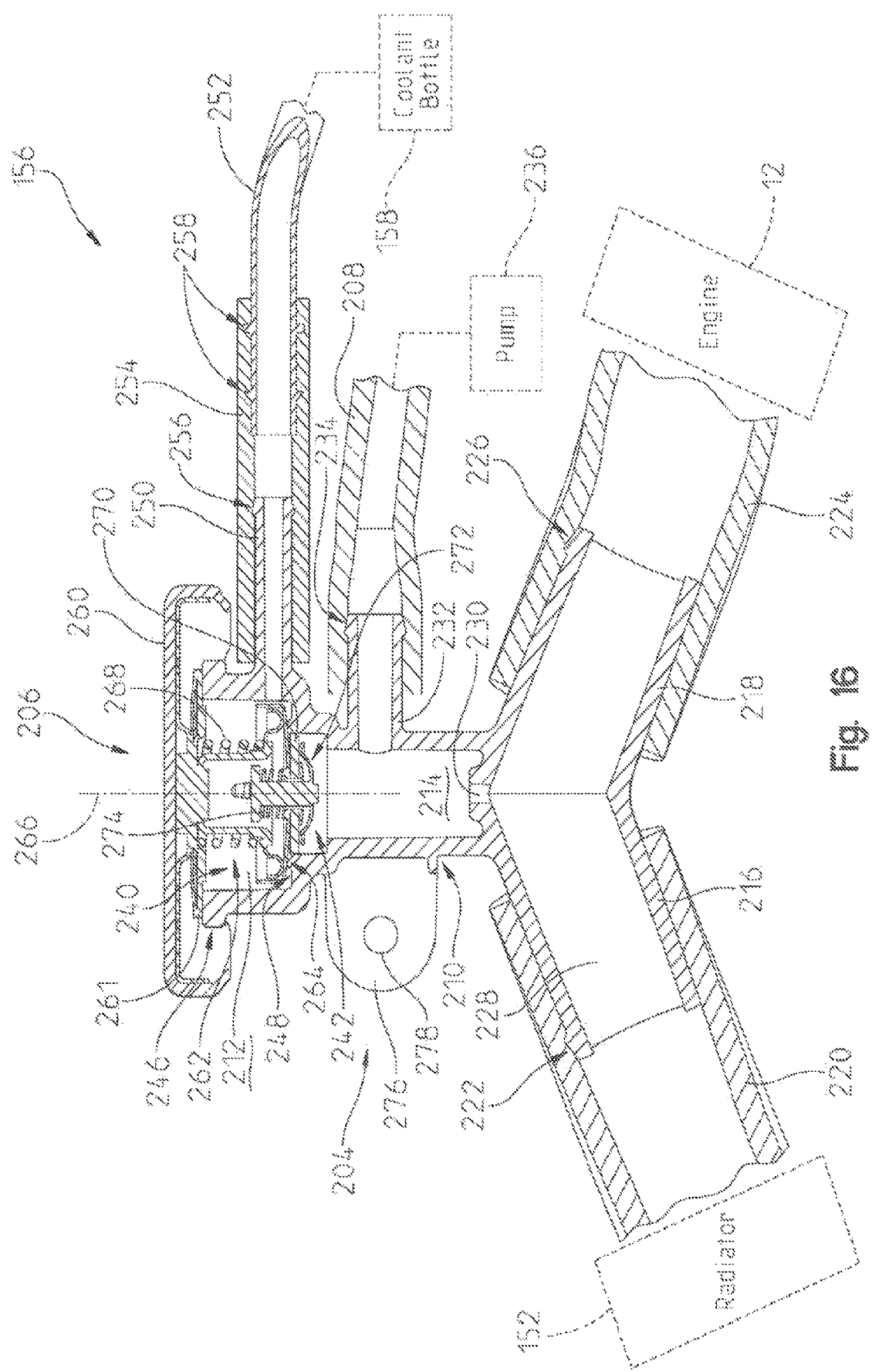
FIG. 16 is a cross-sectional view of a fill assembly, including filler neck and a cap, fluidly coupled to the cooling system.

Turning now to FIG. 16, filler neck 156 is shown in more detail. Filler neck 156 is positioned vertically above the remainder of cooling system 150 and provides an access point for refilling coolant to cooling system 150. Cooling system 150 illustratively comprises a Y-shaped body 204, a cap 206, and an water pump return line 208. Body 204 includes a vertical riser 210 having an upper chamber 212 and a lower chamber 214 positioned vertically below and fluidly coupled to upper chamber 212. Body 204 further includes a first branch 216 extending in a first direction and a second branch 218 extending in a second direction opposite the first direction. Branches 216, 218 are illustratively positioned vertically opposite upper chamber 212. First branch 216 is coupled to and in fluid communication with a first conduit 220 of cooling system 150 using, for example, a barbed fitting 222. Similarly, second branch 218 is coupled to and in fluid communication with a second conduit 224 of cooling system 150 using, for example, a barbed fitting 226. In the illustrative embodiment shown, branches 216, 218 form a fluid passageway 228 of cooling system 150. First branch 216 may be further fluidly coupled to radiator 152, and second branch 218 may be fluidly coupled to engine 12. Body 204 also includes a mounting bracket 276 for securely mounting filler neck 156 to main portion 66 (see FIG. 13). In the illustrative embodiment shown, mounting bracket 276 includes an aperture 278 configured to a receive a fastener 280 (see FIG. 13) for securely mounting filler neck 156 to main portion 66.

Lower chamber 214 is in fluidly communication with branches 216, 218 via an orifice 230, which is smaller in diameter than the diameter of lower chamber 214 and is positioned vertically opposite upper chamber 212 and adjacent fluid passageway 228. Water pump return line 208 is coupled to and in fluid communication with lower chamber 214. More specifically, water pump return line 208 is coupled to a fitting 232 of lower chamber 214, which is positioned vertically higher than orifice 230. Fitting 232 may further include a barbed end 234 for securely coupling to water pump return line 208. In the illustrative embodiment shown, water pump return line 208 extends horizontally from fitting 232 and is further fluidly coupled to a pump 236. Because filler neck 156 is positioned vertically higher than the remainder of cooling system 150 and is therefore the highest point in cooling system 150, any air bubbles present in cooling system 150 will collect within lower chamber 214. Pump 236 is powered by engine 12 and, therefore, operates whenever engine 12 is operating. As a result, air bubbles are continually drawn out of lower chamber 214 while engine 12 is operating. Air bubbles are separated from the coolant in lower chamber 214, the coolant returns to pump 236 through water pump return line 208, and air collected at the top goes to coolant bottle 158 through conduit 252.

Upper chamber 212 is positioned vertically above lower chamber 214 and includes a first chamber 240 in fluid communication with a second chamber 242. More specifically, a first end 244 of first chamber 240 includes a flange 246 configured to securely engage cap 206. When cap 206 is not securely engaged to flange 246, first chamber 240 may be open to the atmosphere, such as when coolant is added to cooling system 150. Positioned at a second end of first chamber 240 is second chamber 242. In the illustrative embodiment shown, a diameter of second chamber 242 is smaller than a diameter of first chamber 240. As a result, first chamber 240 includes a restriction 248 at the reduction in diameters.

First chamber 240 includes an extension 250 positioned proximate the second end of first chamber 240 and extending from body 204. Extension 250 is coupled to and in fluid communication with a conduit 252 via a coupler 254. Extension 250 illustratively includes a barbed fitting 256 for securely coupling extension 250 to coupler 254. Similarly, conduit 252 includes a barbed fitting 258 for securely coupling conduit 252 to coupler 254. In the illustrative embodiment shown, extension 250 extends horizontally away from first chamber 240, and conduit 252 is in fluid communication with coolant overflow bottle 158. As a result, coolant residing in coolant overflow bottle 158 may be recycled into fluid passageway 228 via conduit 252.

Cap 206 includes an outer cover 260 adapted to be grasped an operator for engaging and disengaging cap 206 from flange 246 of upper chamber 212 of body 204. Cap 206 includes an upper pressure seal 261 that seals against flange 246 when cap 206 is secured to body 204. In the illustrative embodiment shown, cap 206 further includes a pressure valve 262 configured to regulate the system pressure within fluid passageway 228 of cooling system 150. Pressure valve 262 is received within first chamber 240 and rests against a sealing protrusion 264 of the second end of first chamber 240. Pressure valve 262 fluidly decouples first chamber 240 from second chamber 242 when biased against sealing protrusion 264. As a result, pressure valve 262 is wider than the diameter of second chamber 242. Pressure valve 262 is displaceable along an axis 266 of cap 206.

Cap 206 includes a pressure valve spring 268 that biases pressure valve 262 downward against sealing protrusion 264. Pressure valve 262, when biased against sealing protrusion 264, allows the system pressure of cooling system 150 to increase thereby allowing the coolant to increase in temperature without boiling. When the system pressure of cooling system 150 exceeds an upper threshold, the biasing force exerted by pressure valve spring 268 is exceeded and pressure valve 262 is displace vertically away from sealing protrusion 264. As a result, this heated coolant and any collected air may enter first chamber 240 and flow to coolant overflow bottle 158 via conduit 252. The upper threshold of the system pressure of cooling system 150 may be adjusted by modifying, for example, the stiffness of pressure valve spring 268 to adjust the biasing force exerted thereby.

Cap 206 also includes a lower sealing gasket 270 positioned vertically below pressure valve 262 and received within second chamber 242. Lower sealing gasket 270 forms a seal with sealing protrusion 264 and with a vacuum valve 272 positioned vertically below lower sealing gasket 270. Vacuum valve 272 is displaceable along axis 266 of cap 206 and includes a vacuum valve spring 274 which biases vacuum valve 272 against lower sealing gasket 270. Vacuum valve 272, when biased against lower sealing gasket 270, allows pressure valve 262 to operate as described. Vacuum valve 272 also operates to prevent air from entering cooling system 150 when the system pressure of cooling system 150 decreases. The system pressure of cooling system 150 may decrease when the coolant in cooling system 150 cools following operation of engine 12. When the system pressure of cooling system 150 falls below a minimum threshold, a pressure differential between the coolant in coolant overflow bottle 158 and the coolant in fluid passageway 228 overcomes the biasing force of vacuum valve spring 274 and displaces vacuum valve 272 downward allowing coolant from coolant overflow bottle 158 to enter lower chamber 214 and fluid passageway 228 until equilibrium between fluid passageway 228 and coolant overflow bottle 158 is reached.

Figure 17:
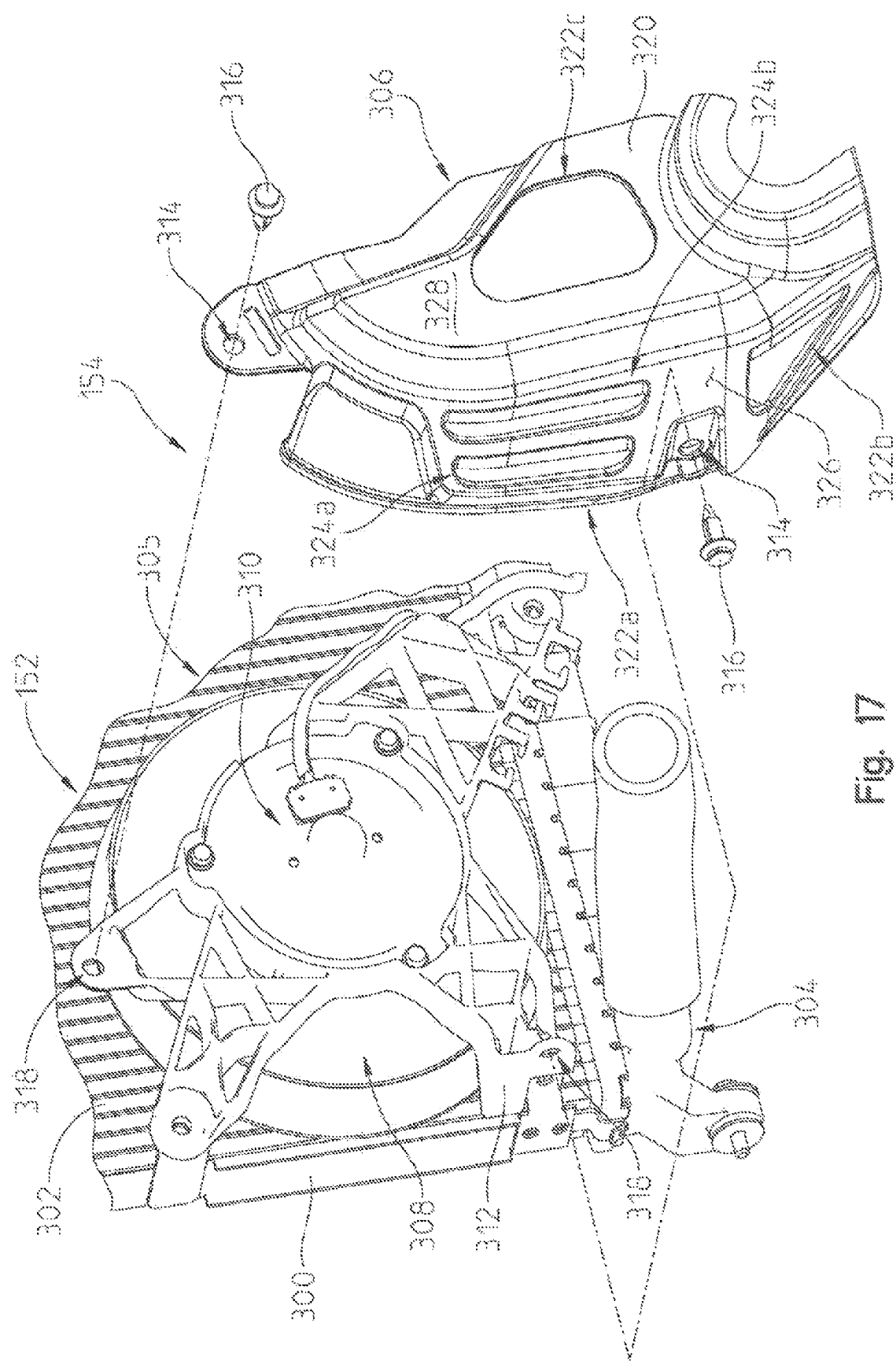
FIG. 17 is a rear exploded view of a radiator, a fan, and a shroud of the cooling system.
Figure 18:
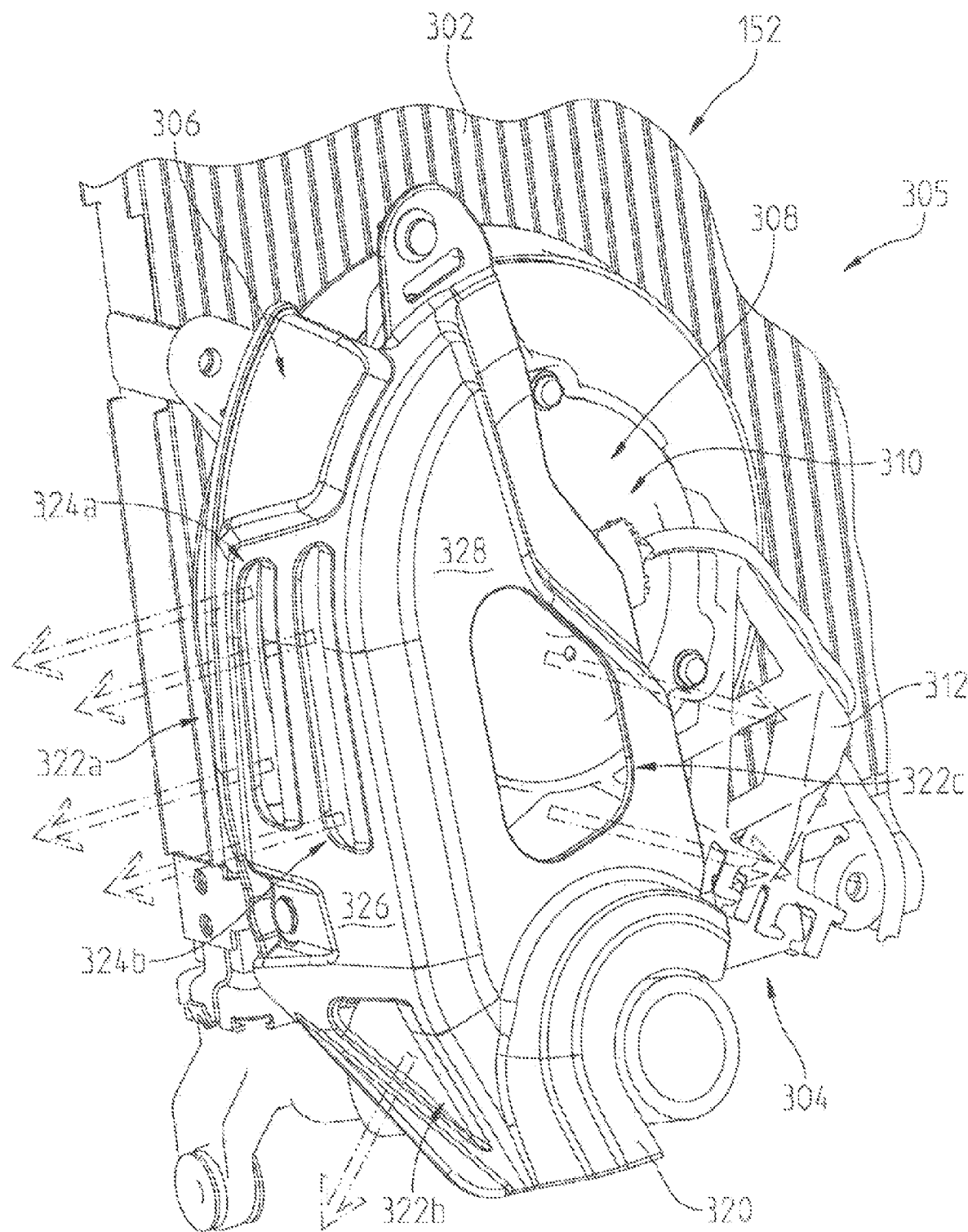
FIG. 18 is a rear left perspective view of the radiator, fan, and shroud of FIG. 17.
Figure 19:
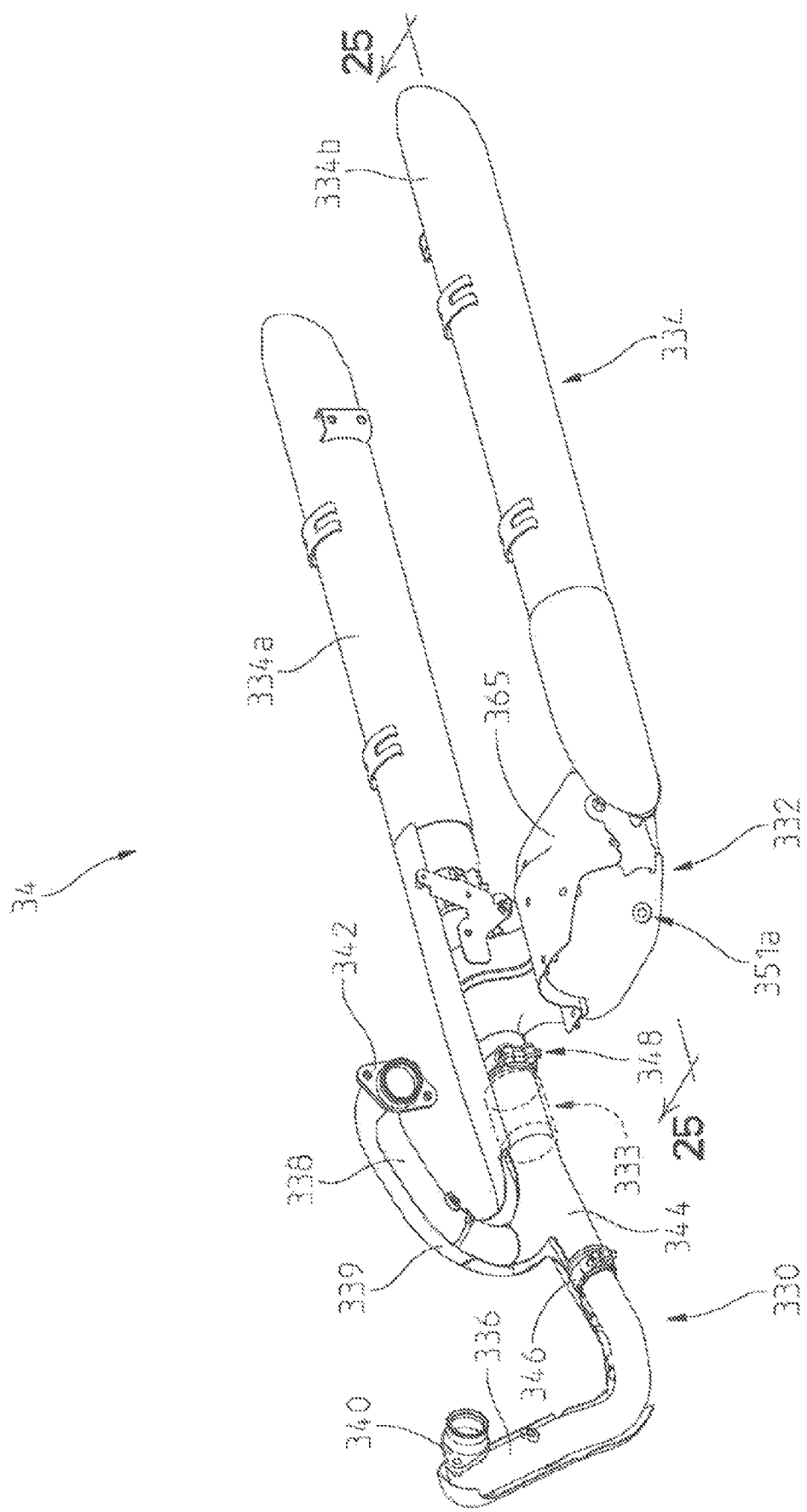
FIG. 19 is a left perspective view of an exhaust system of the two-wheeled vehicle.

Turning now to FIGS. 17-18, radiator 152 and blower assembly 154 are shown in further detail. Radiator 152 includes a frame 300 supporting a heat exchanger 302 and a coolant manifold 304. In the illustrative embodiment shown, frame 300 comprises a generally rectangular body with a central portion in which heat exchanger 302 is supported. Heat exchanger 302 similarly comprises a generally rectangular body. It is contemplated, however, that frame 300 and heat exchanger 302 may comprise other shapes. Coolant manifold 304 is coupled to a vertical lower portion of frame 300 and is fluidly coupled to heat exchanger 302. A similar coolant manifold may be supported by frame 300 along a vertically upper portion of frame 300 or along a side portion proximate a top of frame 300.

Blower assembly 154 illustratively includes a fan assembly 305 and a shroud 306 surround a portion of fan assembly 305. Fan assembly 305 includes a fan 308 powered by a fan motor 310. Fan motor 310 is coupled to a fan motor mount 312, which is illustratively coupled to frame 300 of radiator 152. In the illustrative embodiment shown, fan motor mount 312 is further coupled to coolant manifold 304. Fan motor 310 is configured to pull air through and away from radiator 152 to facilitate cooling of the coolant flowing through radiator 152.

Shroud 306 surrounds a portion of fan assembly 305 such that fan assembly 305 is positioned longitudinally intermediate radiator 152 and shroud 306. As a result, shroud 306 is positioned longitudinally rearward of radiator 152 along longitudinal axis 3. Illustratively, shroud 306 is removably coupled to fan motor mount 312. In the illustrative embodiment shown, shroud 306 includes a plurality of apertures 314 configured to receive a respective fastener 316 for securely engaging a corresponding aperture 318 on fan motor mount 312.

Shroud 306 illustratively includes a shell 320 having plurality of apertures 322, illustratively apertures 322a, 322b, 322c, sized and adapted to direct airflow away from radiator 152 and blower assembly 154 as well as an operator seated on vehicle 2. More specifically, apertures 322a, illustratively elongated slots 324a, 324b, are positioned on a lateral outside 326 of shell 320. Elongated slots 324a, 324b are oriented such that airflow is directed away from radiator 152 and laterally outboard of an operator. Elongated slots 324a, 324b are illustratively arranged parallel to one another with elongated slots 324b positioned longitudinally rearward of elongated slots 324a. It is contemplated, however, that apertures 322a may comprise a single slot or opening.

Aperture 322b is positioned on lower portion of shell 320 of shroud 306. In the illustrative embodiment shown, apertures 322b is positioned vertically lower than elongated slots 324a, 324b. Apertures 322b comprises a generally triangular opening oriented to direct airflow downward and laterally outboard of radiator 152 and an operator. Aperture 322c is positioned on a longitudinally rearward portion 328 of shell 320 and is oriented to direct airflow rearward of radiator 152. Aperture 322c may be positioned further laterally outward than shown. The boundary of aperture 322c may include chamfering. Radiator 152 and blower assembly 154 are positioned longitudinally forward of engine 12. Therefore, vehicle 2 may include a deflector (not shown) for directing the airflow from aperture 322c laterally outboard of vehicle 2. In the illustrative embodiment shown, apertures 322a, 322b, 322c are sized to balance low speed cooling of radiator 152 without discharging an excessive amount of hot air on the operator.

Turning now to FIGS. 19-25, exhaust system 34 is shown in more detail. Exhaust system 34 is configured to receive exhaust gases from engine 12 and then direct those exhaust gases away from the operator and vehicle 2. Exhaust system 34 illustratively includes an exhaust header 330 fluidly coupled to engine 12, a catalytic converter 332, and mufflers 334, illustratively a right muffler 334a and a left muffler 334b. In the illustrative embodiment shown, exhaust header 330 includes a first exhaust duct 336 and a second exhaust duct 338. First exhaust duct 336 illustratively includes a mounting flange 340 for coupling to an exhaust port of a first cylinder 341 of engine 12. Similarly, second exhaust duct 338 includes a mounting flange 342 for coupling to an exhaust port of a second cylinder 343 of engine 12. It is contemplated, however, that exhaust ducts 336, 338 may be coupled to exhaust ports of a single cylinder or that one of exhaust ducts 336, 338 is non-functioning.

Exhaust ducts 336, 338 come together downstream at a wye fitting 344. Illustratively, first exhaust duct 336 is coupled to wye fitting 344 using a pipe clamp 346, and second exhaust duct 338 is integrally formed with wye fitting 344. In the illustrative embodiment shown, wye fitting 344 is positioned on a right side of vehicle 2 and is coupled to catalytic converter 332 using a pipe clamp 348. Catalytic converter 332 is positioned along an underside of vehicle 2 and laterally intermediate the left and right sides of vehicle 2. In one embodiment, exhaust system 34 may include an additional catalytic converter 333 positioned downstream of wye fitting 344 and upstream of catalytic converter 332. In an alternative embodiment, both exhaust ducts 336, 338 may be integrally formed with wye fitting 344 and catalytic converter 332. Therefore, pipe clamps 346, 348 would not be needed. Exhaust system 34 further includes an laterally outboard heat shield 339 positioned adjacent exhaust header 330.

Figure 20:
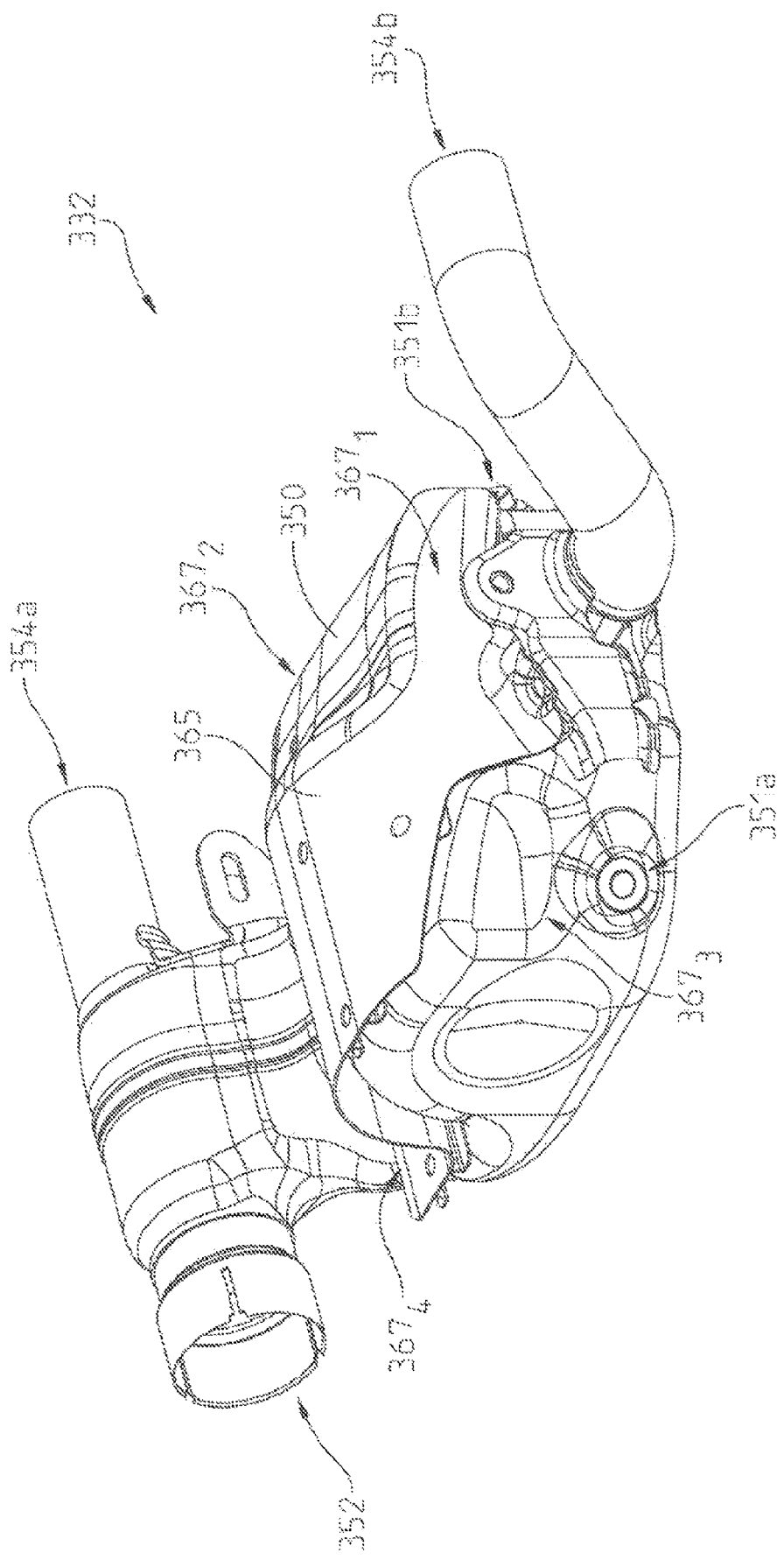
FIG. 20 is a perspective view of a catalytic convertor of the exhaust system of FIG. 19.
Figure 21:
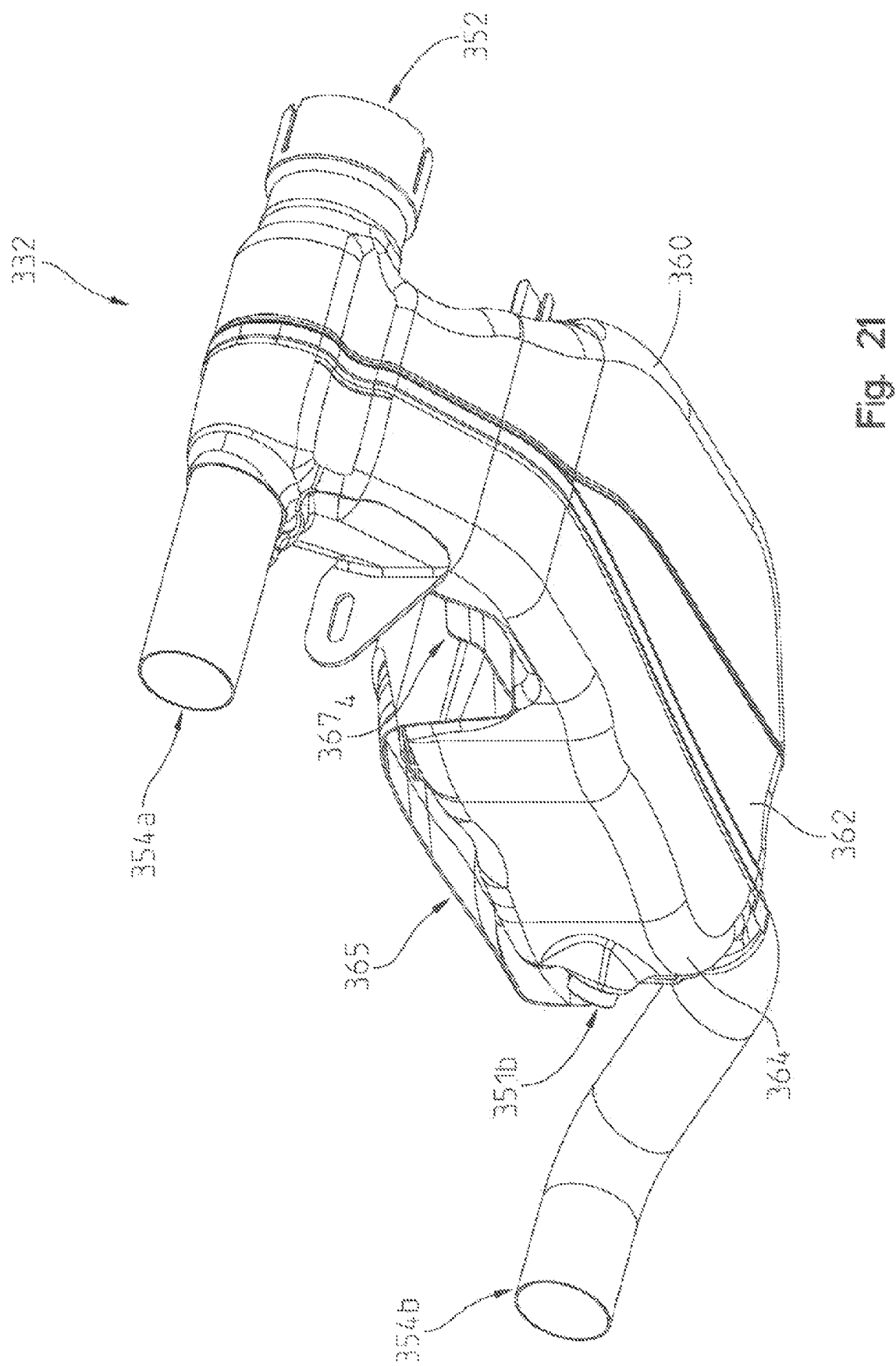
FIG. 21 is an underside perspective view of the catalytic convertor of FIG. 20.
Figure 22:
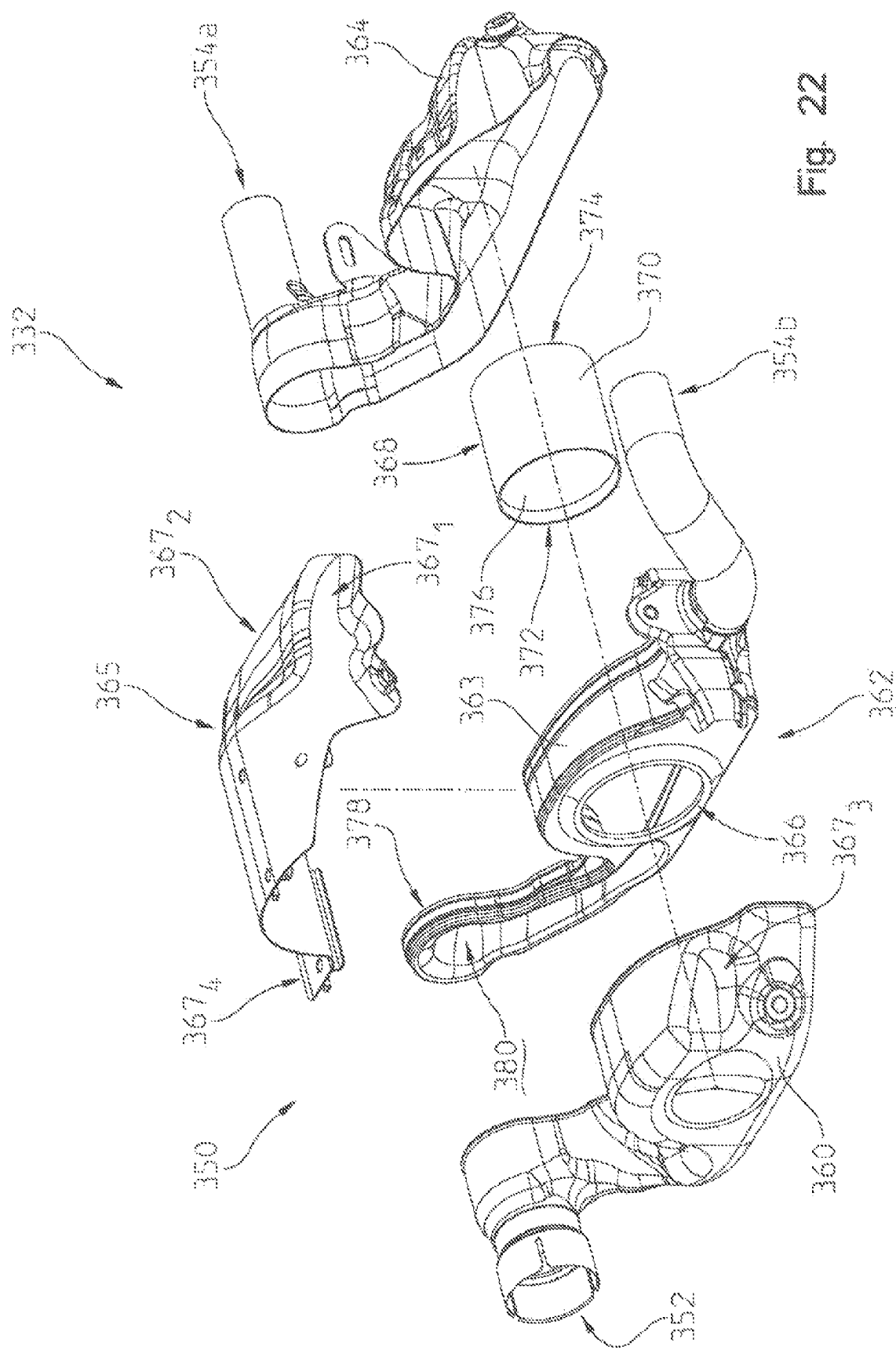
FIG. 22 is an exploded view of the catalytic convertor of FIG. 20.
Figure 23:
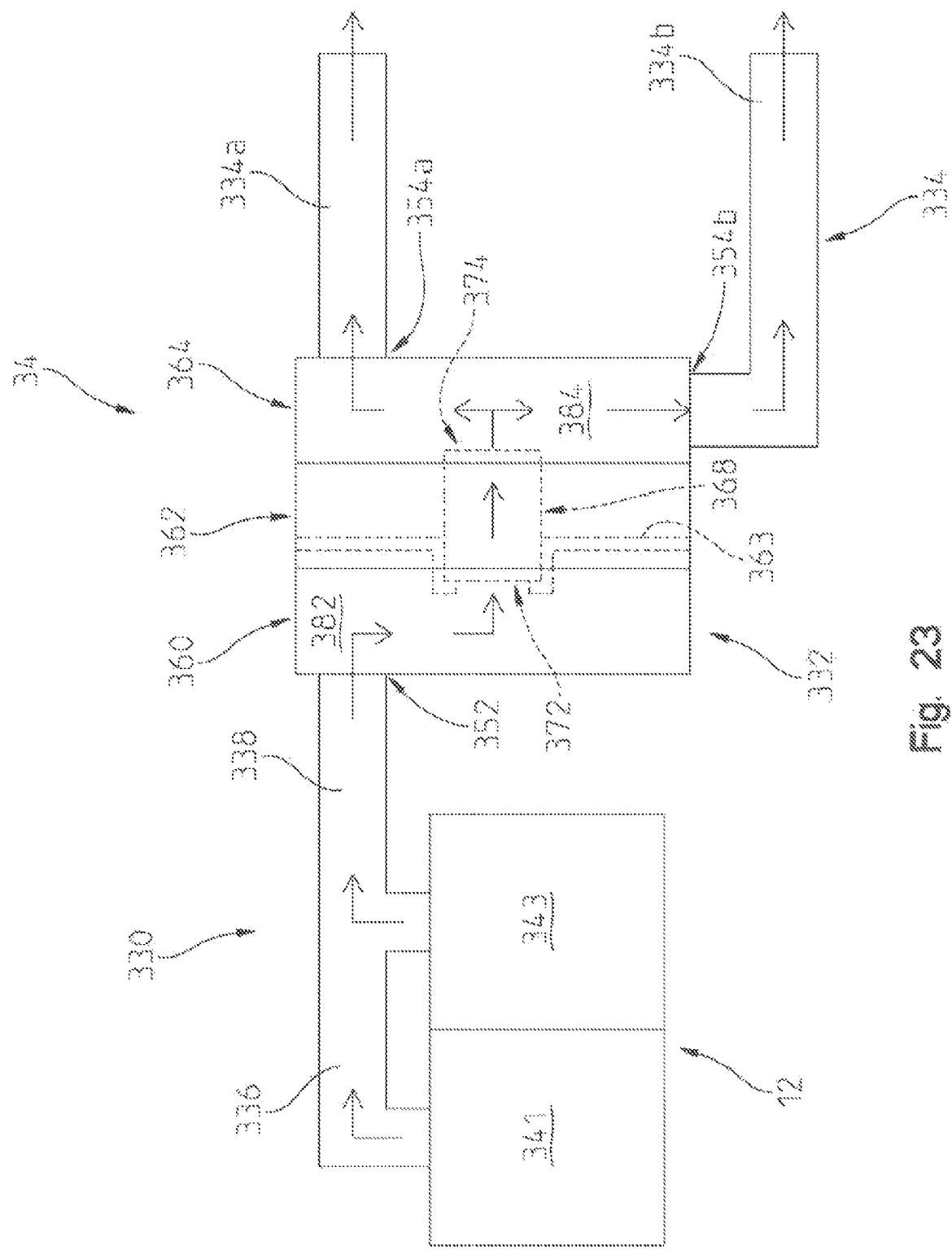
FIG. 23 is a schematic flow diagram of the exhaust system of FIG. 19.
Figure 24:
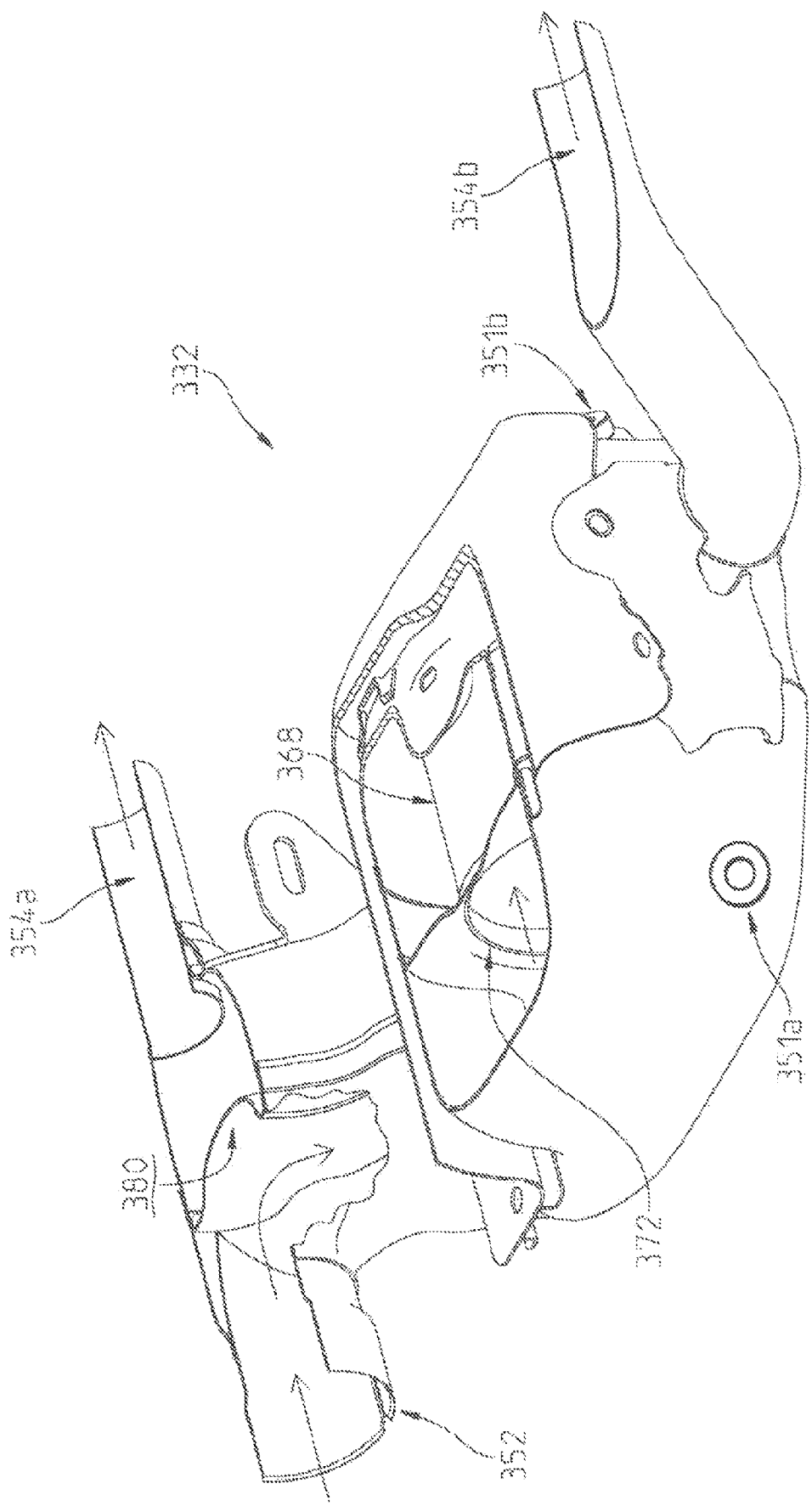
FIG. 24 is a partial cutaway of the catalytic convertor of FIG. 20.

Referring specifically to FIGS. 20-22, catalytic converter 332 is shown in more detail. In the illustrative embodiment shown, catalytic converter 332 comprises a turtle-shaped body 350 having an intake port 352, a right exhaust port or tailpipe 354a, and a left exhaust port or tailpipe 354b. Intake port 352 illustratively extends forward of body 350 and is configured to receive wye fitting 344. In the illustrative embodiment shown, intake port 352 is positioned on a right side of catalytic converter 332 and, therefore, on a right side of vehicle 2.

Body 350 includes a forward portion 360, a middle portion 362, and a rearward portion 364. Portions 360, 362, 364 are illustratively coupled together to form unitary body 350. In the illustrative embodiment shown, intake port 352 is integrally formed with forward portion 360, right tailpipe 354a is integrally formed with rear portion 364, and left tailpipe 354b is integrally formed with middle portion 362. Coupled to an upper surface of body 350 is a heat shield 365. In the illustrative embodiment shown, heat shield 365 is positioned vertically intermediate catalytic converter 332 and an undercarriage of vehicle 2. In the illustrative embodiment shown, body 350 and heat shield 365 include a plurality of clearance areas 367, illustratively clearance areas $367_1$-$367_4$, sized and shaped to receive various components, such as, for example, frame 4, engine 12, at least one swingarm, a transmission belt, and rear wheel 8. An advantage, among others, of clearance areas 367 is that catalytic converter 332 may be packaged closely adjacent the undercarriage of vehicle 2. Body 350 also includes a plurality of ports 351, illustratively ports 351a, 351b, in which a sensor, such as an oxygen sensor, may be placed. In the illustrative embodiment shown, port 351a is positioned upstream of catalytic converter 322 and port 351b is positioned downstream of catalytic converter 322. An advantage of the arrangement of ports 351a, 351b as shown is that measurements before and after catalytic converter 322 may be measured.

Middle portion 362 illustratively includes an interior wall 363 having a central aperture 366 configured to support a catalytic converter cartridge 368. Catalytic converter cartridge 368 comprises a generally cylindrical body 370 having a first open end 372 and a second open end 374 opposite first open end 372. A center 376 of catalytic converter cartridge 368 comprises a material, such as, for example, a ceramic monolith having a honeycomb structure, suitable for catalyzing exhaust gases from engine 12. Middle portion 362 further includes a wing portion 378 extending laterally from central aperture 366. Wing portion 378 includes a contoured surface 380 configured to aid in funneling exhaust gases from intake port 352 towards central aperture 366. Illustratively contoured surface 380 is teardrop shaped.

During operation of engine 12, exhaust gases exit each of cylinders 341, 343 and enter exhaust header 330. The exhaust gases flow along exhaust header 330 and enter a first chamber 382 of catalytic converter 332 through intake port 352. First chamber 382 is defined by forward portion 360 and middle portion 362. Once the exhaust gases have entered first chamber 382, contoured surface 380 directs the exhaust gases towards central aperture 366 and catalytic converter cartridge 368. The exhaust gases then pass from first chamber 382 through catalytic converter cartridge 368 and enter a second chamber 384 defined by middle portion 362 and rear portion 364. Catalytic converter cartridge 368 may catalyze the exhaust gases as they pass through it. Once the exhaust gases have entered second chamber 384, the exhaust gases are directed to mufflers 334a, 334b via exhaust ports 354a, 354b, respectively.

Figure 25:
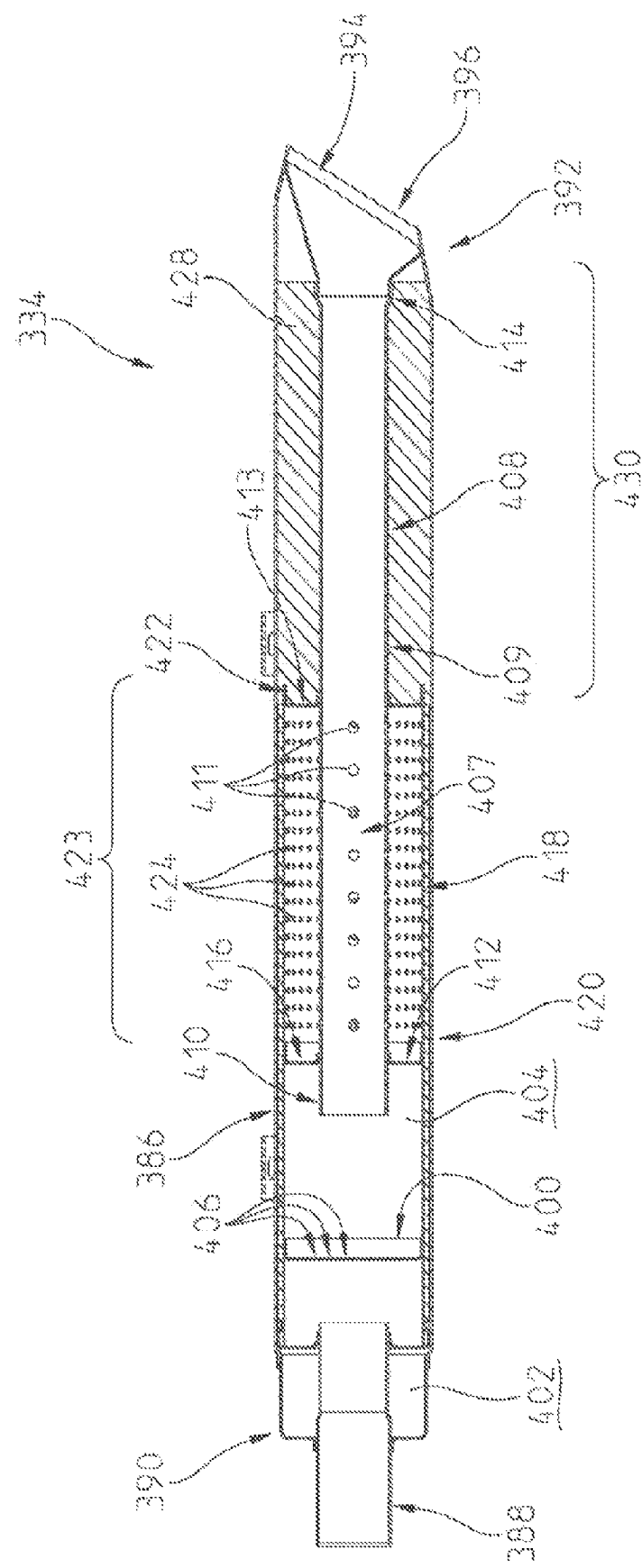
FIG. 25 is a cross-sectional view of a muffler of the exhaust system of FIG. 19.
Figure 26:
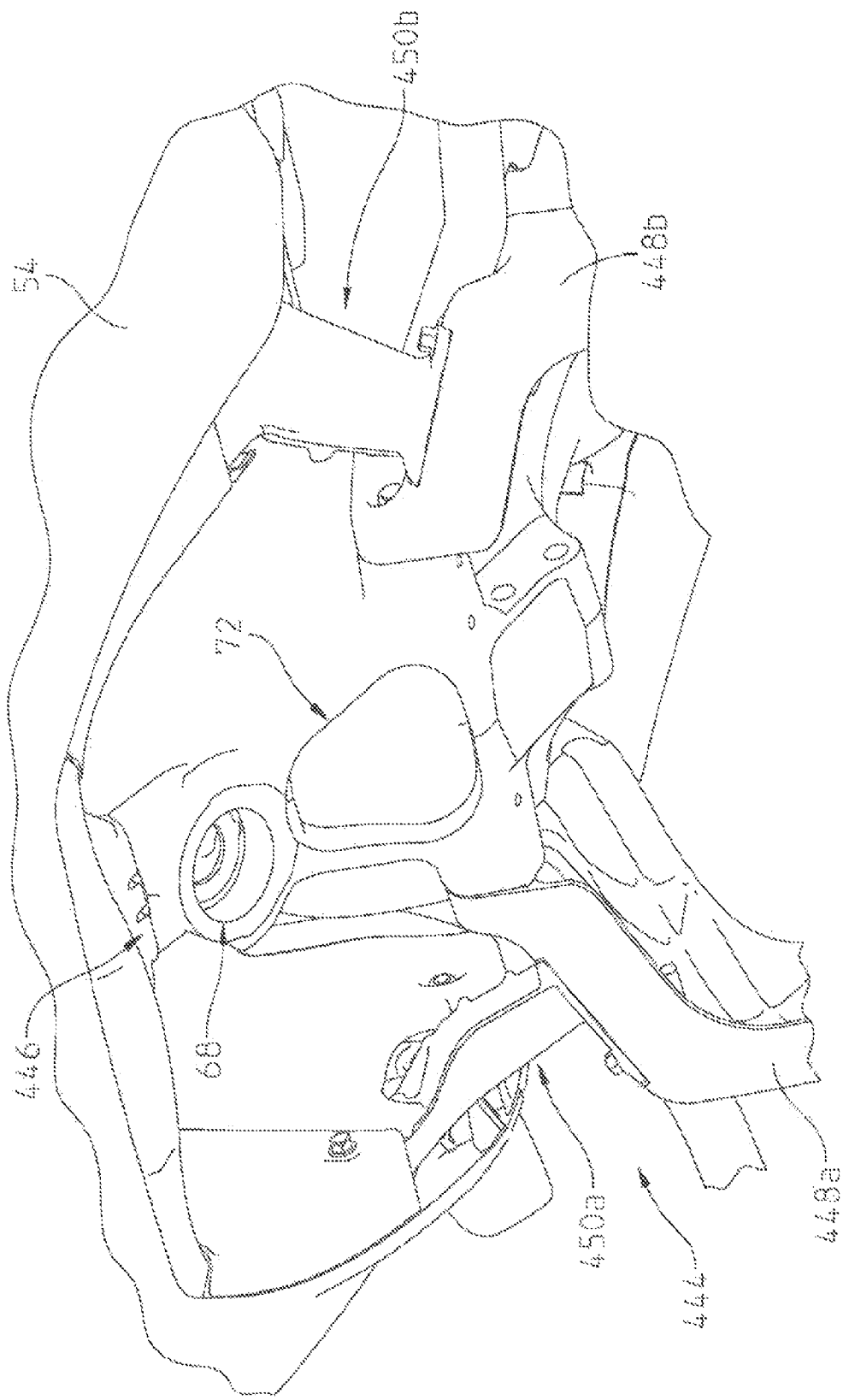
FIG. 26 is an underside perspective view of a front fairing and the main frame portion of the frame assembly of FIG. 13.
Figure 27:
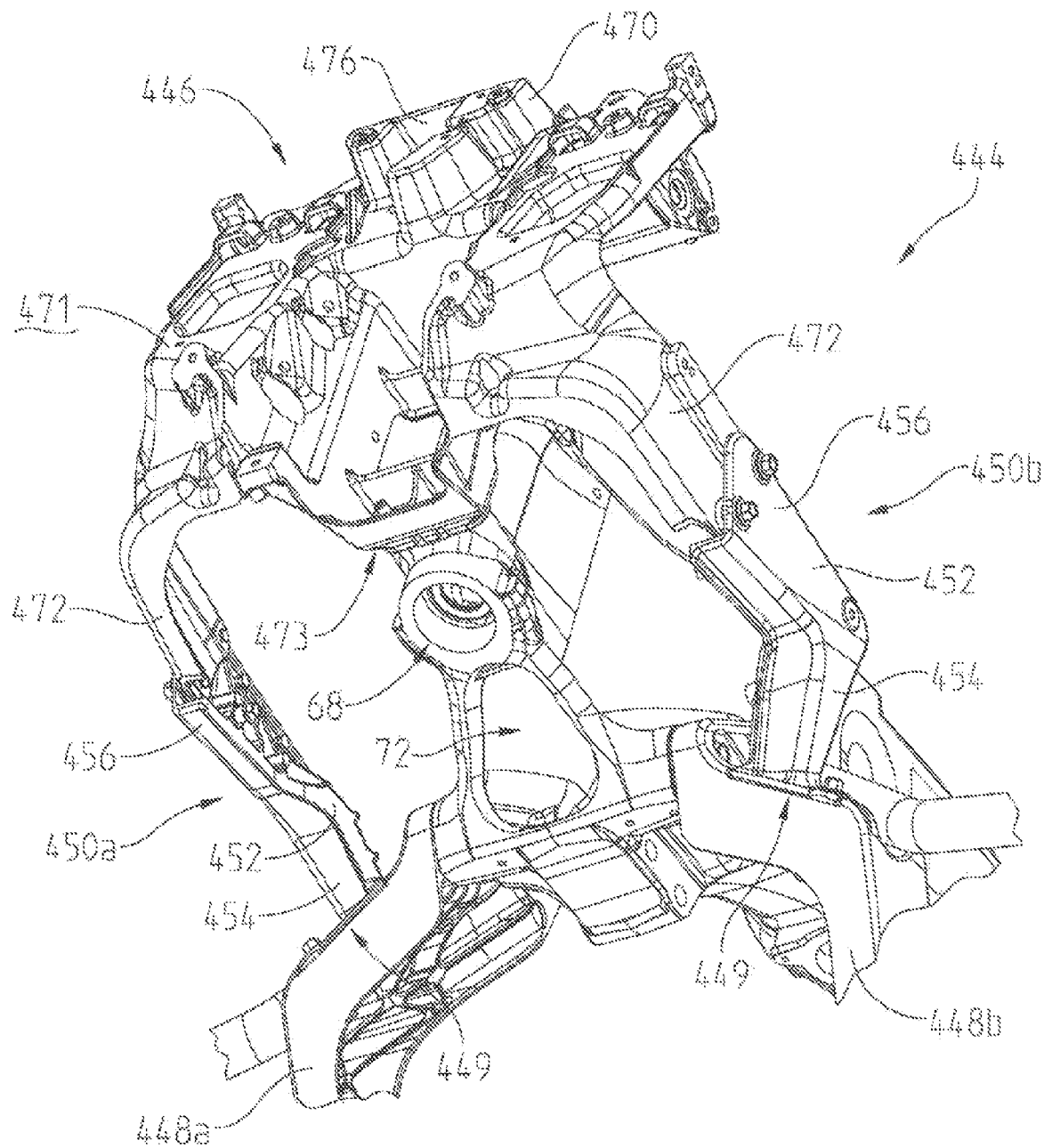
FIG. 27 is an underside perspective view of the main frame portion and a mounting assembly for the front fairing of FIG. 26.
Figure 28:
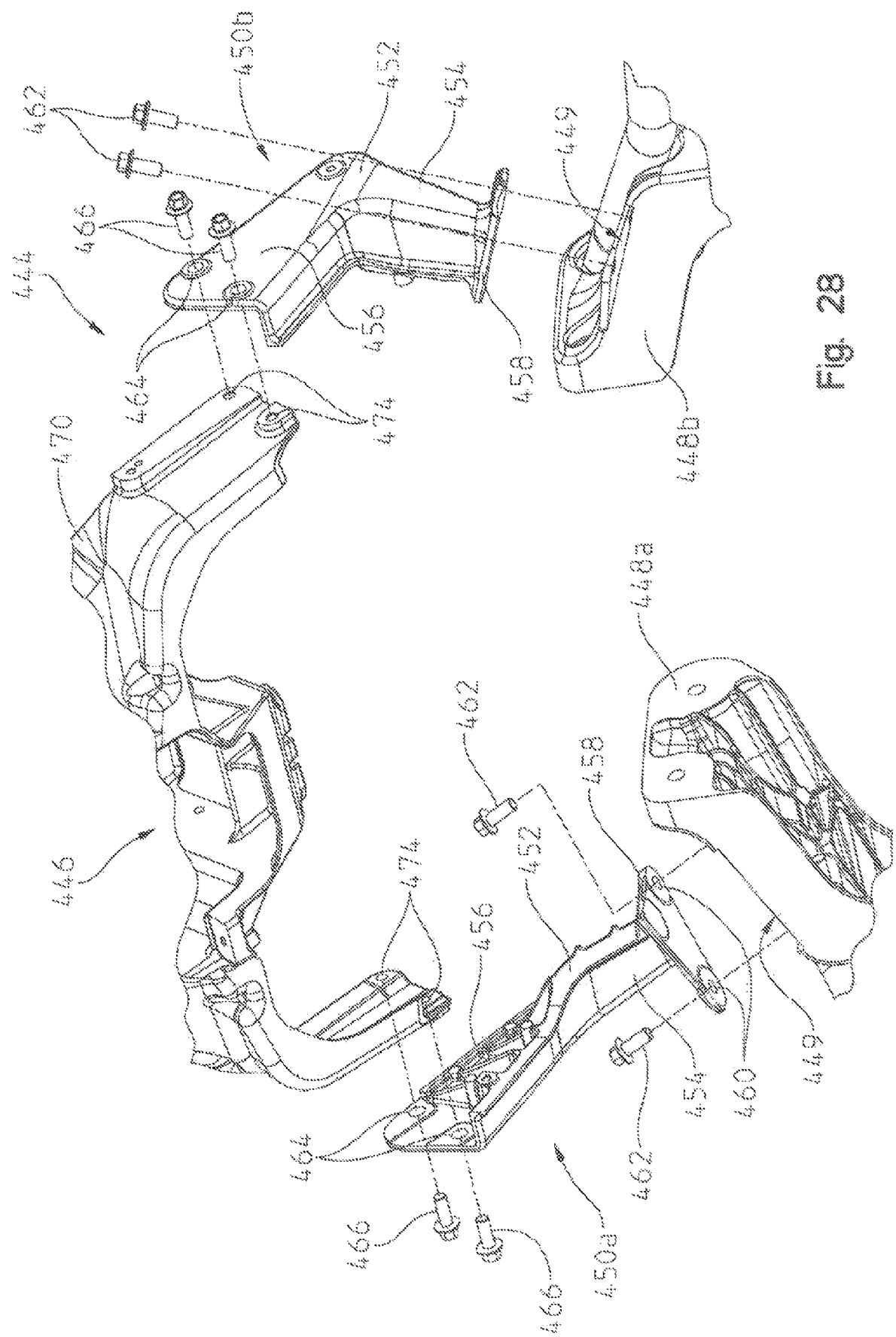
FIG. 28 is an exploded view of the main frame portion and the mounting assembly of FIG. 27.
Figure 29:
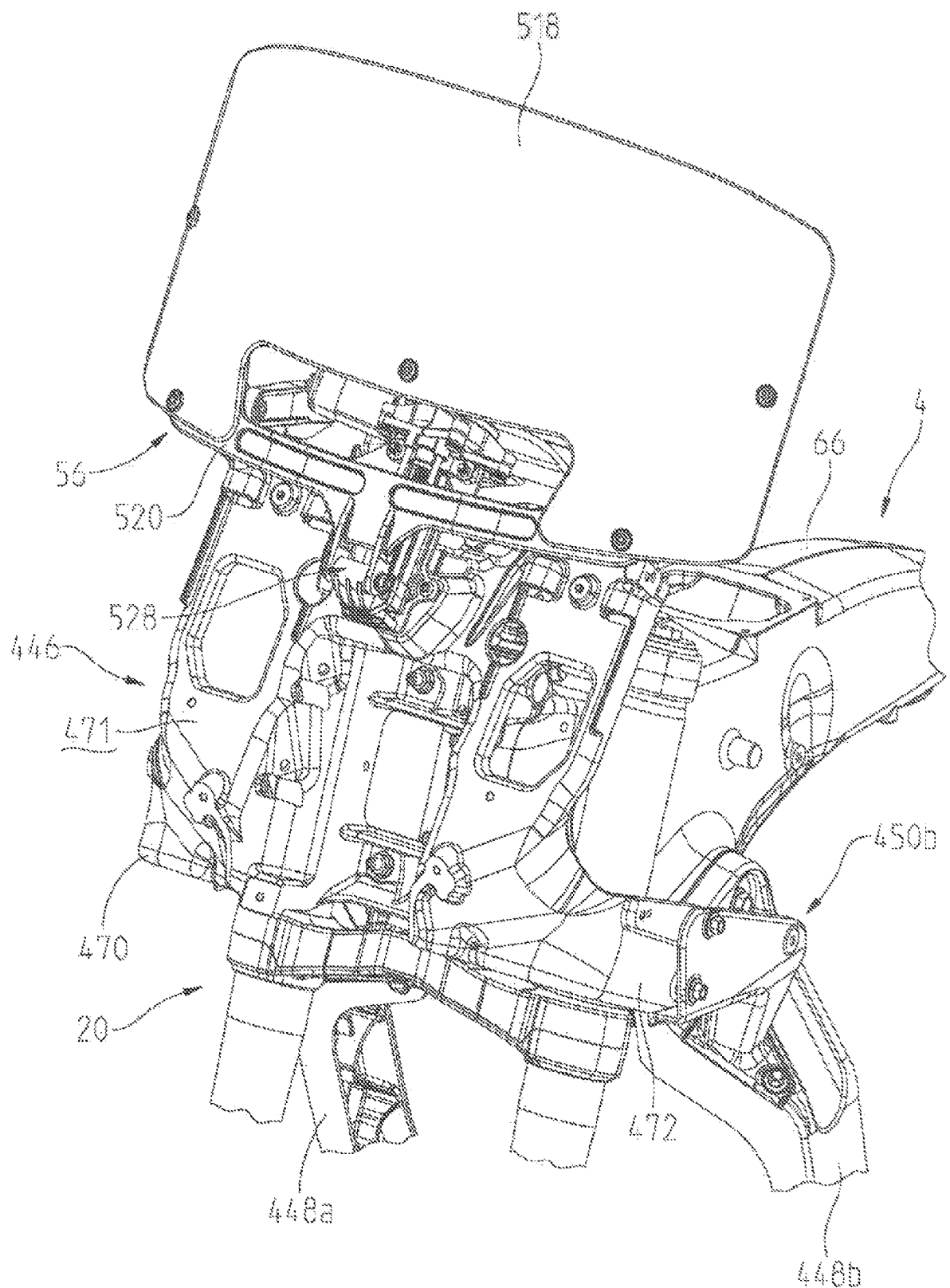
FIG. 29 is a front perspective view of a windshield assembly coupled to the mounting assembly of FIG. 28.

Referring now to FIG. 25, an illustrative muffler 334 is shown. In the illustrative embodiment shown, mufflers 334a, 334b are identical. Muffler 334 illustratively comprises a cylinder housing 386 having a coupler 388 for coupling muffler 334 to a respective one of tailpipes 354 at a first end 390 of cylinder housing 386. Cylinder housing 386 further includes a muffler tip 394 positioned at a second end 392 of cylinder housing 386. Illustratively, muffler tip 394 comprises a bell or funnel shaped opening 396 and is supported within an interior of cylinder housing 386. Positioned longitudinally rearward of coupler 388 is a first baffle 400 separating a first chamber 402 and a second chamber 404. First chamber 402 is illustratively positioned intermediate coupler 388 and first baffle 400, and second chamber 404 is positioned intermediate baffle 400 and second end 392. First baffle 400 illustratively includes a plurality of apertures 406. In the illustrative embodiment shown, apertures 406 illustratively comprises fifty-two apertures.

Mufflers 334 further includes an outlet pipe 408 supported within cylinder housing 386. More specifically, a first end 410 of outlet pipe 408 is supported by a second baffle 412 and a second end 414 of outlet pipe 408 is coupled to muffler tip 394. In this way, outlet pipe 408 fluidly couples second chamber 404 to muffler tip 394. In the illustrative embodiment shown, a terminal end of first end 410 illustratively extends forward of second baffle 412 and into second chamber 404. First end 410 is illustratively positioned intermediate first baffle 400 and second baffle 412. Like baffle 400, baffle 412 includes a plurality of apertures 416, illustratively thirty-four apertures. A portion 407 of outer surface 409 of outlet pipe 408 illustratively includes a plurality of radially spaced apart apertures 411. In the illustrative embodiment shown, the plurality of apertures 411 illustratively comprises thirty-two apertures.

Baffles 400, 412 are coupled to an inner conduit 418, which is supported within cylinder housing 386. Inner conduit 418 illustratively extends from a first end 420 proximate coupler 388 to a second end 422 longitudinally spaced rearward of first end 420. In the illustrative embodiment shown, second end 422 of inner conduit 418 is positioned intermediate second baffle 412 and muffler tip 394 and includes a third baffle 413. A portion 423 of inner conduit 418 from proximate second baffle 412 to proximate second end 422 includes a plurality of apertures 424 radially spaced about an outer surface 426 of inner conduit 418. In the illustrative embodiment shown, portion 423 of inner cylinder 418 including apertures 424 and portion 407 of outlet pipe 408 having apertures 411 overlap. Muffler 334 further includes insulation 428 surrounding a portion 430 of inner conduit 418. In the illustrative embodiment shown, insulation 428 is positioned intermediate second end 422 of inner conduit 418 and muffler tip 394. As a result, insulation 428 abuts both third baffle 413 and muffler tip 394.

Exhaust gases from exhaust port 354 enter first chamber 402 of mufflers 334 via coupler 388 and pass through apertures 406 of first baffle 400 into second chamber 404. Exhaust gases within second chamber 404 flow to outlet pipe 408 and may either travel along outlet pipe 408 and exit mufflers 334 at muffler tip 394 or exit outlet pipe 408 via apertures 411. Exhaust gases that exit outlet pipe 408 via radially spaced apart apertures 411 enter an interior volume 442 of inner conduit 418 spaced radially intermediate outlet pipe 408 and inner conduit 418. These exhaust gases may circulate within interior volume 442 before reentering outlet pipe 408 through apertures 411 and exiting mufflers 334 at muffler tip 394. An advantage, among others, of circulating at least some of the exhaust gases within interior volume 442 is that the acoustic level of exiting exhaust gases may be reduced.

Referring now to FIGS. 26-30, a front frame assembly 444 is shown in more detail. Front frame assembly 444 is coupled to forward end 70 of main portion 66 of frame 4 proximate head tube 68. More specifically, front frame assembly 444 illustratively includes a fairing support mount 446, down tubes 448, and brackets 450. Down tubes 448, illustratively down tubes 448a, 448b, are coupled to forward end 70 of main portion 66 of frame 4 and extend generally vertically downward. In the illustrative embodiment shown, a vertically lower end of tubes 448 support a longitudinally forward portion of engine 12. In addition, cooling system 150, specifically radiator 152, is supported intermediate down tubes 448a, 448b. Illustratively, tubes 448 are formed from a casting process, such as high pressure die casting, for example.

Brackets 450, illustratively brackets 450a, 450b, are coupled to an upper shoulder 449 of tubes 448 and to fairing support mount 446. In this way, brackets 450 couple fairing support mount 446 to tubes 448 and transfer the weight of front fairing 54 to tubes 448. Brackets 450 illustratively comprise a generally L-shaped body 452 having a generally vertical leg 454 coupled to upper shoulder 449 and a generally horizontal leg 456 coupled to fairing support mount 446. Vertical leg 454 includes a mounting flange 458 that is received on upper shoulder 449 of tubes 448. Mounting flange 458 extends generally perpendicular to vertical leg 454 and includes apertures 460, which are configured to receive a respective fastener 462 for coupling vertical leg 454 to tubes 448. Horizontal leg 456 includes apertures 464, which are configured to receive a respective fastener 466 for coupling to fairing support mount 446. Illustratively, brackets 450 are formed from a casting process, such as high pressure die casting, for example.

In the illustrative embodiment shown, fairing support mount 446 is configured to support front fairing 54 and includes a central mounting 470 that is coupled to forward end 70 of main portion 66 of frame 4 longitudinally forward of head tube 68. Central mounting 470 comprises a longitudinally forward face 471 and a longitudinally rearward face 473. Rearward face 473 includes a plurality of apertures 475 configured to receive mounting bolts 477 extending from forward end 70 for coupling central mounting 470 to forward end 70. Windshield assembly 56 is supported for movement on forward face 471. Extending longitudinally rearward from central mounting 470 are wings 472. Wings 472 include apertures 474, which are configured to receive a respective one of fasteners 466 for coupling brackets 450 to fairing support mount 446. Central mounting 470 includes openings 476, the significance of which will be explained herein.

Figure 30:
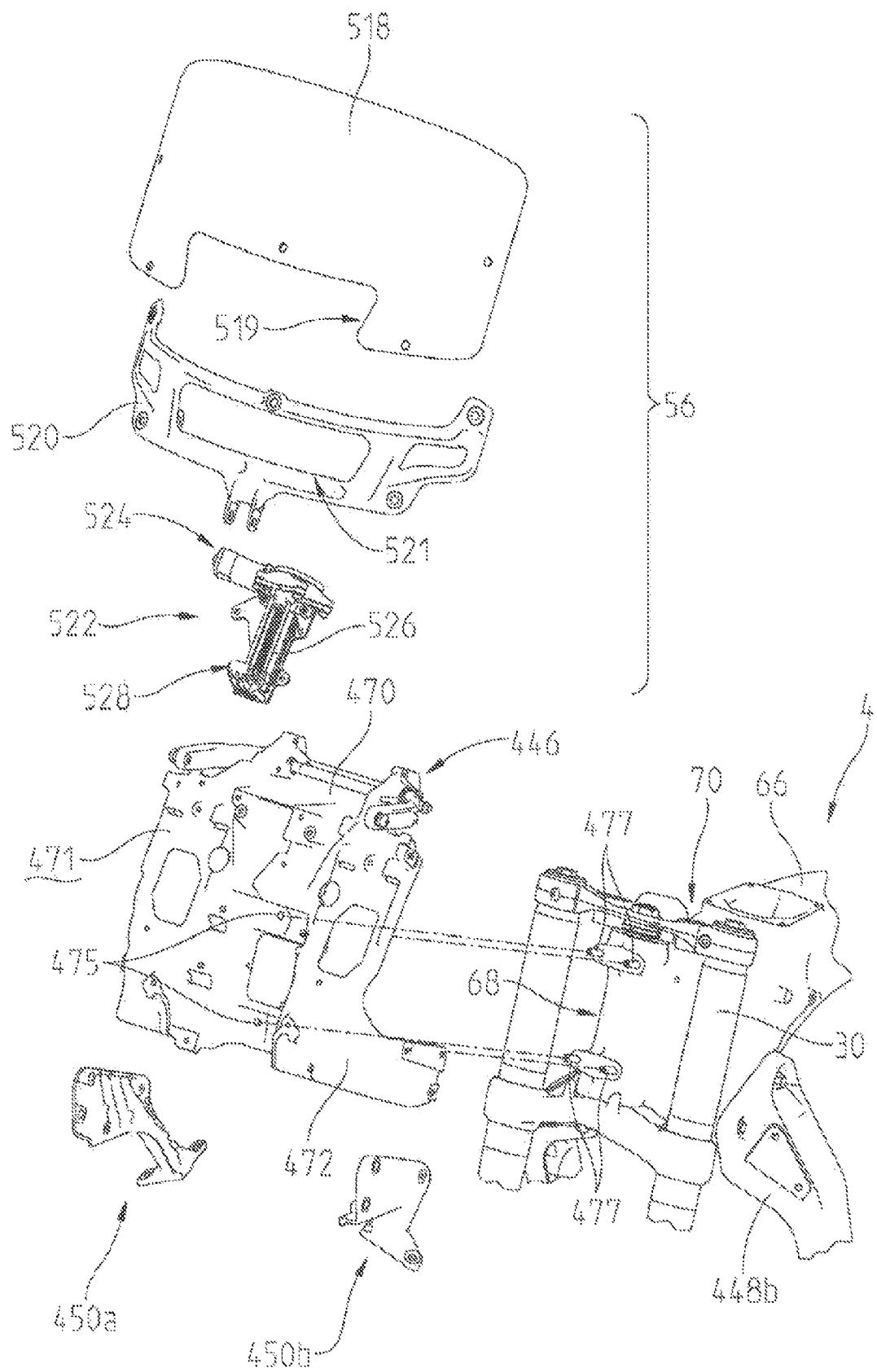
FIG. 30 is an exploded view of the windshield assembly and the mounting assembly of FIG. 29.

Windshield assembly 56 is shown in more detail in FIG. 30. Windshield assembly 56 illustratively includes a windscreen 518 coupled to a bracket 520 and a motorized base 522. Motorized base 522 is coupled to forward face 471 of fairing support mount 446 and includes a motor 524 drivingly engaged with a threaded rod 526. Threaded rod 526 includes a carriage 528, which is linearly repositionable along threaded rod 526 as threaded rod 526 rotates about its axis. Bracket 520 is coupled to and moveable with carriage 528. Bracket 520 includes a recess 521, which corresponds to a recess 519 of windscreen 518 when windscreen 518 is coupled to bracket 520.

Motorized base 522 permits an operator or a control system of vehicle 2 to adjust a vertical height of windscreen 518 relative to front fairing 54. More specifically, when motor 524 is actuated to raise windscreen 518, threaded rod 526 will rotate about its axis in a first direction and carriage 528 will travel along threaded rod 526 until carriage 528 reaches the end of its travel and windscreen 518 is raised to its highest point (see FIG. 32) or an intermediate point therebetween. To lower windscreen 518, motor 524 is actuated to lower windscreen 518 and threaded rod 526 will rotate about its axis in a second direction opposite the first direction. carriage 528 will travel along threaded rod 526 in the opposite direction relative to when windscreen 518 was being raised until carriage 528 reaches the end of its and windscreen 518 is lowered to its lowest position (see FIG. 33) or an intermediate point therebetween. Accordingly, an operator may vertically reposition windscreen 518, for example, to reduce wind buffeting on an operator's head and body during operation of vehicle 2.

Figure 31:
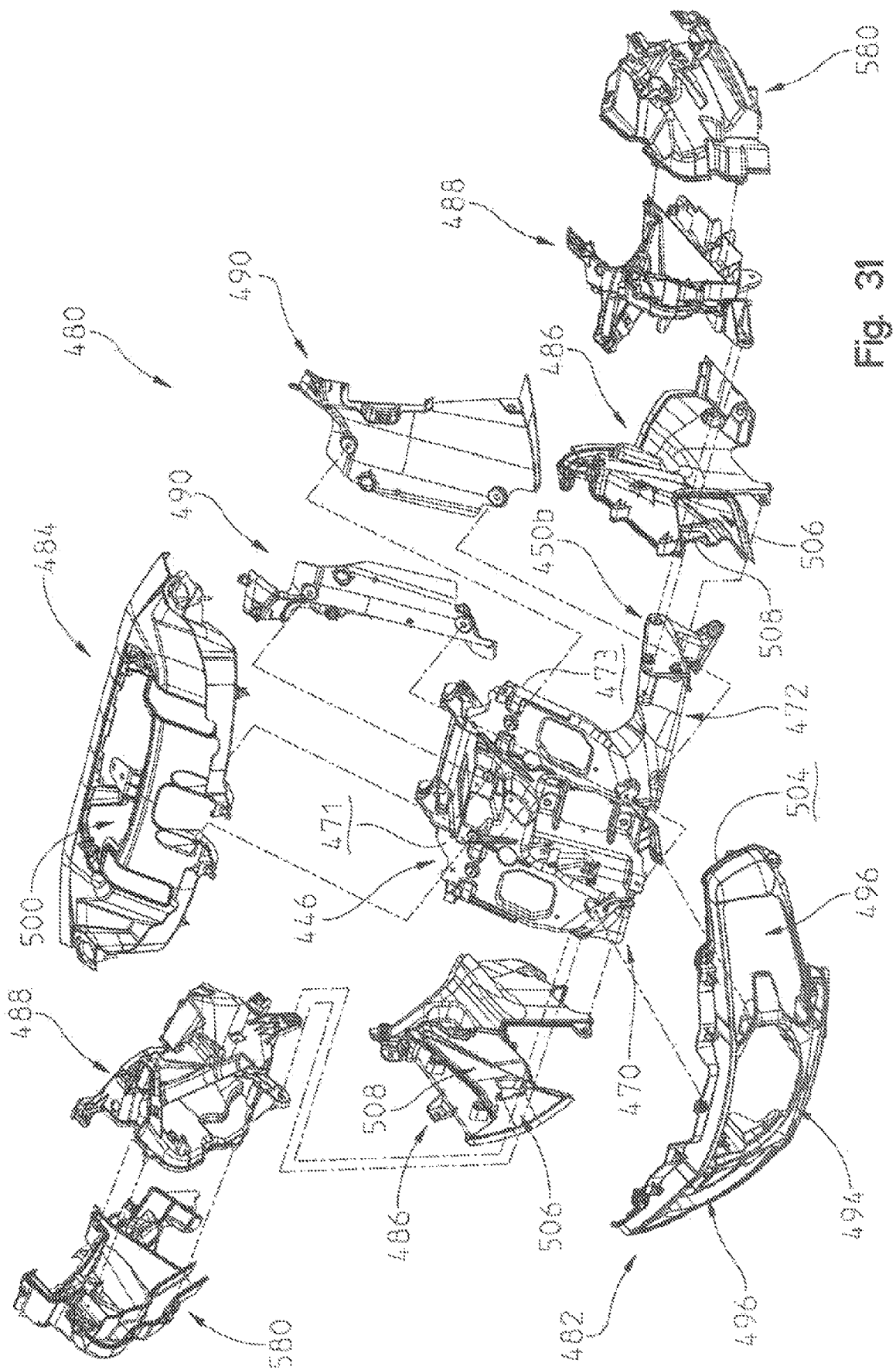
FIG. 31 is an exploded view of the front fairing of the mounting assembly of FIG. 30, an inner fairing cover, and a gauge cover.
Figure 34:
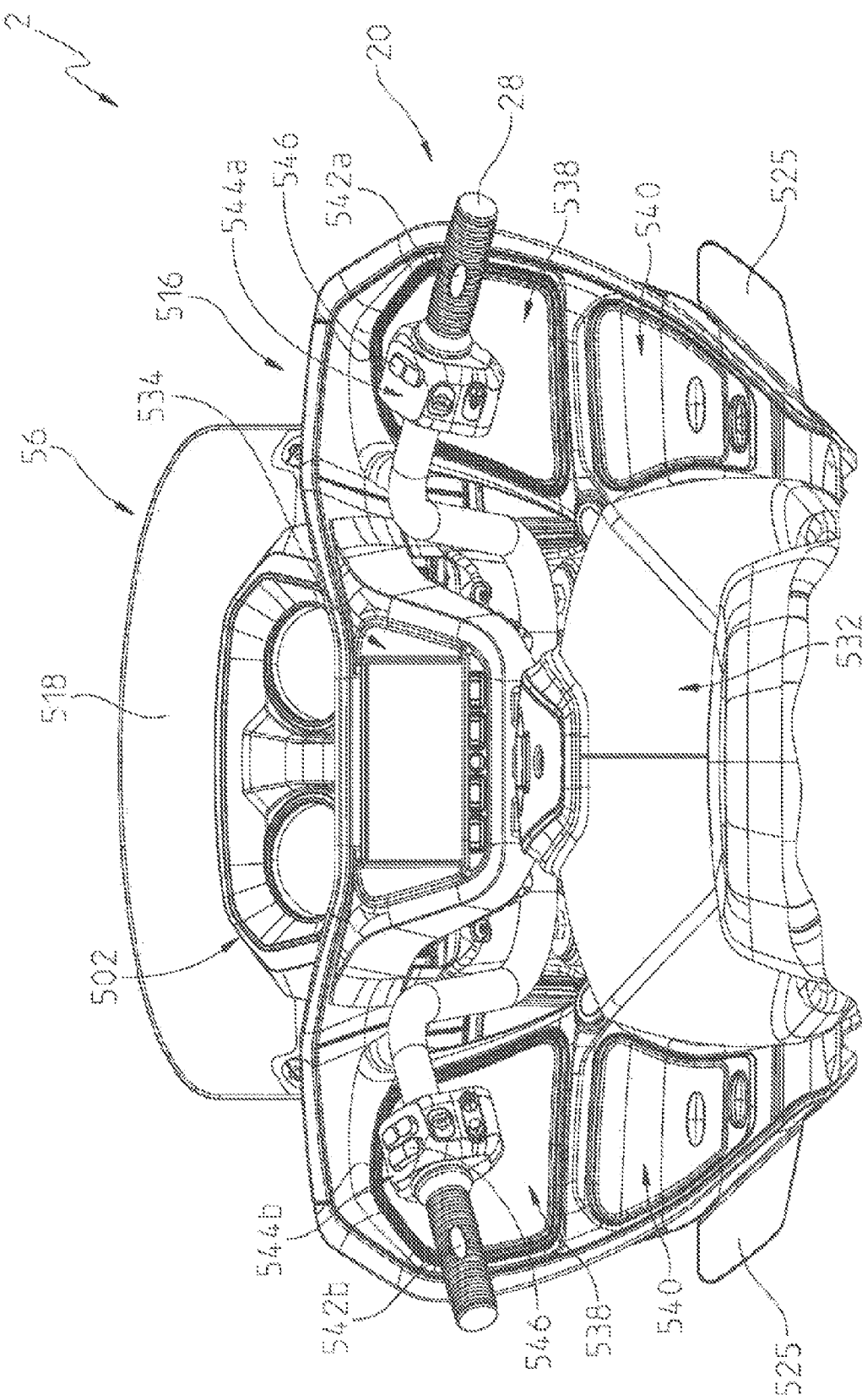
FIG. 34 is a rear view of the front fairing, the gauge cover, and the windshield assembly of FIG. 32.

Turning now to FIG. 31, a framework 480 of front fairing 54 is shown in more detail. Framework 480 includes a plurality of frames coupled to fairing support mount 446, specifically a headlight frame 482, a dash frame 484, a pair of vent frames 486, a pair of interior storage and speaker volume frames 488, a pair of exterior storage and speaker volume frames 580, and a pair of vertical frames 490. Headlight frame 482 is coupled to forward face 471 of central mounting 470 of fairing support mount 446 and is configured to support a headlight 44 (see FIG. 32) within a central opening 494. Headlight frame 482 also includes a pair of vent openings 496 oriented symmetrically about central opening 494. Vent openings 496 are in fluid communication with an internal passageway a cockpit 516 of vehicle 2 (see FIG. 34). Headlight frame 482 may also support additional lights, such as running lights or turn signals.

Dash frame 484 is coupled to an upper portion of forward face 471 of central mounting 470 and includes at least one recess 498 that receives windshield assembly 56. Dash frame 484 also includes a recess 500 configured to support a gauge assembly 502. Vent frames 486 are coupled to a respective one of interior storage and speaker volume frames 488 and configured to engage a rear face 504 of headlight frame 482. Coupled to an interior side of each of vent frames 486 is a vent conduit 508. Together, vent frames 486 and vent conduits 508 define an opening 506 which engages rear face 504 of headlight frame 482 at vent openings 496. Interior storage and speaker volume frames 488 are coupled to rearward face 473 of central mounting 470 laterally outwardly of forward end 70 of frame 4 and longitudinally rearward of central mounting 470. Interior storage frames 488 are one-half of a storage assembly 510 (see FIG. 44), which will be discussed in more detail herein, and are coupled to wings 472 and brackets 450 laterally outwardly of vent frames 486.

Figure 32:
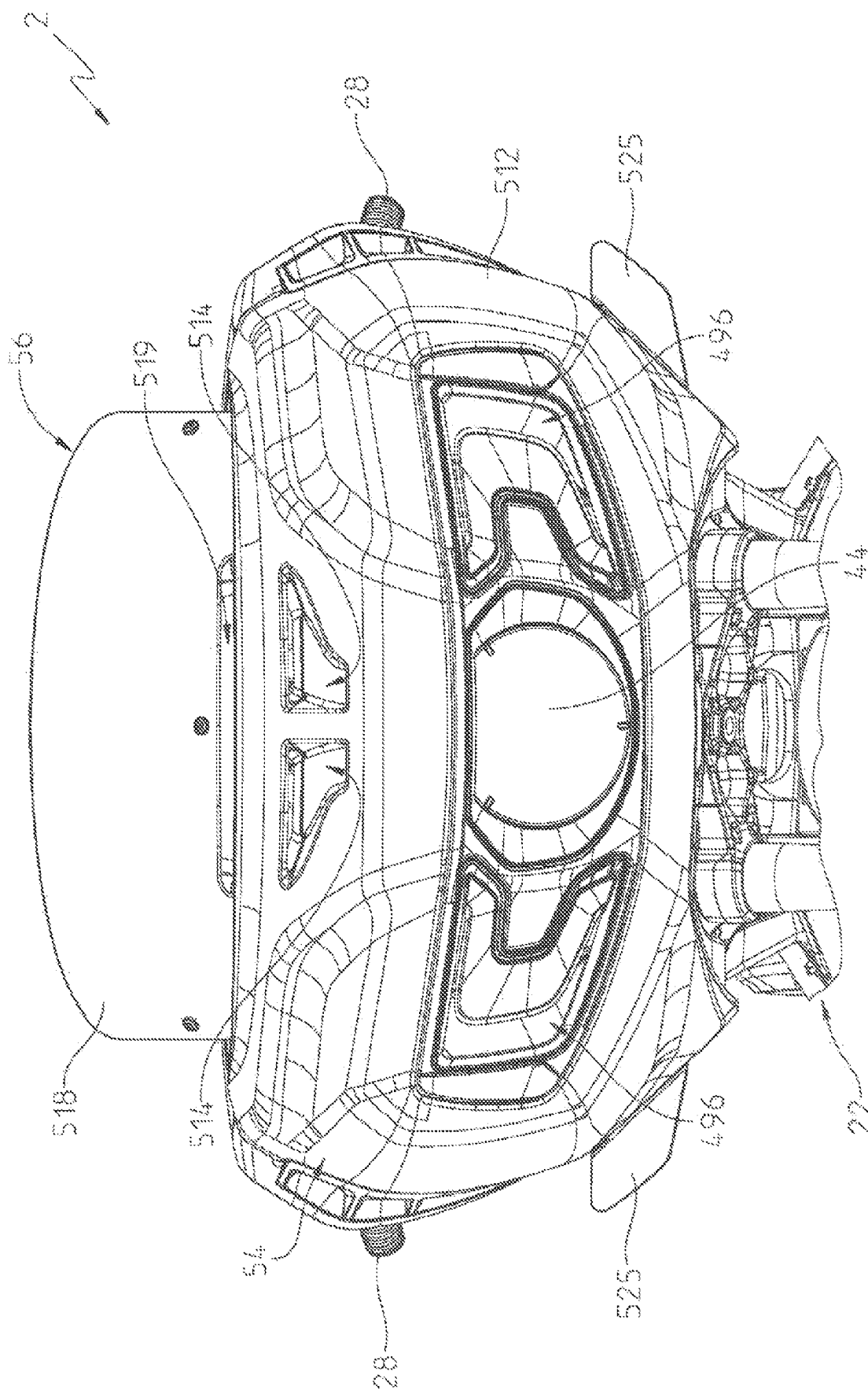
FIG. 32 is a front view of the front fairing and the windshield assembly, with the windshield assembly in an extended configuration.
Figure 33:
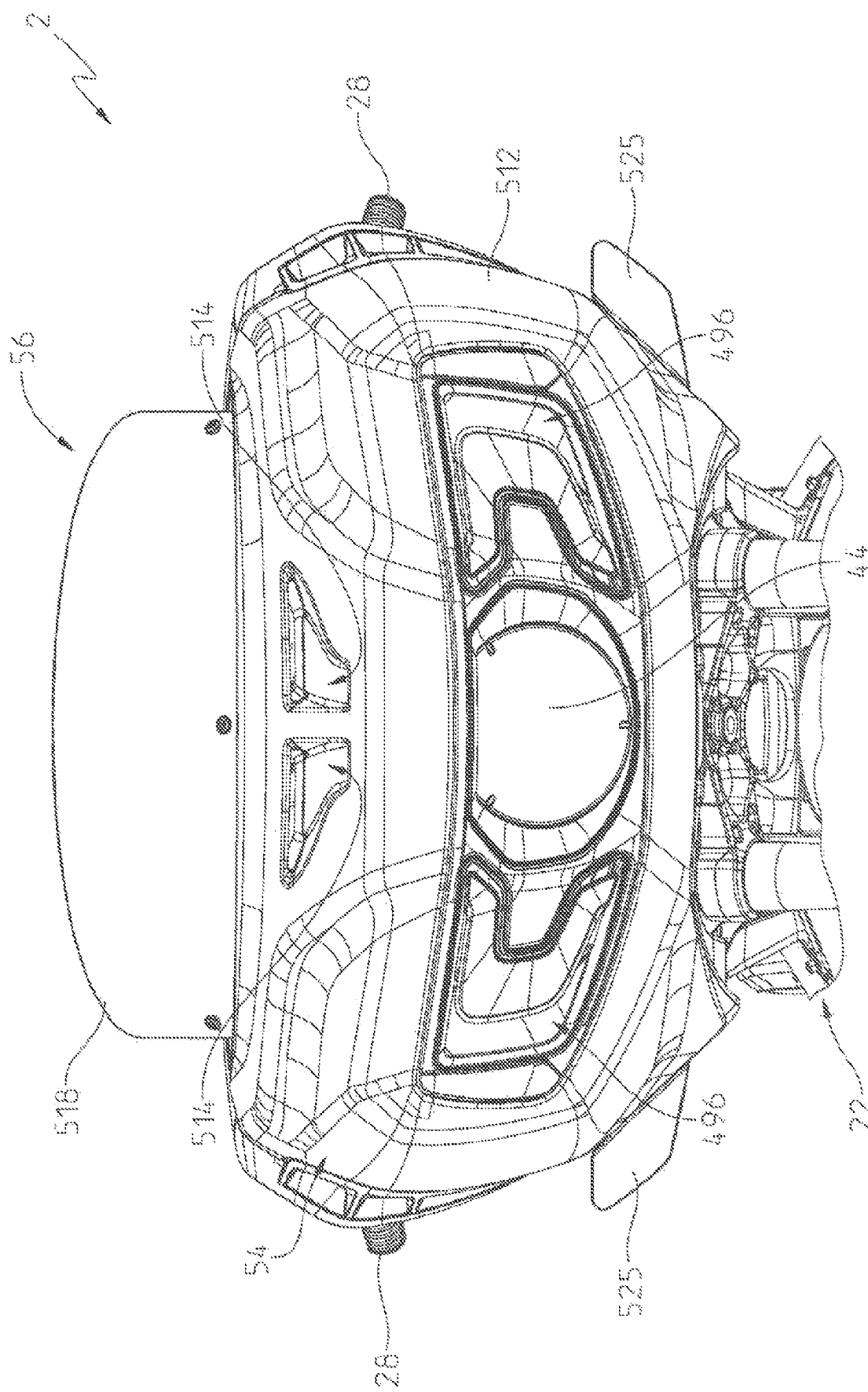
FIG. 33 is a further front view of the front fairing and the windshield assembly, with the windshield assembly in a retracted configuration.
Figure 35:
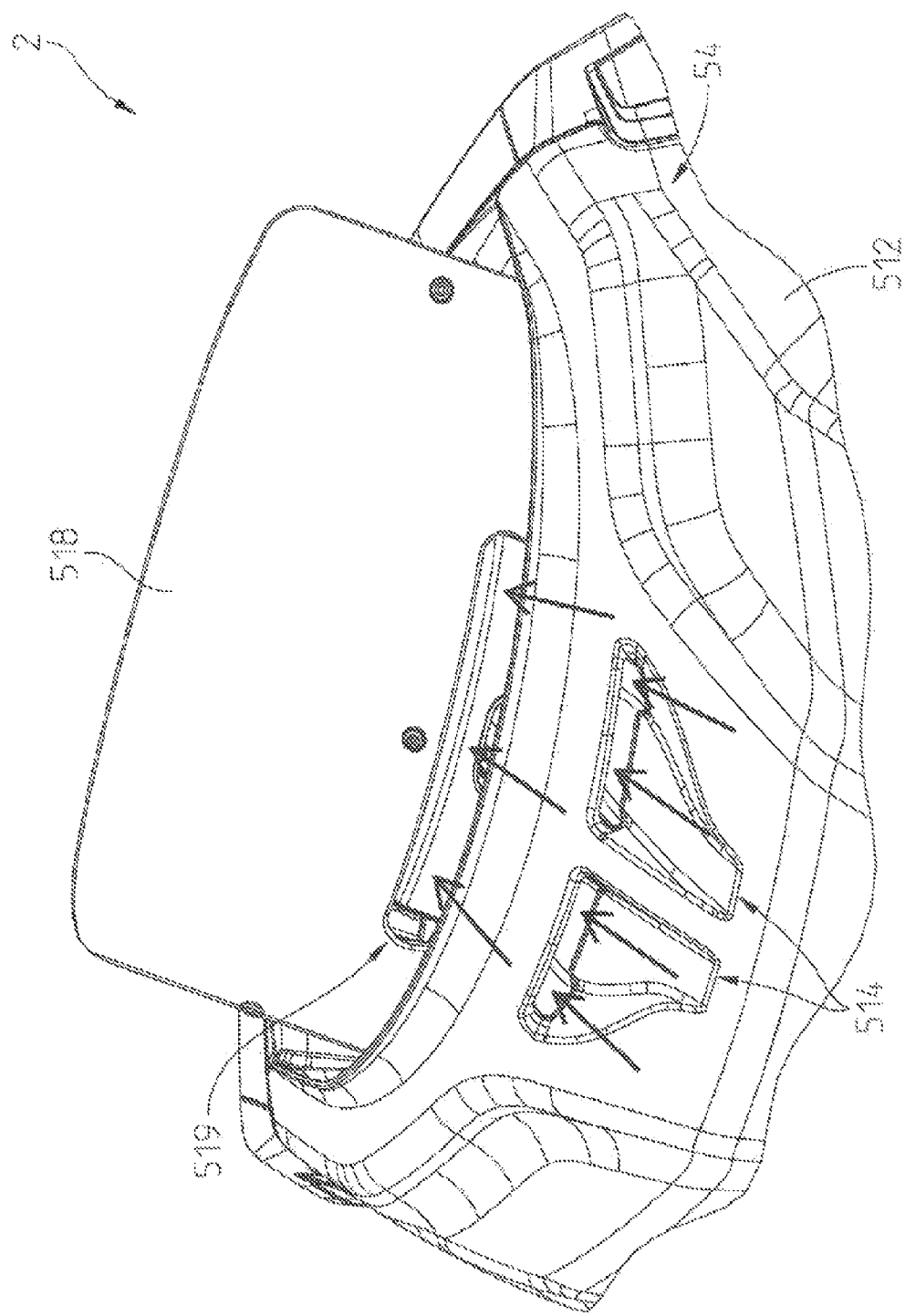
FIG. 35 is a further left front perspective view of the front fairing and the windshield assembly of FIG. 32 with diagrammatic arrows indicating a flow of air through the front fairing and the windshield assembly when the windshield is in the extended position.
Figure 36:
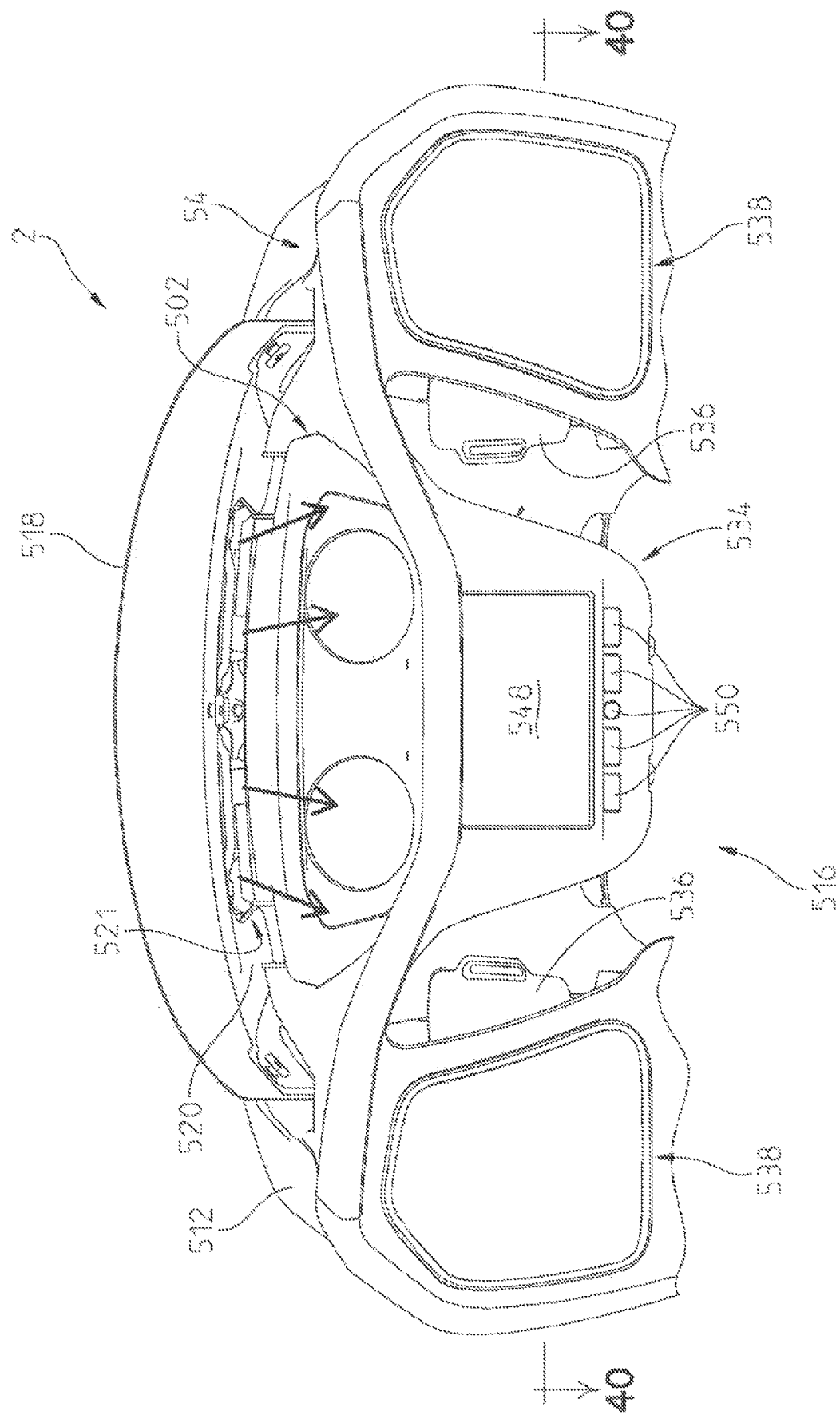
FIG. 36 is a further rear view of the front fairing and the windshield assembly of FIG. 32 with diagrammatic arrows indicating a flow of air through the front fairing and the windshield assembly when the windshield is in the extended position.

Turning now to FIGS. 32-37, front fairing 54 includes an outer shell 512 supported on framework 480. As shown in FIG. 32, outer shell 512 includes pair of inlets 514 positioned vertically above headlight 44. Illustratively, inlets 514 are positioned symmetrically about and adjacent a longitudinal centerline of vehicle 2. It is contemplated, however, that inlets 514 could be spaced further laterally outward of the longitudinal centerline of vehicle 2. In the illustrative embodiment shown, inlets 514 are in fluid communication with cockpit 516 of vehicle 2 (see FIG. 34). More specifically, inlets 514 are in fluid communication with recess 519 of windscreen 518 and recess 521 of bracket 520. As shown in FIGS. 35-37 air flows into inlets 514 and is communicated to cockpit 516 via recesses 519, 521 and around gauge assembly 502. If windscreen 518 is raised to a height sufficient for recesses 519, 521 to be above an upper rim 530 of front fairing 54, air may flow into cockpit 516 through recesses 519, 521 directly. The air flowing through inlets 514 and recesses 519, 521 may reduce the buffeting felt by an operator as well as provide airflow for thermal comfort of an operator 523 (shown in phantom in FIG. 37). Front fairing 54 also includes winglets 525 extending laterally outwardly from a lower portion of outer shell 512. Winglets 525 may deflect airflow around operator 523 during operation of vehicle 2. In the illustrative embodiment shown, winglets 525 are fixed relative to outer shell 512. In an alternative embodiment, winglets 525 are laterally adjustable relative to outer shell 512.

Referring now to FIGS. 34 and 38-40, cockpit 516 includes steering assembly 20, gauge assembly 502, fuel tank assembly 532, center console 534, vent doors 536, speaker assemblies 538, and storage volume 540. As discussed above, steering assembly 20 includes handlebars 28 that may be moved or rotated about a steering axis by an operator to rotate front wheel 6 either to the left or the right. Handlebars 28 include right grip 542a and left grip 542b, which are configured to be grasped by an operator during operation of vehicle 2. Either of grips 542a, 542b may be rotatable about an axis thereof to control an operational characteristic of vehicle 2, such as acceleration, for example. Handlebars 28 may further include controls 544a, 544b, which have at least one button 546 to control a further operational characteristic of vehicle 2, such as turning on or off headlight 44, for example.

Center console 534 illustratively includes a digital display 548 and a plurality of buttons 550. Display 548 may be configured to display information to an operator, such as operational characteristics of vehicle 2, for example. Operational characteristics displayed on display 548 may include current vehicle speed, fuel tank level, and direction of travel. Display 548 may also display warnings, error messages, or other useful information to an operator, such as the current time, for example. Buttons 550 may be used to interact with the information displayed on display 548. For example, an operator may acknowledge or dismiss warnings or change the information displayed. In addition, display 548 may comprise a touchscreen that allows an operator to interact directly with the information displayed on display 548 without the need to utilize buttons 550. In the illustrative embodiment shown, center console 534 is coupled to front fairing 54 and, therefore, is separate from steering assembly 20, including handlebars 28. To that end, center console 534 does not rotate about the steering axis with steering assembly 20.

Referring specifically to FIGS. 38-40, vent doors 536 provide access to vent conduit 508 and are positioned on either side of center console 534 within reach of an operator. More specifically, vent doors 536 include a central body 552 and a handle 554. Handle 554 is adapted to be grasped by the operator to rotate handle 554 between a fully closed position (see FIG. 38) and a fully open position (see FIG. 39). In the illustrative embodiment, central body 552 includes an upper hinge 556 and a lower hinge 558. Hinges 556, 558 include an aperture configured to receive a pin 560 for coupling vent doors 536 to front fairing 54. At least one of pins 560 may include a barrel damper such that the rotational position of vent doors 536 is maintained. While vent doors 536 are illustrated as rotating, it is contemplated that vent doors 536 could comprise, for example, horizontally or vertically operable louvers or sliding gates. As shown in FIG. 40, air flows into vent openings 496 and through vent conduit 508. Vent doors 536 are therefore operable to control whether the air within vent conduit 508 flows into cockpit 516. Central body 552 is sized and configured to match exit 562 of vent conduit 508 such that exit 562 is substantially closed to air flowing through vent conduit 508 when vent doors 536 are in the closed position. The air flowing into cockpit 516 through vent conduit 508 may provide airflow for thermal comfort of the operator.

Figure 42:
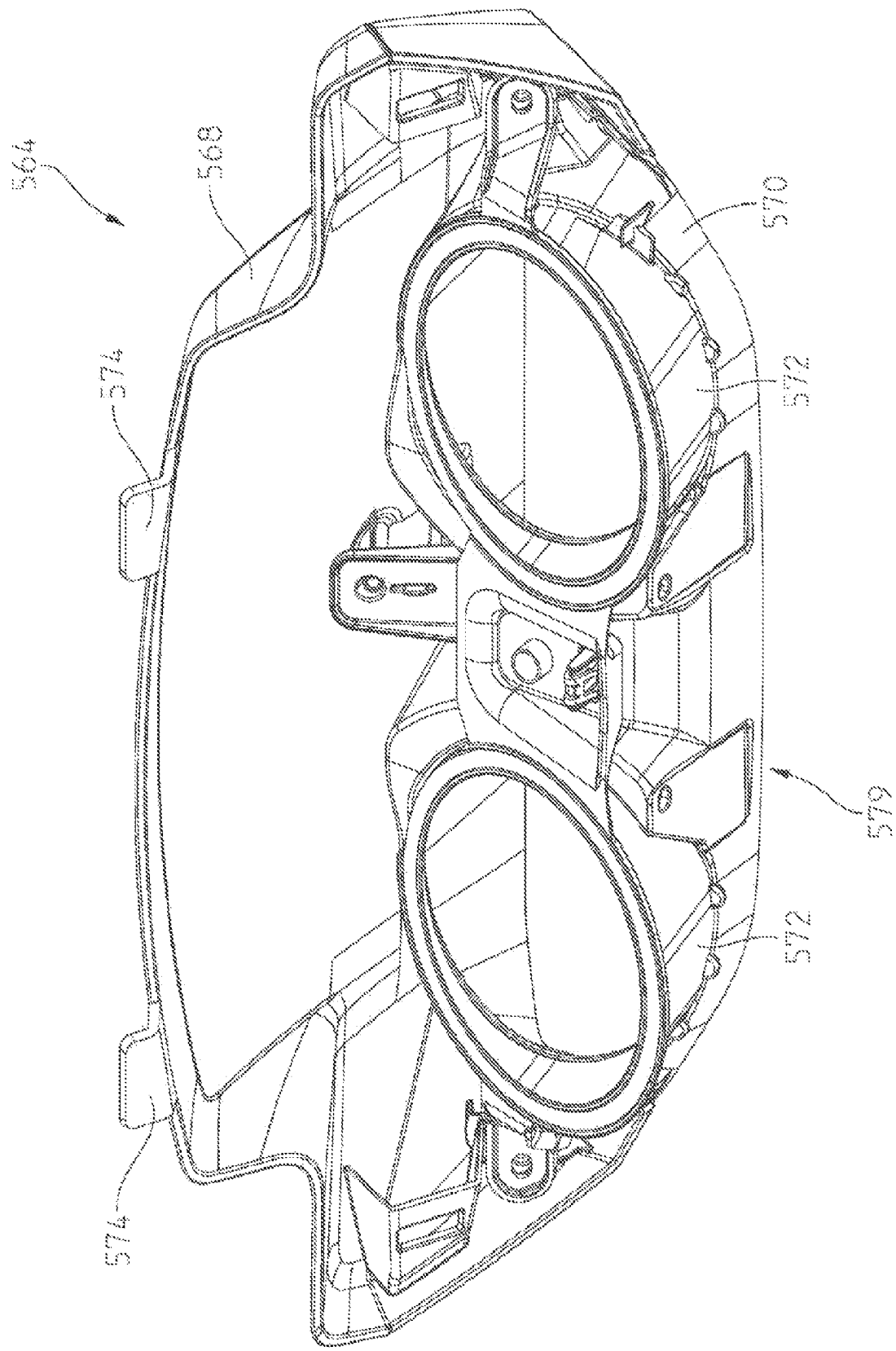
FIG. 42 is a rear perspective view of an underside of the display trim member.

Turning now to FIGS. 41 and 42, gauge assembly 502 includes a gauge pod 564 removably coupled to gauges 566. Gauges 566 are supported within dash frame 484 and, therefore, are coupled to front fairing 54 and separate from steering assembly 20, including handlebars 28. Gauges 566 display information to an operator such as operational characteristics of vehicle 2. Moreover, gauges 566 may comprise an analogue display, a digital display, or a combination thereof. If gauges 566 include a digital display, an operator may change the information displayed via buttons 550 or interaction with display 548, for example. An additional display screen may be located intermediate gauges 566. An advantage, among others, of positioning center console 534 below gauge assembly 502, is that display 548 will be closer to an operator and, therefore, easier for the operator to interact with. In addition, a speedometer displayed via gauges 566 is closer to the liner of sight for the operator.

Gauge pod 564 illustratively includes a gauge hood 568 partially surrounding a gauge bezel 570 and gauge trim 572. Gauge bezel 570 and gauge trim 572 are configured to abut gauges 566 when gauge pod 564 is installed. Gauge hood 568 includes at least one tab 574 for installing gauge pod 564 into dash frame 484. More specifically, tab 574 is inserted into a corresponding slot 576 of dash frame 484. Once tab 574 have been inserted into the corresponding slot 576, gauge hood 568 is rotated toward dash frame 484 until gauge hood 568 engages at least one trim clip 577. A forward portion 579 of gauge hood may be coupled to dash frame 484 using releasable fastener such as, for example, hook and loop. In this way, gauge pod 564 may be installed and removed without a tool. As a result, gauge pod 564 may be removed for shipment to increase the packaging efficiency of vehicle 2

Figure 43:
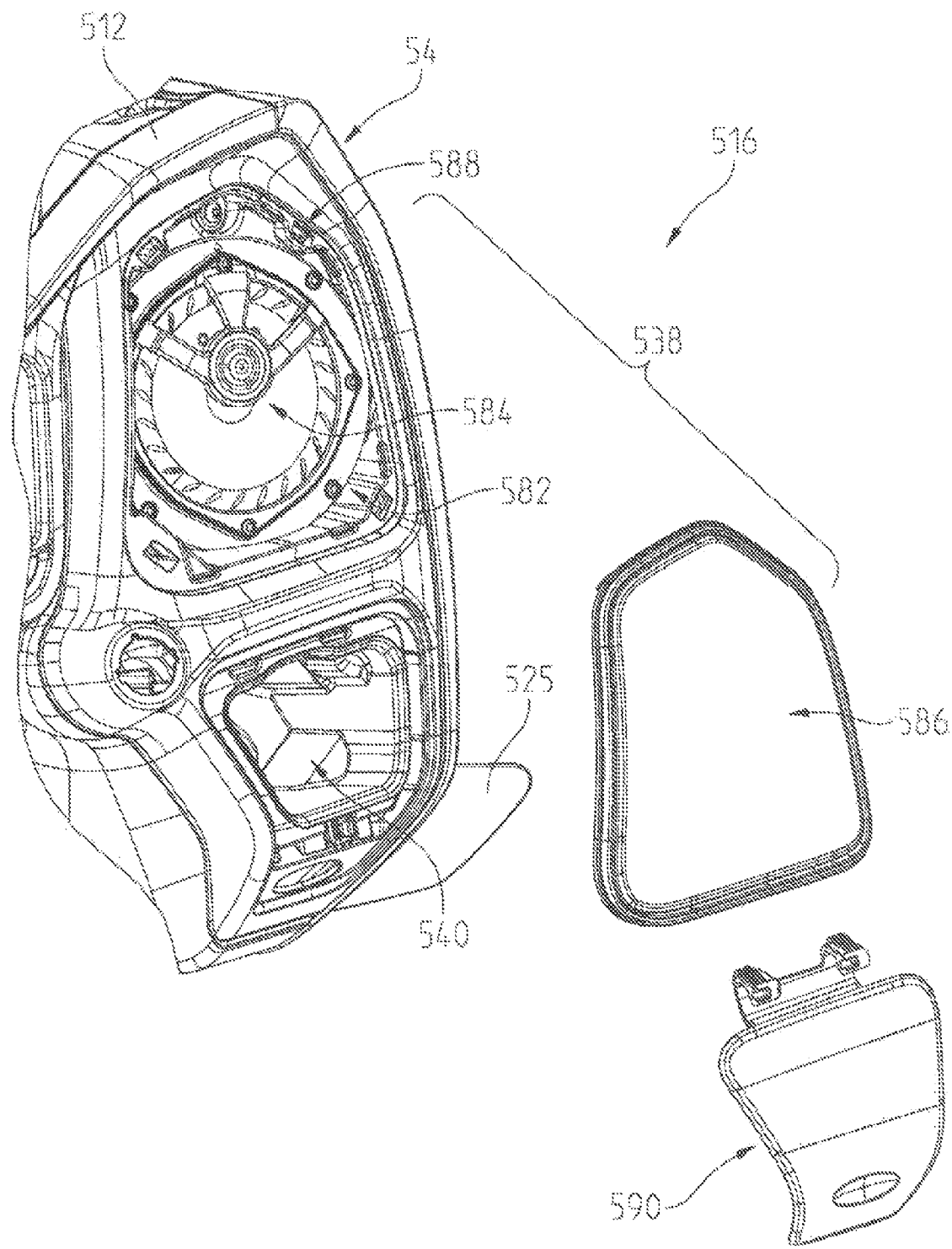
FIG. 43 is a rear exploded view of a speaker and storage area of the front fairing.
Figure 44:
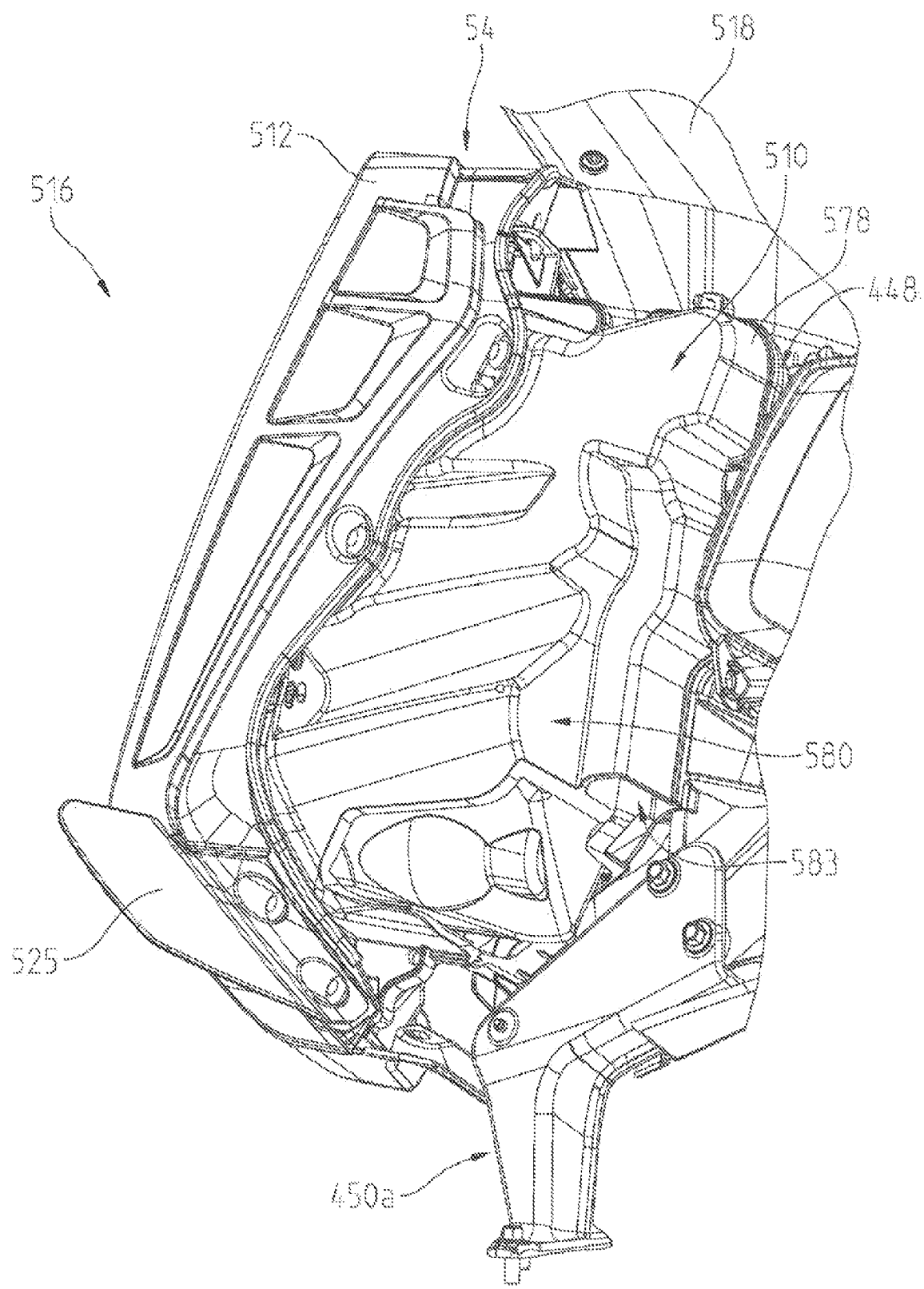
FIG. 44 is a rear perspective view of a storage area of the front fairing.

Referring now to FIGS. 43 and 44, speaker assemblies 538 and storage volume 540 are shown in more detail. More specifically, cockpit 516 illustratively includes speaker assemblies 538 and storage volume 540 positioned laterally outward of center console 534 and vent doors 536. On each side of vehicle 2, speaker assemblies 538 and storage volume 540 are supported within a single container 578, which comprises exterior storage and speaker volume frame 580 coupled to interior storage and speaker volume frame 488. Exterior storage frame 580 may be removable coupled to interior storage frame 488 using, for example, a structural adhesive. Speaker assemblies 538 includes a speaker or driver 584 and a grill 586. Driver 584 is housed within a sealed and ported speaker volume 582 of exterior storage frame 580. More specifically, volume 582 includes a ported opening 583. Sound from driver 584 is directed out of ported speaker volume 582 through an opening 588 and toward the operator. Grill 586 covers opening 588 when driver 584 is housed within ported speaker volume 582. In the illustrative embodiment shown, ported speaker volume 582 is positioned in an upper portion of single container 578. Storage volume 540 is formed in a lower portion of single container 578 beneath ported speaker volume 582 and is sized and shaped to store, for example, an operator's personal articles during operation of vehicle 2. A lid 590 is configured to secure storage volume 540. In one embodiment, lid 590 may include a lock.

Figure 45:
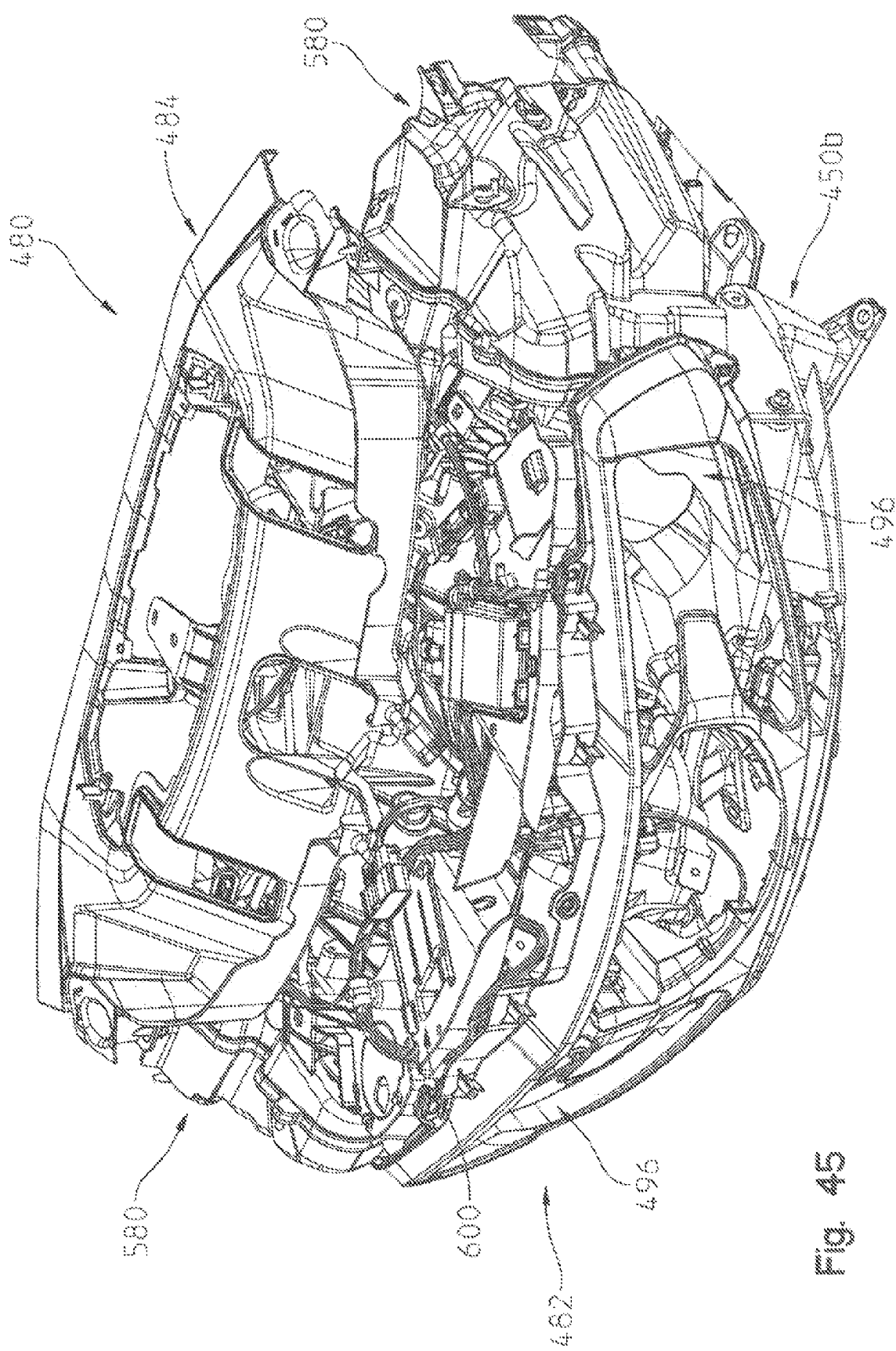
FIG. 45 is a left front perspective view of an electrical tray of the vehicle of FIG. 1.
Figure 46:
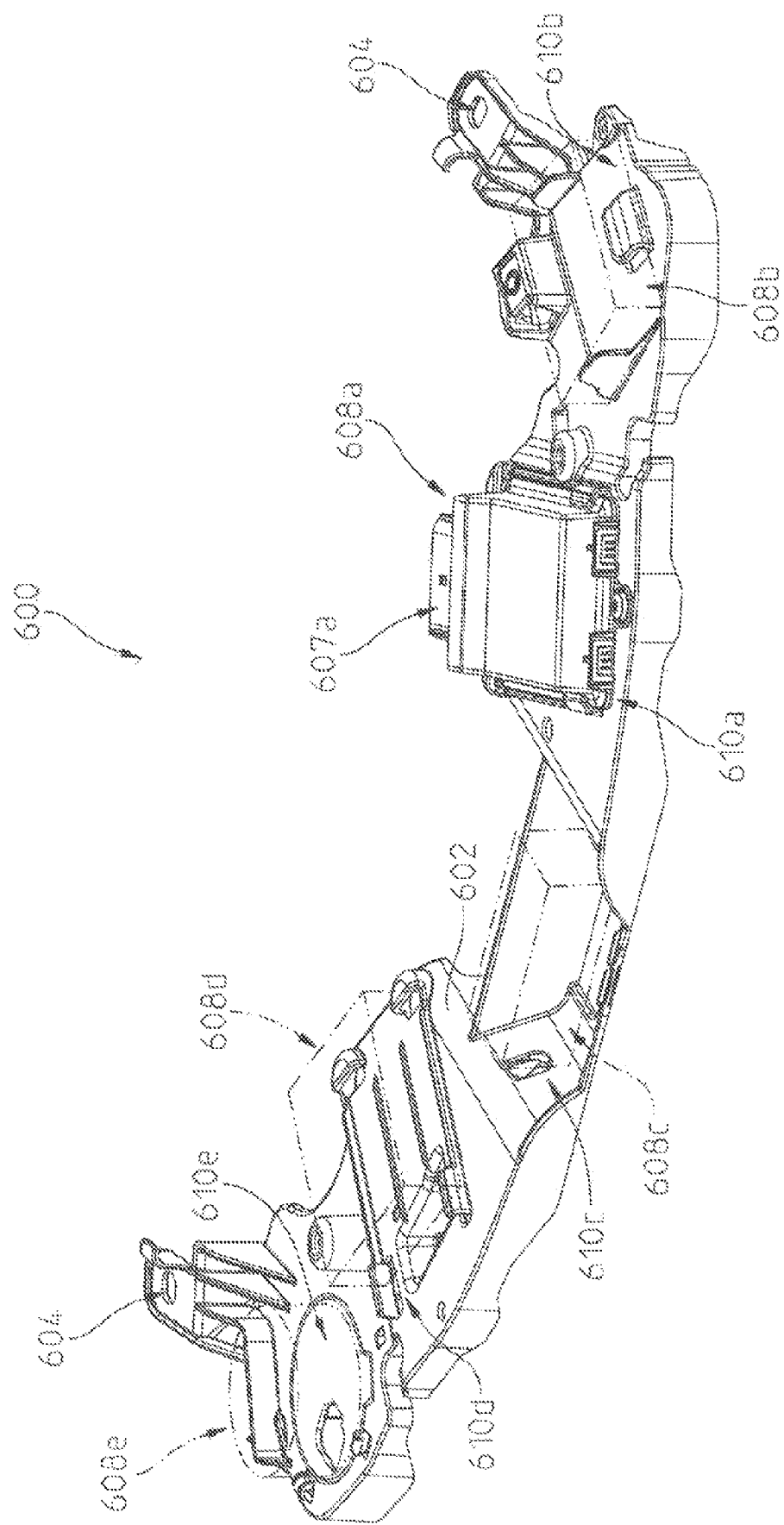
FIG. 46 is a front perspective view of the electrical tray of FIG. 45.
Figure 47:
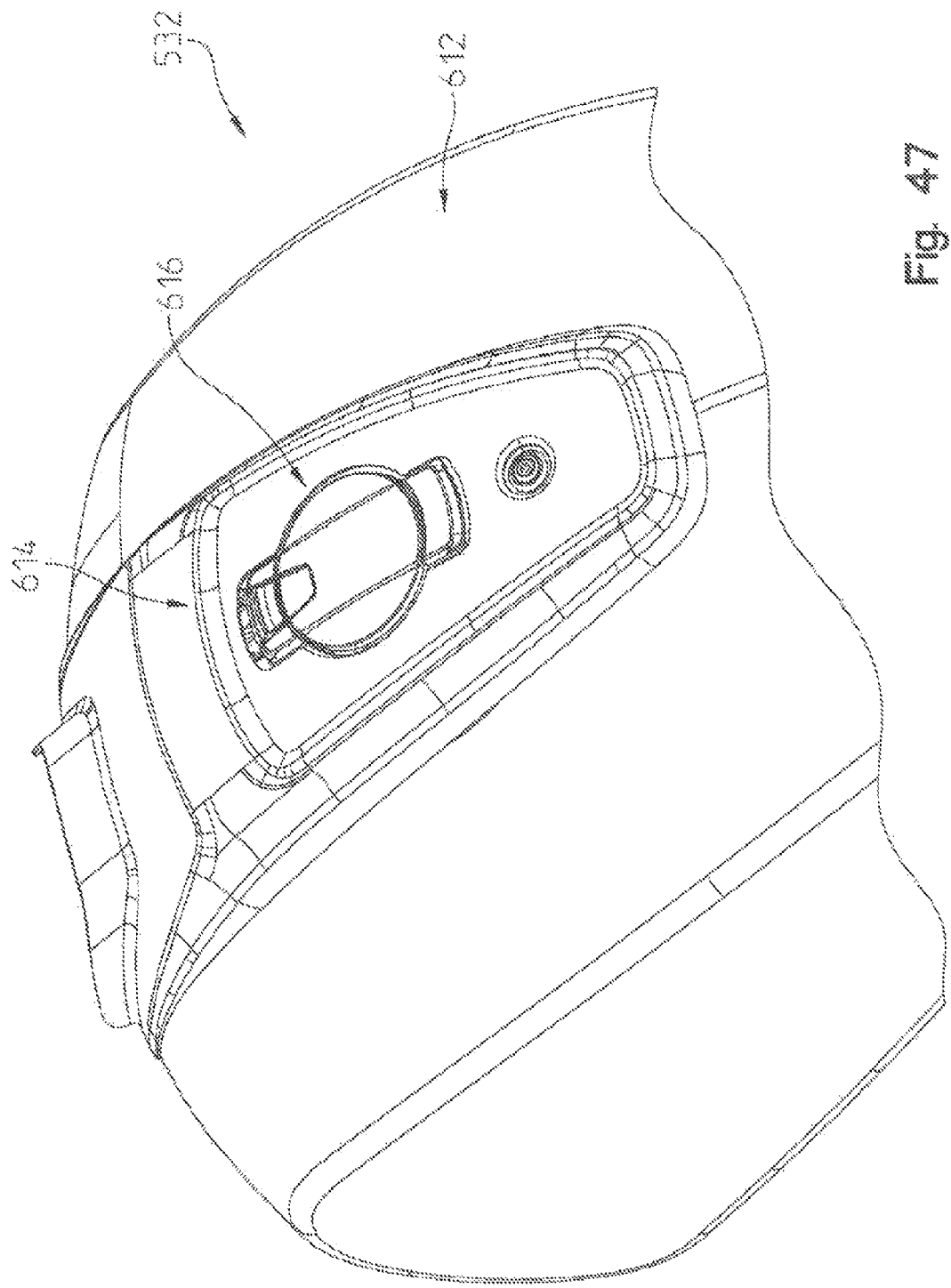
FIG. 47 is a left rear perspective view of a fuel tank assembly.
Figure 48:
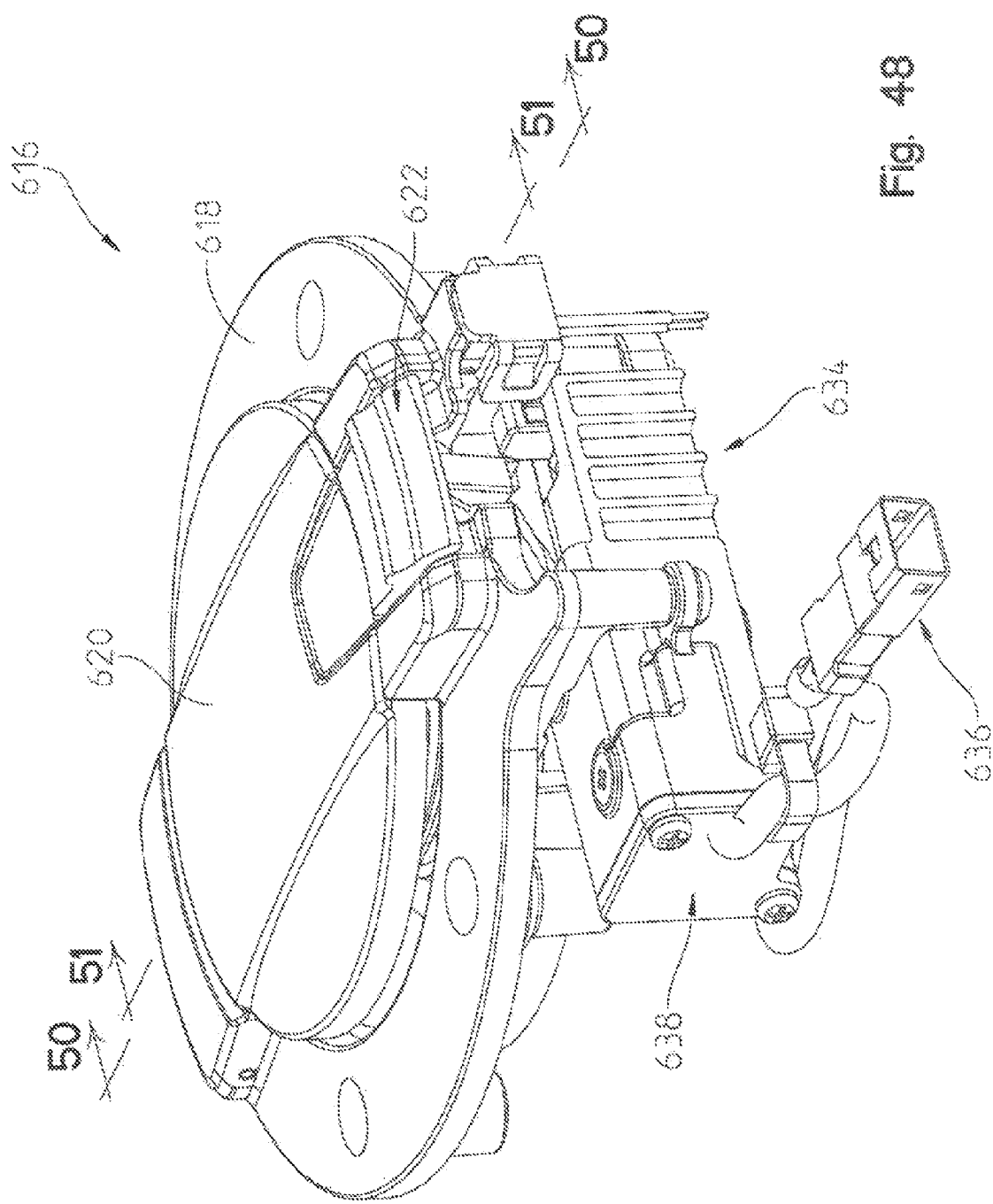
FIG. 48 is a left rear perspective view of an electronic locking fuel cap of the fuel tank assembly of FIG. 47 in a closed configuration.
Figure 49:
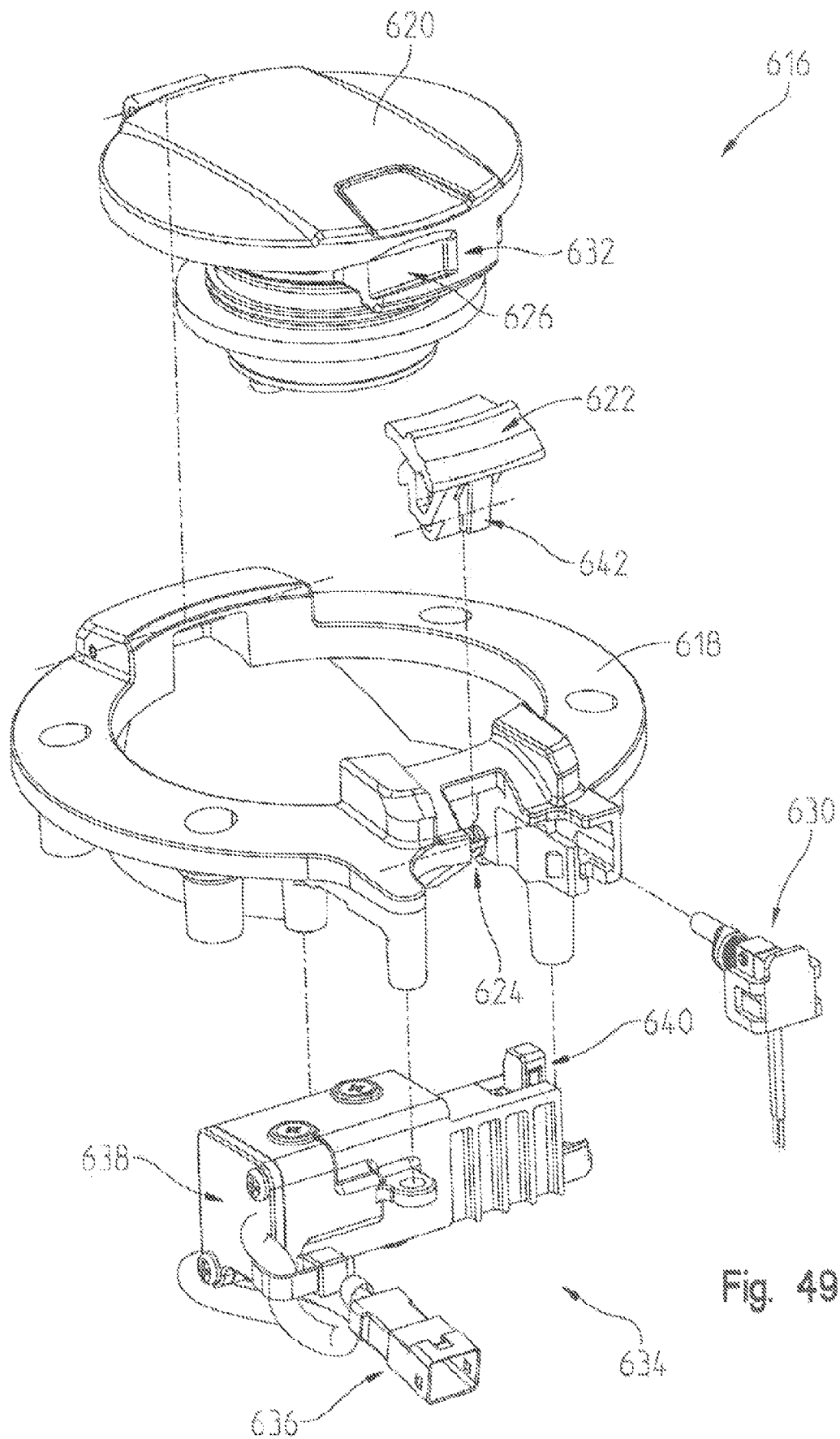
FIG. 49 is an exploded view of the electronic locking fuel cap of FIG. 48.
Figure 50:
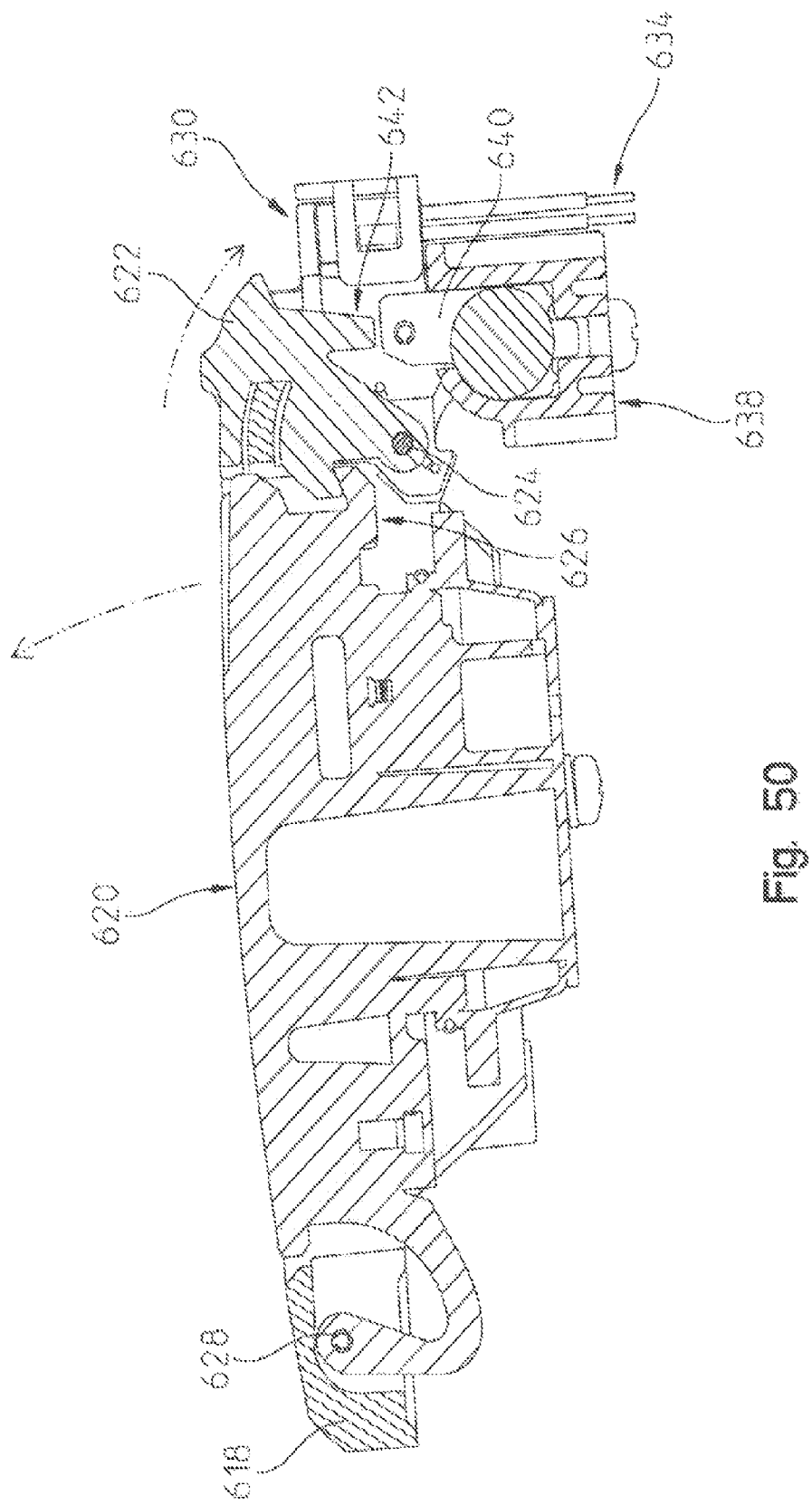
FIG. 50 is a cross-sectional view of the electronic locking fuel cap taken along line 50-50 of FIG. 48.
Figure 51:
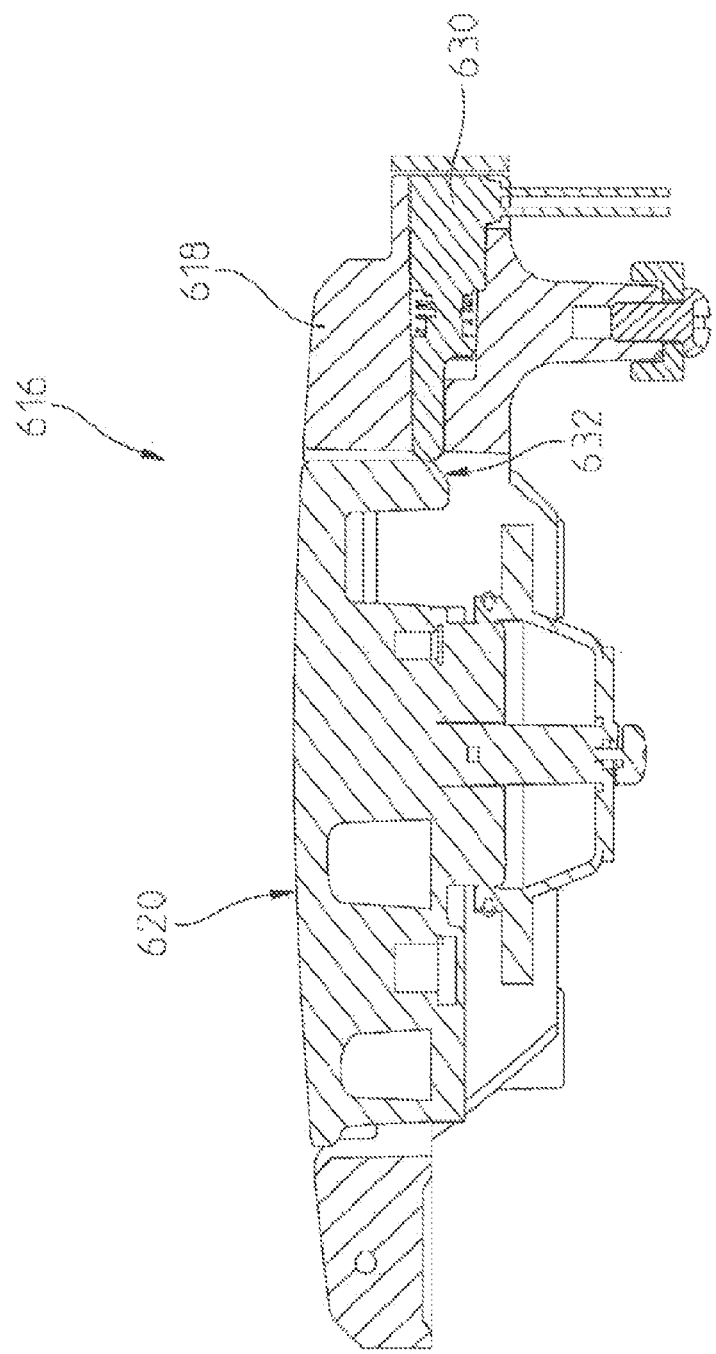
FIG. 51 is a cross-sectional view of the electronic locking fuel cap taken along line 51-51 of FIG. 48.

Turning now to FIGS. 45 and 46, an electronics shelf 600 is housed within front fairing 54 and supported by framework 480. Electronics shelf 600 comprises a generally crescent body 602 having at least one aperture 604 located at each end thereof. Apertures 604 are configured to receive a fastener (not shown) for coupling electronics shelf 600 to framework 480. Electronics shelf 600 is configured to receive a plurality of controllers or modules 608, illustratively modules 608a-e. Electronics shelf 600 includes a variety of wells 610, illustratively wells 610a-e, sized and shaped to receive a respective one of modules 608a-e. It is contemplated, however, that electronics shelf 600 may not include all of modules 608a-e every time. More specifically, the number and types of modules 608 may be vary depending on, for example, the application of vehicle 2. Accordingly, modules 608b-e are illustrated in phantom.

Electronics shelf 600 may further include routing for an antenna if one of modules 608 comprises a cell modem. The routing may be configured to optimize the length of the antenna. In the illustrative embodiment shown, connectors 607, illustratively connector 607a, of modules 608 are oriented on electronics shelf 600 longitudinally rearward such that the corresponding wiring harness may be inserted from a central portion of framework 480.

Referring now to FIGS. 47-51, fuel tank assembly 532 includes a fuel tank 612 and a fuel tank console 614. Fuel tank console 614 includes a fuel door assembly 616, which provides access to an interior volume of fuel tank 612. Fuel door assembly 616 illustratively includes a collar 618 and a fuel door 620 pivotally coupled to collar 618. Door 620 is pivotably between an open position in which an interior volume of fuel tank 612 is accessible and a closed position in which the interior volume is inaccessible. Fuel door assembly 616 further includes a latch or securing mechanism 622 for securing fuel tank 612 in the closed position. Securing mechanism 622 is configured to rotate about a pin 624 and engage a lip 626 of door 620 to prohibit door 620 from rotating about a pin 628 and secure fuel tank 612 in the closed position. Fuel door assembly 616 also includes a microswitch 630. When door 620 is in the closed position, microswitch 630 is engaged by a portion 632 of door 620. In this way, a controller monitors whether door 620 is in the closed position.

Fuel door assembly 616 also includes a locking mechanism 634 configured to lock door 620 in the closed position. Locking mechanism 634 includes a control and power cable 636 electrically coupled to a motor 638. Actuation of motor 638 laterally displaces a locking pin 640 between an unlocked position and a locked position. When motor 638 is actuated to displace locking pin 640 to the unlocked position, securing mechanism 622 is free to pivot about pin 624 and release door 620 from the closed position. Conversely, when motor 638 is actuated to displace locking pin 640 to the locked position, locking pin 640 engages a leg 642 of securing mechanism 622 thereby preventing securing mechanism from rotating about pin 624. As a result, door 620 is locked in the closed position.

Figure 52:
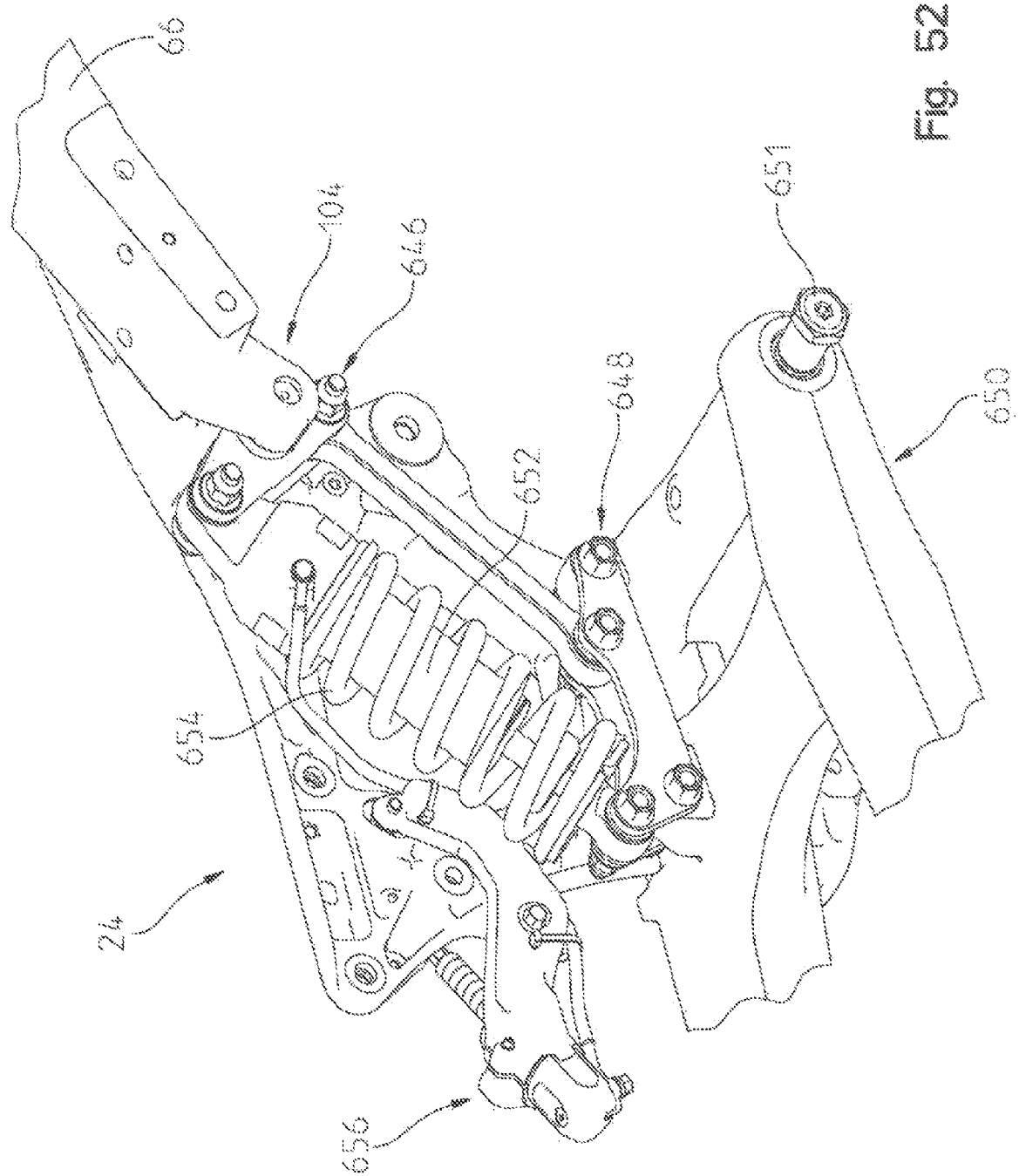
FIG. 52 is a right rear perspective view of a rear suspension system, including a rear shock absorber.
Figure 53:
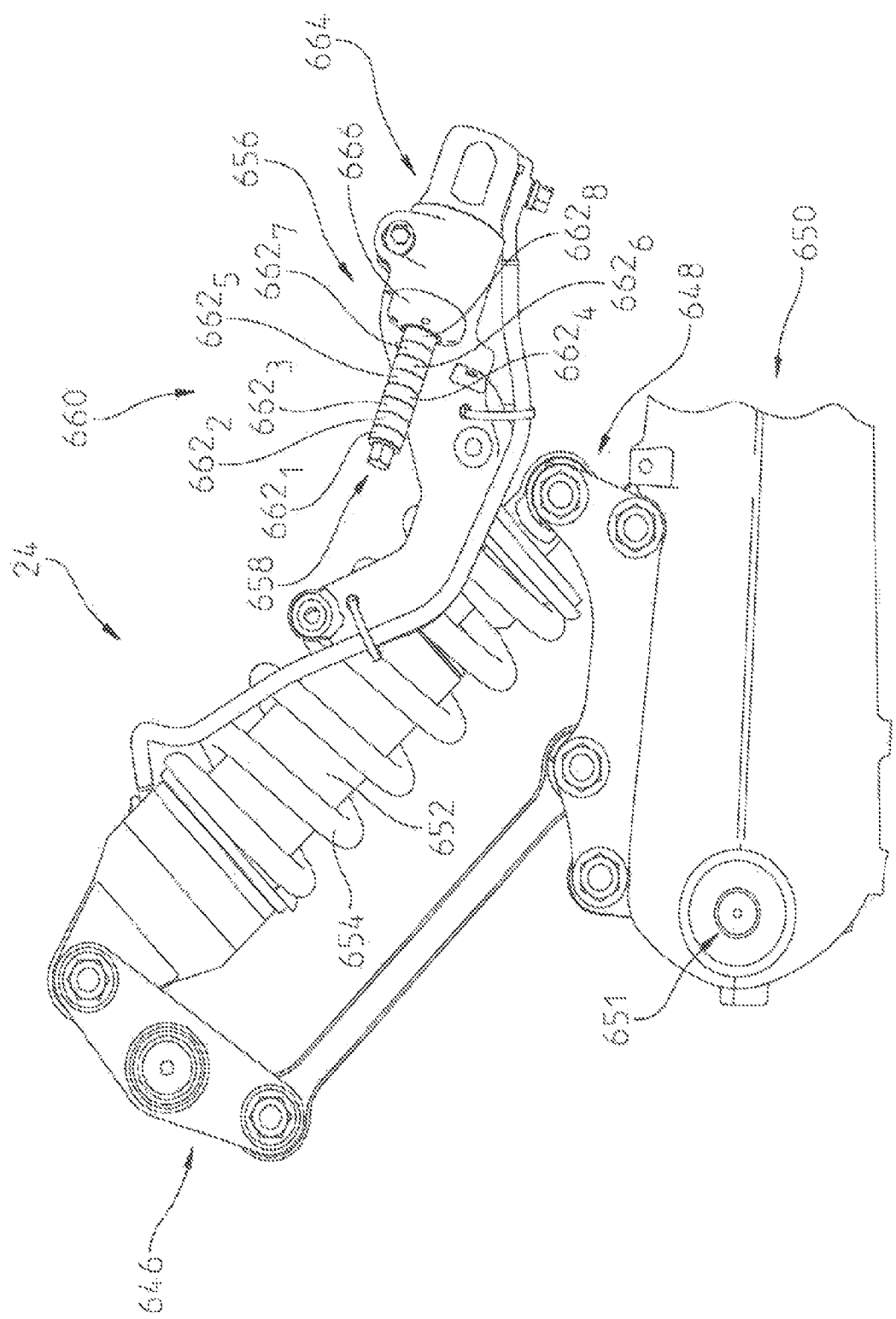
FIG. 53 is a left side view of the rear suspension system and rear shock absorber of FIG. 52.

Turning now to FIGS. 52 and 53, rear suspension assembly 24 is shown in more detail. Rear suspension assembly 24 is pivotally coupled to rearward end 104 of main portion 66 of frame 4 and includes a shock absorber assembly 644 having an upper strut mount 646 and a lower strut mount 648. In the illustrative embodiment shown, upper strut mount 646 is pivotally coupled to rearward end 104, and lower strut mount 648 is coupled to one of swingarms 650, which rotatably support rear wheel 8. Pivotally coupled to upper strut mount 646 and lower strut mount 648 is a shock absorber 652 surrounded by a coil spring 654. Swingarms 650 are pivotally coupled to a pivot axis 651 which permits swingarms 650 to rotate relative to engine 12. Rear suspension assembly 24 controls the relative movement between swingarms 650 and engine 12 by resisting vertical displacements of swingarms 650 relative to engine 12.

The initial amount of resistance of rear suspension assembly 24 may be customized by adjusting a "pre-load" on shock absorber 652 and coil spring 654. Increasing the pre-load on shock absorber 652 and coil spring 654 increase the functional ride-height of vehicle 2 or compensates for an applied load, such as cargo and operator weight Conversely, decreasing the "pre-load" on shock absorber 652 and coil spring 654 decreases the functional ride height of vehicle 2 or compensates for a reduced load from cargo or operator weight. Shock absorber assembly 644 includes an adjuster 656 comprising a tool engagement portion 658 and a visual indicator 660 configured to visually indicate the current pre-load on shock absorber 652 and coil spring 654. More specifically, visual indicator 660 includes a plurality of demarcations 662, illustratively demarcations $662_1$-$662_8$, to visually indicate to an operator the current pre-load setting position. Rotation of tool engagement portion 658 in a first direction results in visual indicator 660 entering adjuster housing 664 at a collar 666. The farther visual indicator 660 is inserted into housing 664, the fewer demarcations 662 will be visible to the operator. Similarly, rotation of tool engagement portion 658 in a second direction opposite the first direction results in visual indicator 660 exiting housing 664. The farther visual indicator 600 extends from housing 664, the more demarcations 662 will be visible to the operator. Visual indicator 660 is adjustable between a fully inserted position in which zero or one of demarcations 662 is visible to the operator and a fully extended position in which all or eight of demarcations 662 are visible to the operator.

Figure 54:
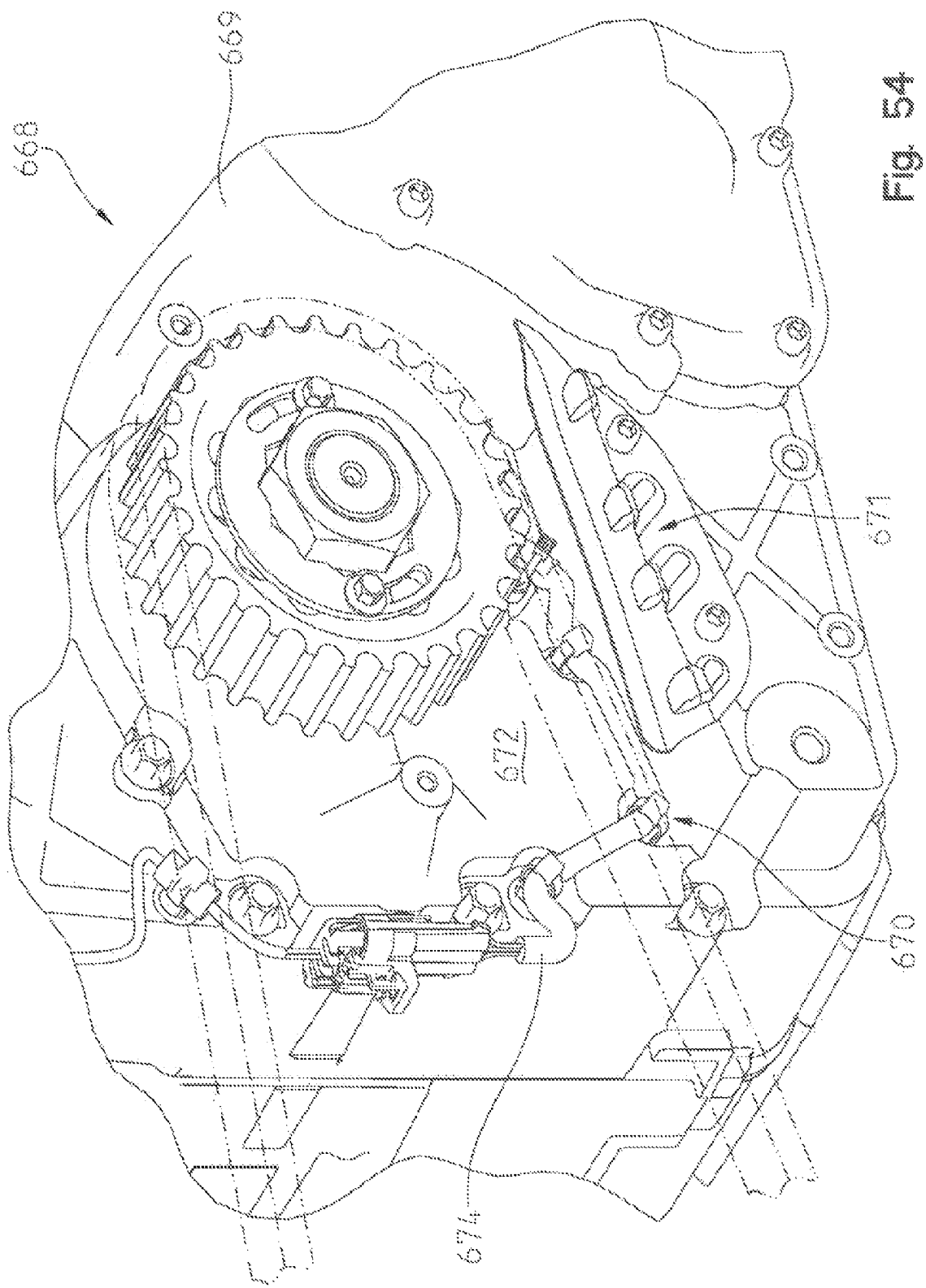
FIG. 54 is a perspective view of a crankcase of the two-wheeled vehicle shown with a belt in phantom.
Figure 55:
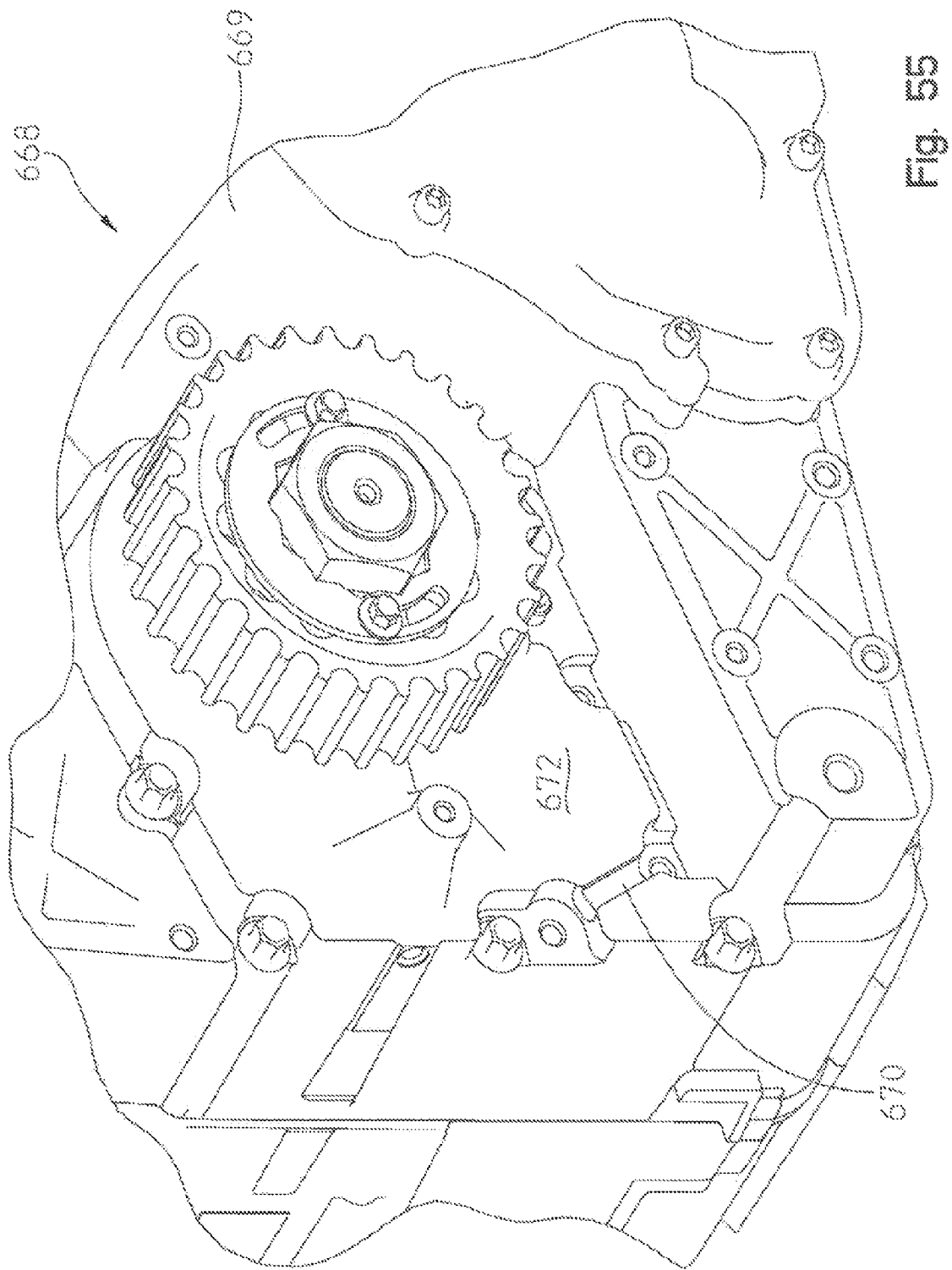
FIG. 55 is a further perspective view of the crankcase with an integrated cableway.
Figure 56:
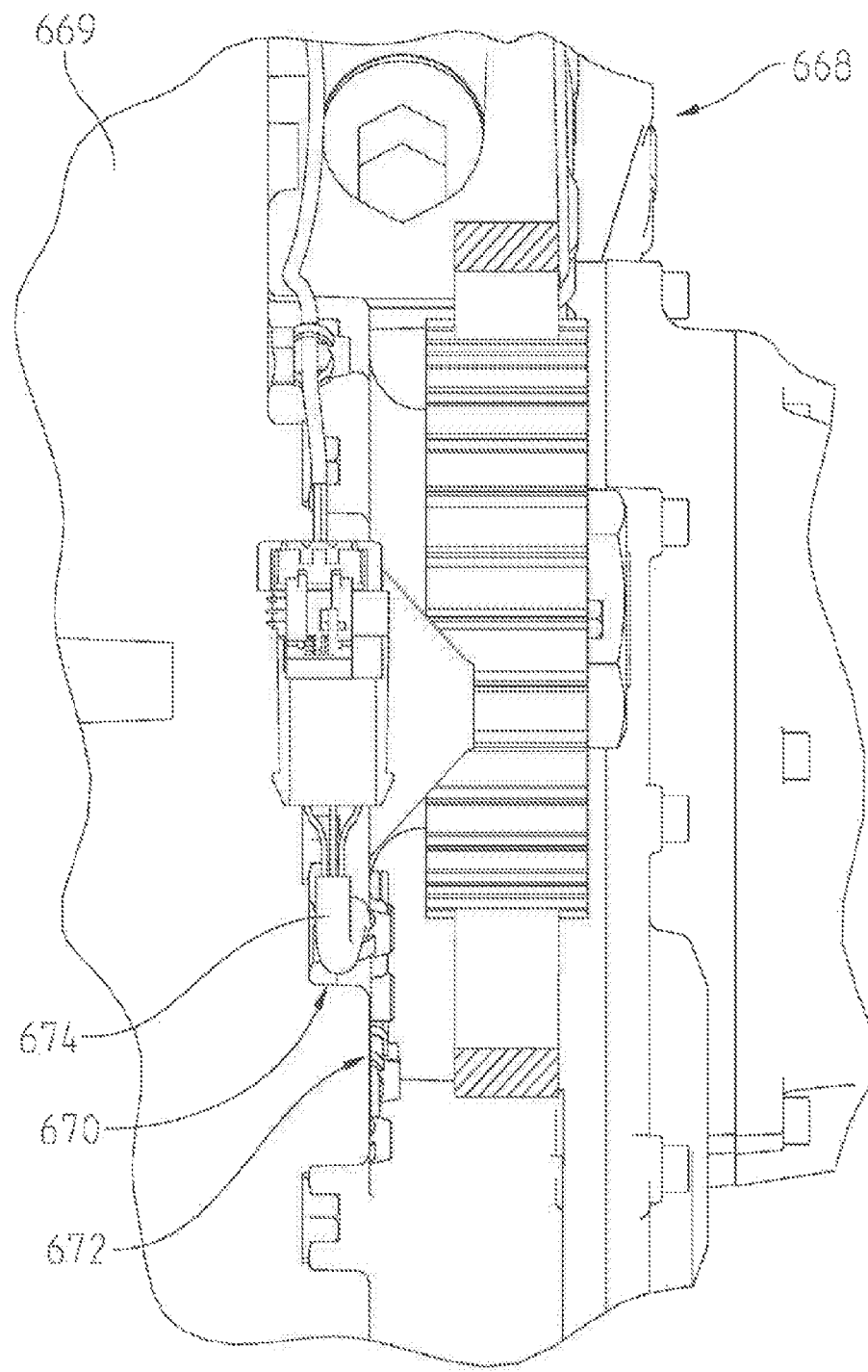
FIG. 56 is a rear view of the crankcase.
Figure 57:
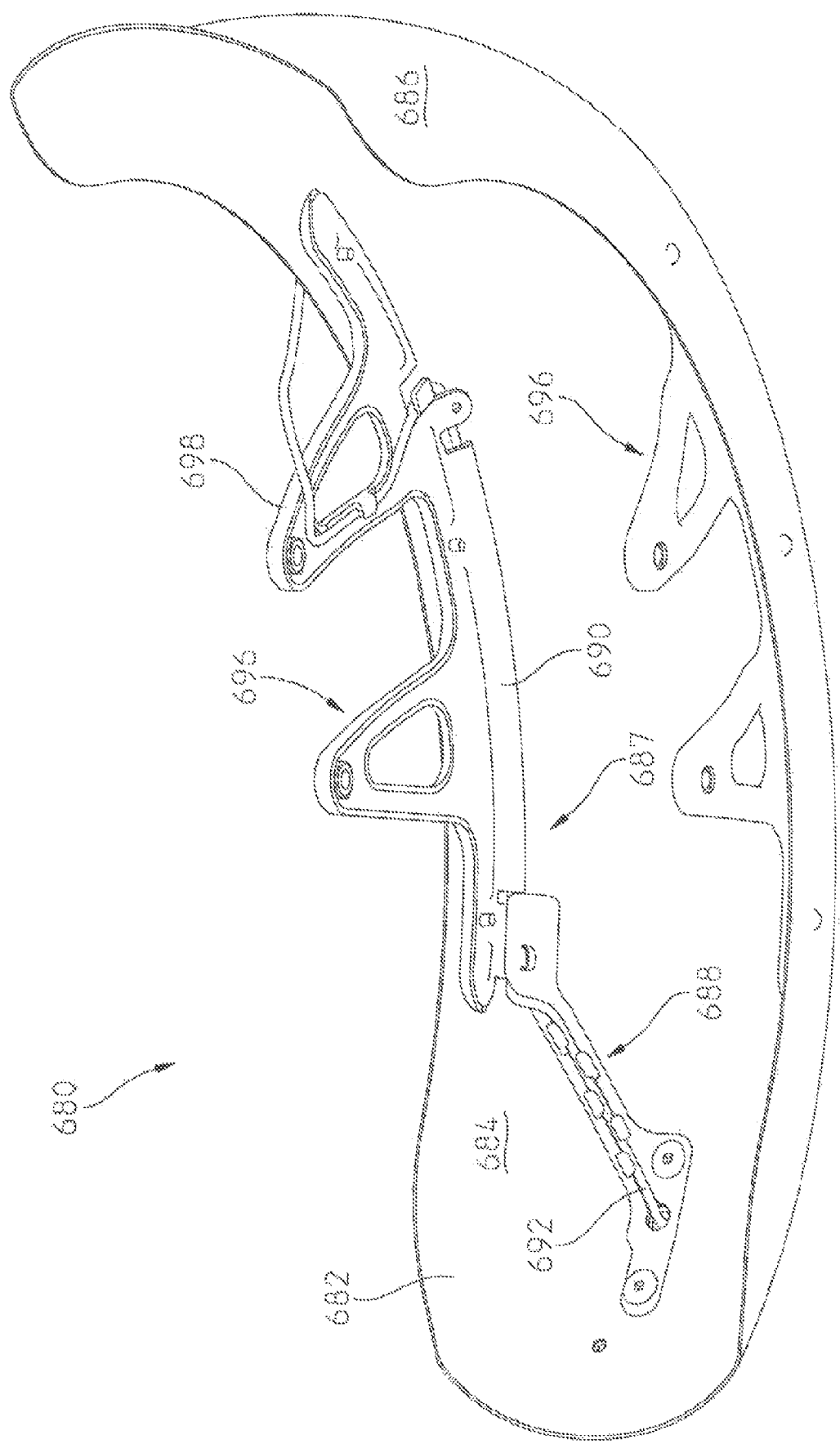
FIG. 57 is an underside perspective view of a front fender of the two-wheeled vehicle.
Figure 58:
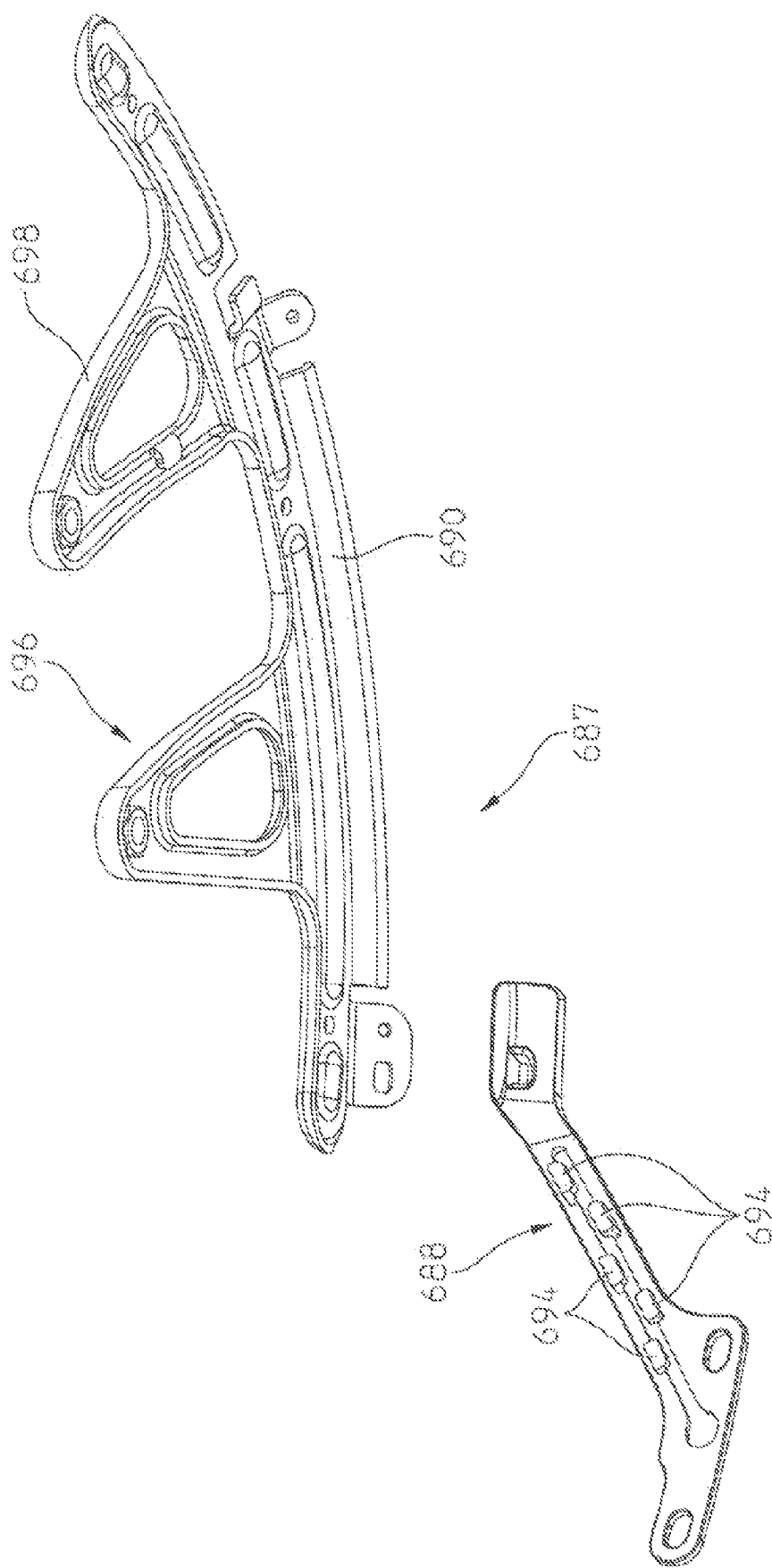
FIG. 58 is an exploded view of a wiring bracket and mounting bracket of the front fender of FIG. 57.

Referring now to FIGS. 54-56, a crankcase 668 of powertrain assembly 10 includes a crankcase housing 669 having a channel 670 therein. Channel 670 is configured to receive a cable 674 for routing along crankcase housing 669. Moreover, channel 670 is sized and adapted to receive cable 674 inwardly of an outer face 672 of crankcase housing 669. In this way, cable 674 may be protected from moving components of powertrain assembly 10, such as drive belts and gears, for example. Illustratively, cable 674 comprises a gear position sensor wire. In the illustrative embodiment shown, channel 670 is cast-in during the casting process to form crankcase housing 669. The casting process may comprise high-pressure die casting, for example. Crankcase housing 669 further includes a heat shield 671 coupled thereto. Heat shield 671 is illustratively positioned lower than the drive belts and gears of powertrain assembly 10. In this way, heat shield 671 protects this components from the heat generated by exhaust gases flowing through exhaust system 34.

An underside perspective view of a front fender 680 of vehicle 2 is shown. Front fender 680 is configured to couple to front wheel 6 and comprises a generally crescent-shaped body 682 having an inner curvilinear surface 684 adjacent vehicle 2 and an outer curvilinear surface 686. Coupled to outer curvilinear surface 686 may be an illuminated emblem, badge, or other ornament. Inner surface 684 includes an integrated wiring harness 687 for routing a power cable 692 from the badge to a power source of vehicle 2. Wiring harness 687 includes a forward wiring harness 688 adapted to confirm to inner curvilinear surface 684. Harness 688 includes a plurality of retaining clips 694 for securing power cable 692 thereto. Integrated wiring harness 687 also includes a wiring channel 690 integrally formed with one of fender mounts 696. Wiring channel 690 routes power cable 692 from harness 688 to a leg 698 of fender mount 696.

From leg 698, power cable 692 may be routed to the power source. Wiring channel 690 is sized and adapted to route power cable 692 along inner curvilinear surface 684 of front fender 680. An advantage, among others, of integrated wiring harness 687 is that front fender 680 may be packaged in close proximity to vehicle 2.

Turning now to FIG. 59, a puddle light 700 is shown. Puddle light 700 is positioned longitudinally forward position of engine 12 proximate cooling system 150. More specifically, puddle light 700 position vertically lower than cooling system 150 and is configured to illuminate a ground surface underneath vehicle 2. Puddle light 700 may be configured to illuminate the ground surface when vehicle 2 is turned off, thereby providing a guiding light to an operator exiting vehicle 2.

Referring now to FIG. 60, a clutch housing or cover 702 is shown coupled to crankcase housing 669. Cover 702 comprises a shell 704 sized and configured to receive at least a portion of a clutch assembly therein. Shell 704 includes a lower, generally planar surface 706. planar surface 706 includes a lever arm 712 pivotally coupled thereto, which is operable to engage and disengage the clutch. A clutch cable 708 is coupled to a distal end 713 of lever arm 712. Actuation of clutch cable 708 in a first direction 714 pivots lever arm 712 about a front axle 718 in a first direction 720 and disengages the clutch. Release of clutch cable 708 in second direction 716 pivots lever arm 712 about its front axle 718 in a second direction 722 and engages the clutch. The tension of clutch cable 708 and, therefore, the starting angular position of lever arm 712 relative to front axle 718 can be adjusted using threaded adjuster 710.

Turning now to FIGS. 61-64, front wheel 6 is shown in more detail. Front wheel 6 illustratively includes a tire 730 supported on a rim 732. Rim 732 is rotatably coupled to a front fork 736 of front suspension assembly 22. More specifically, tire 730 and rim 732 are rotatable about a front axle 734. In the illustrative embodiment shown, a brake disc 738 is fixedly coupled to and rotates with rim 732. Brake disc 738 is configured to be engaged by a brake caliper to control the rotation of tire 730 and rim 732.

Positioned intermediate front fork 736 and rim 732 is a wheel speed sensor assembly 740. Wheel speed sensor assembly 740 illustratively a wheel speed sensor housing 742, a bearing seal 744, a tone ring 746, and a bearing 752. Bearing 752 is received within a hub 750 of rim 732 and rotatably couples rim 732 to axle front axle 734. Sensor housing 742 includes a wheel speed sensor 743 adjacent tone ring 746. Wheel speed sensor 743 is configured to measure the number of rotations of tone ring 746 to determine the rotational speed of vehicle 2. The distance between wheel speed sensor 743 and tone ring 746 is shown by gap 748. Wheel speed sensor 743 illustratively comprises a back-biased hall effect sensor, and tone ring 746 comprises a ferrous material. It is contemplated, however, that other suitable sensors may be used to measure the rotational speed of vehicle 2. In the illustrative embodiment shown, tone ring 746 is contained within bearing seal 744. As a result, tone ring 746 is visually hidden and protected from corrosion or debris intrusion. In addition, integrating tone ring 746 with bearing seal 744, wheel speed sensor assembly 740 can be packaged between front fork 736 and rim 732. As a result, gap 748 can be minimized.

Figure 65:
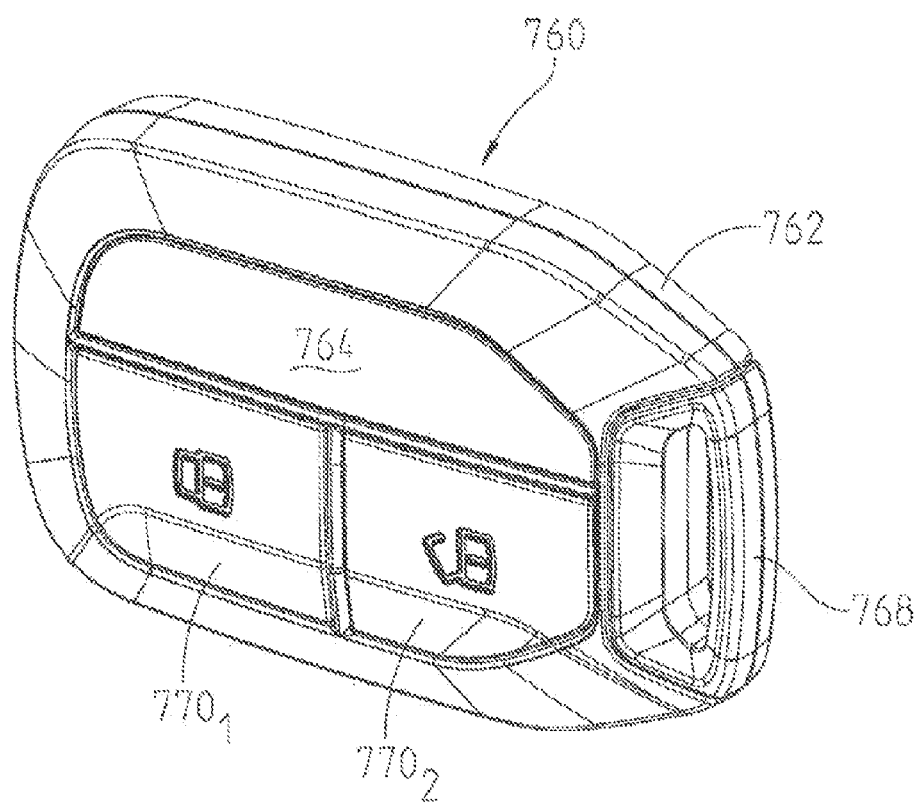
FIG. 65 is a front perspective view of a wireless key fob.
Figure 66:
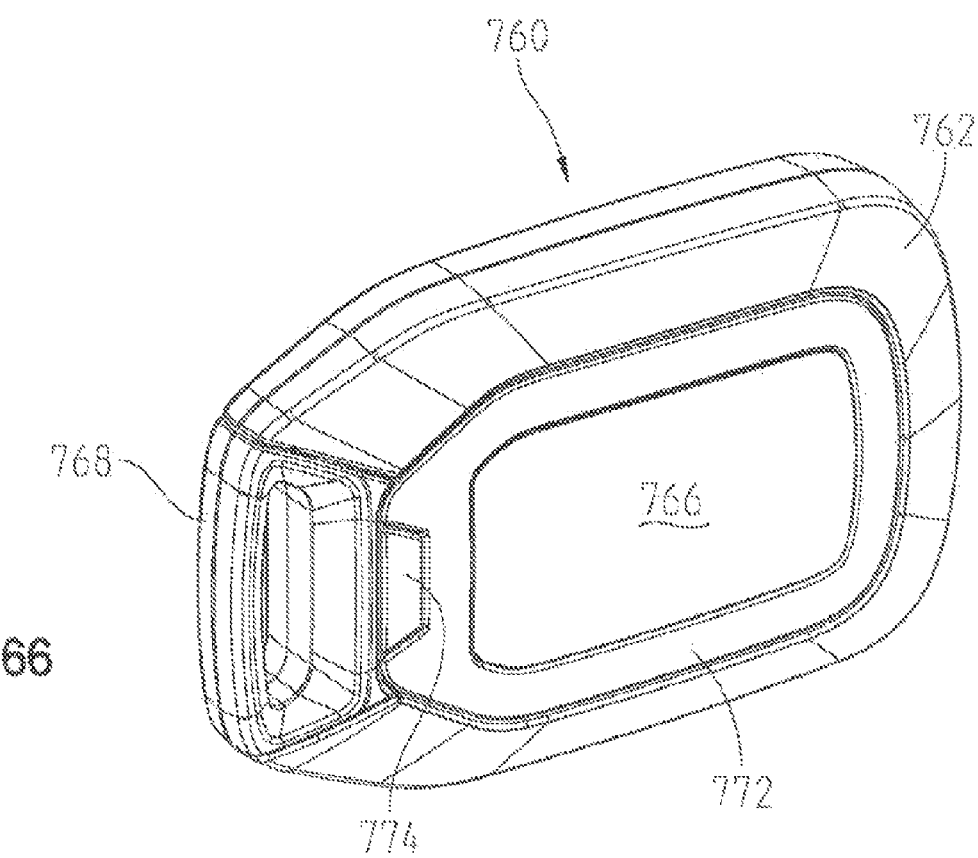
FIG. 66 is a rear perspective view of the wireless key fob of FIG. 65.
Figure 67:
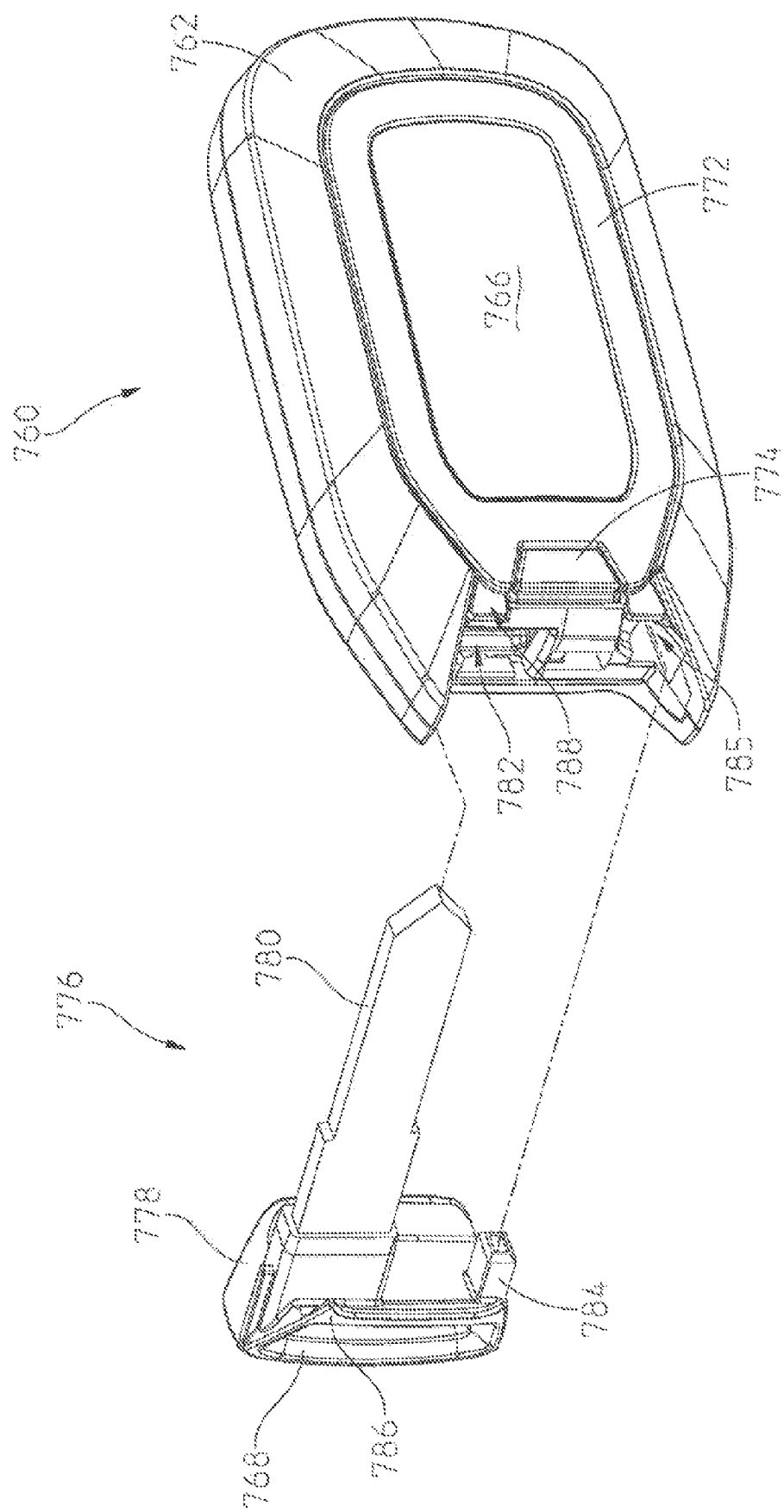
FIG. 67 is an exploded view of the wireless key fob of FIG. 65 with a courtesy key removed.
Figure 68:
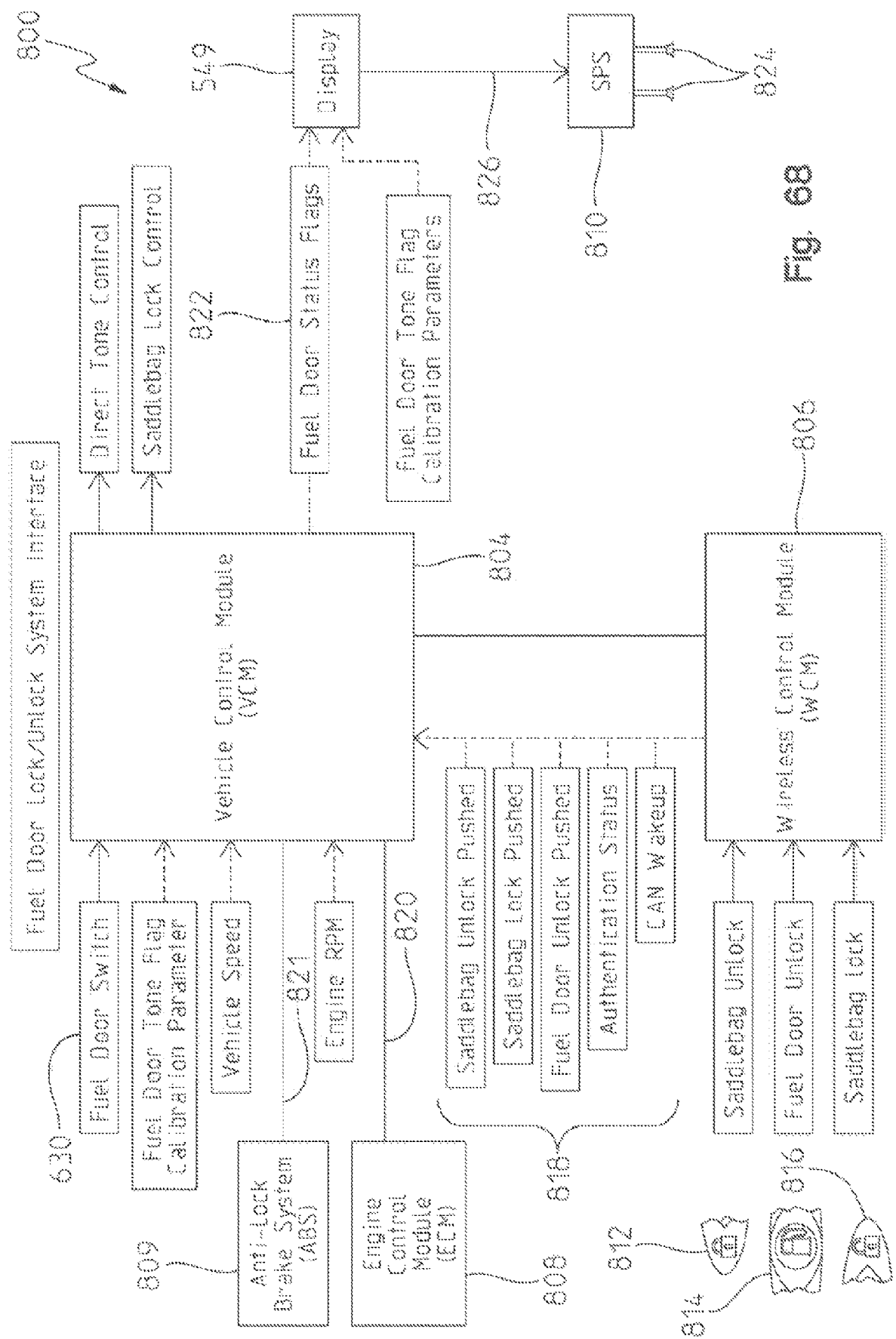

Referring now to FIGS. 65-67, a wireless key fob 760 for vehicle 2 is shown. Wireless key fob 760 illustratively includes a generally ovoid-shaped body 762 having an operator interface surface 764 and a rear surface 766 opposite surface 764. Body 762 includes a loop 768 adapted to receive a retaining member, such as a key ring or lanyard, for example. Operator interface surface 764 includes a plurality of buttons 770, illustratively accessory lock button 770₁ and accessory unlock button 770₂. Buttons 770 may include a textured surface or visual indicator so that an operator may distinguish separate buttons and the functions thereof. Moreover, buttons 770 may comprise pushbuttons or capacitance sensing buttons. While wireless key fob 760 includes two buttons, it is contemplated that more or fewer than two buttons could be included on wireless key fob 760. For example, rear surface 766 may include pushbuttons. Either of surface 764, 766 may display a badge, emblem, or icon.

In the illustrative embodiment shown, rear surface 766 forms an outer surface of a battery cover 772 of wireless key fob 760. Battery cover 772 covers a battery compartment (not shown) of wireless key fob 760 in which a power source, such as a battery, is located to power the functional features of wireless key fob 760. Battery cover 272 includes a release tab 788, which, when actuated, releases battery cover 772 from wireless key fob 760. Illustratively, release tab 788 may be pushed upwards to actuate it. Wireless key fob 760 also includes a courtesy key 776 having a having a handle 778 and a key blade 780 extending therefore. Wireless key fob 760 includes a storage cavity 782 configured to receive key blade 780 and at least a portion of handle 778. Handle 778 includes a guide pin 784 and wireless key fob 760 includes a corresponding recess 785 for assisting an operator in aligning key 776 within storage cavity 782. Handle 778 also includes an acutely extending tab 786, which is configured to be received on top of corresponding release tab 788 of ovoid-shaped body 762 and battery cover 772. Therefore, when courtesy key 776 is stored in cavity 782, tab 786 is received on top of release tab 788 and release tab 788 cannot be actuated (e.g., pulled up) to release battery cover 772.

Turning now to FIGS. 68-74, a fuel door lock and unlock system 800 and its operation is illustrated. An operator may utilize buttons 550 of center console 534, a plurality of buttons (not shown) on fuel tank console 614, or buttons 770 of wireless key fob 760 to lock and unlock vehicular components, such as saddlebags 790 of saddlebag assembly 58 and fuel door 620. Generally, fuel door 620 will not lock if fuel door 620 is in the open position. Locking saddlebags 790 will lock fuel door 620. Alternatively, starting engine 12 will lock fuel door 620. If an operator actuates a fuel door unlock button, fuel door 620 will be unlocked. However, actuating the fuel door unlock button will not unlock fuel door 620 if engine 12 is running.

Unlock system 800 may display various warning screens or messages on digital display 548 of center console 534. For example, unlock system 800 may display a partial warning screen on digital display 548 if fuel door 620 is open, but engine 12 is not running. Partial warning screens include an oil change warning, a low tire pressure warning, or a low battery warning. This partial warning screen may be dismissible by an operator. Alternatively, unlock system 800 may display a full screen warning if fuel door 620 is open and engine 12 is running. If engine 12 or vehicle 2 is also operating at a low speed, center console 534 may emit a subtle audible warning in addition to the full screen warning. Conversely, if engine 12 or vehicle 2 is also operating at a high speed, center console 534 may emit a constant audible warning in addition to the full screen warning. In one embodiment, the low speed may be approximately 8 kilometers per hour ("km/h") and the high speed may be approximately 16 km/h.

Figure 68:
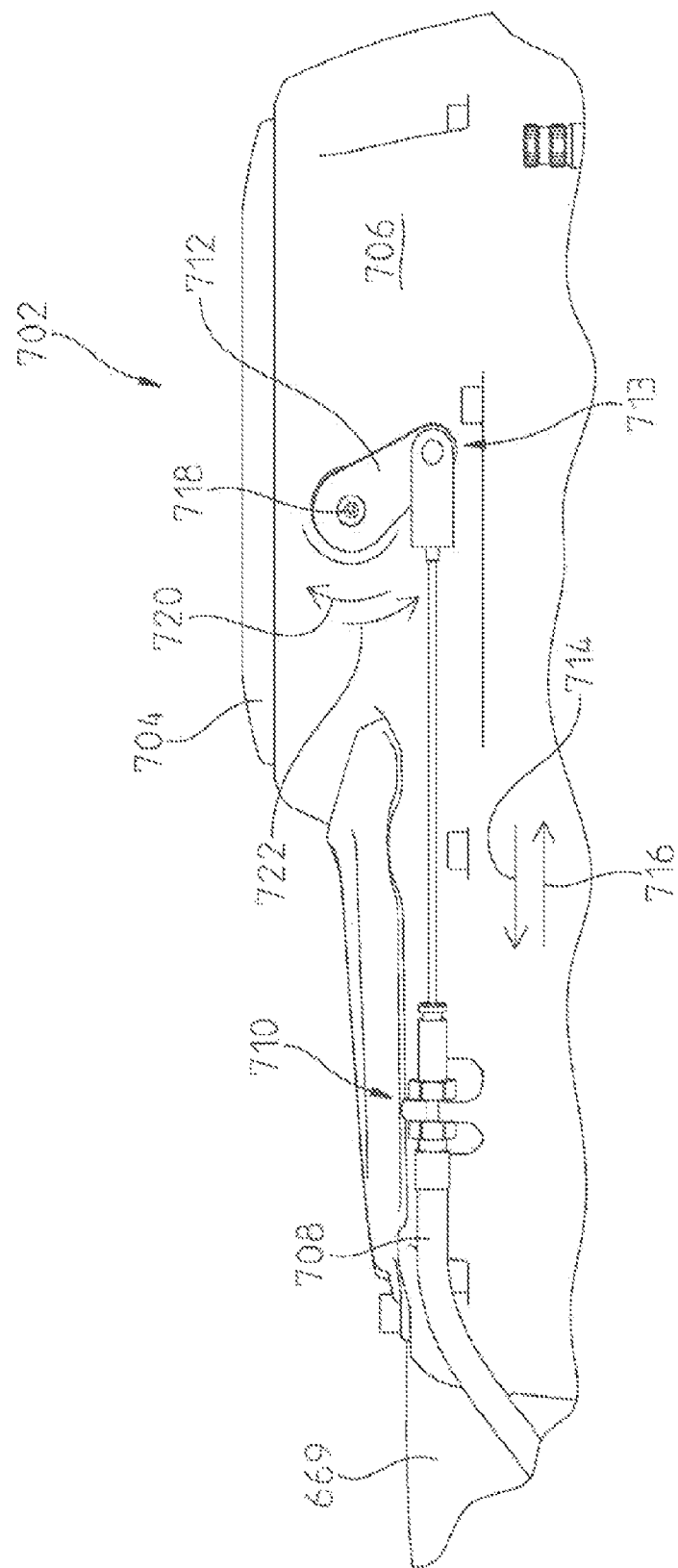
FIG. 68 is a schematic diagram of the locking and unlocking mechanism for the fuel door.
Figure 61:
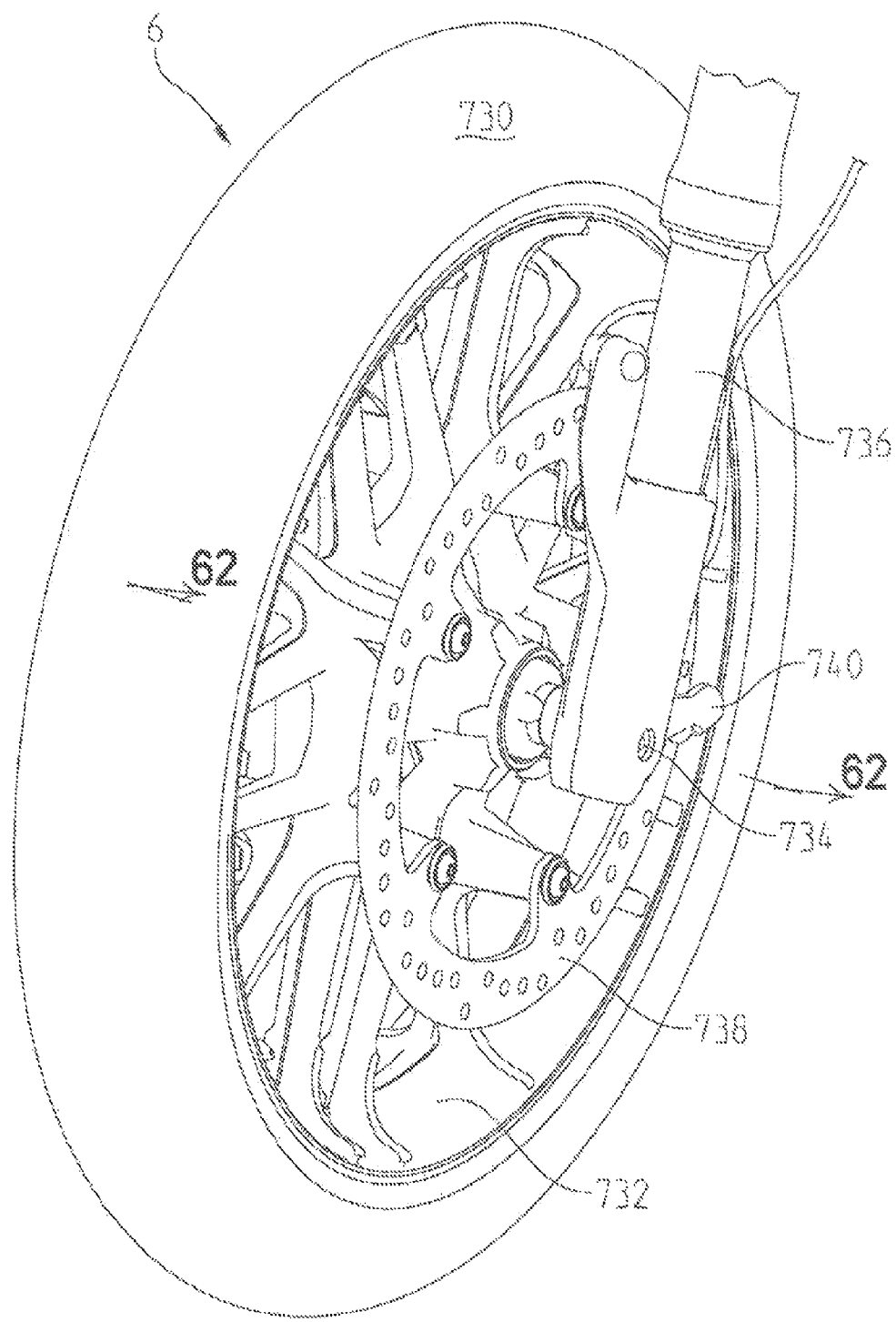
FIG. 61 is a left front perspective view of a front wheel of the two-wheel vehicle of FIG. 1 with a wheel speed sensor assembly operably coupled thereto.
Figure 62:
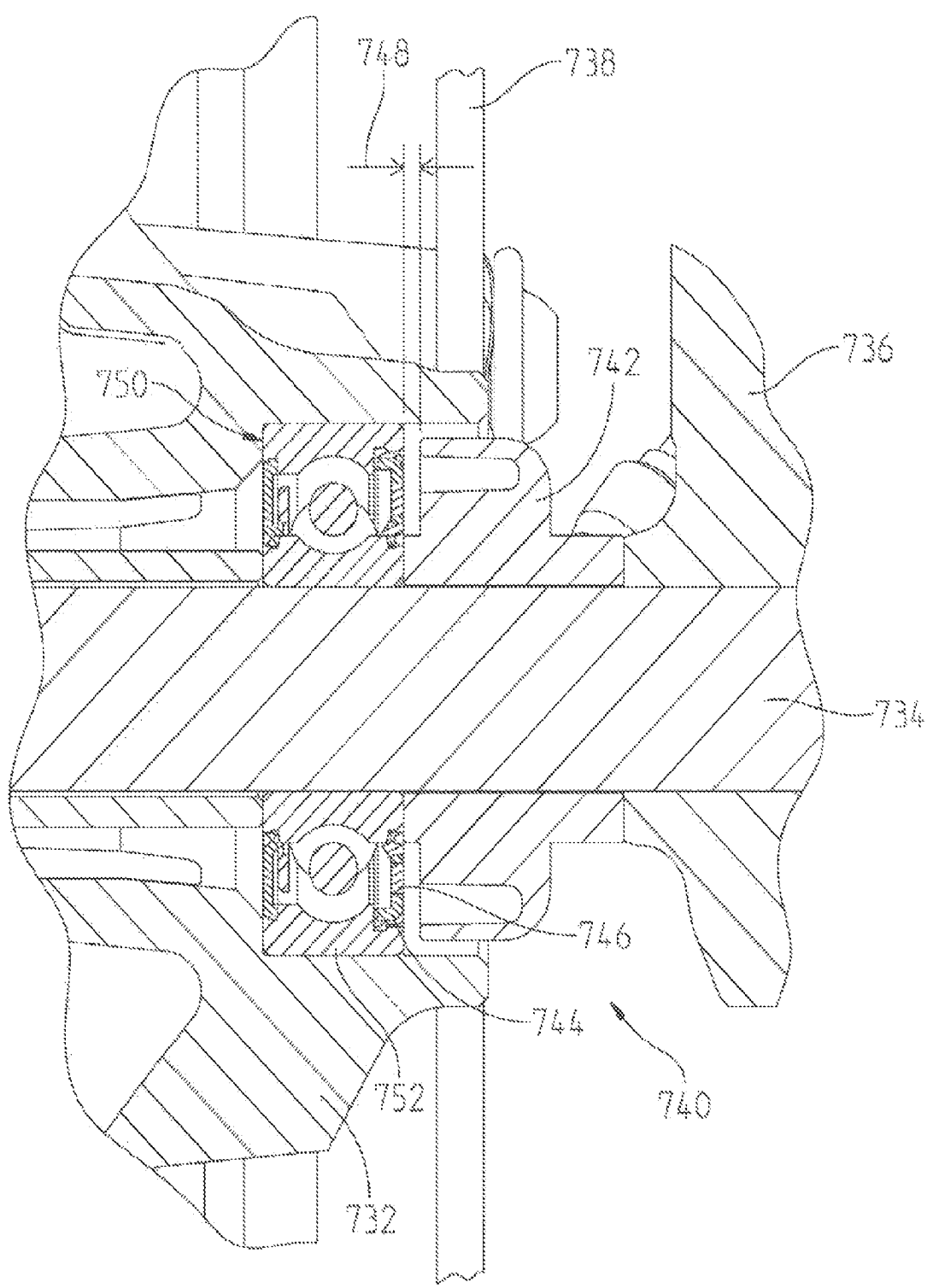
FIG. 62 is a cross-sectional view of the front wheel of FIG. 61, taken along lines 62-62 of the front wheel of FIG. 61.
Figure 63:
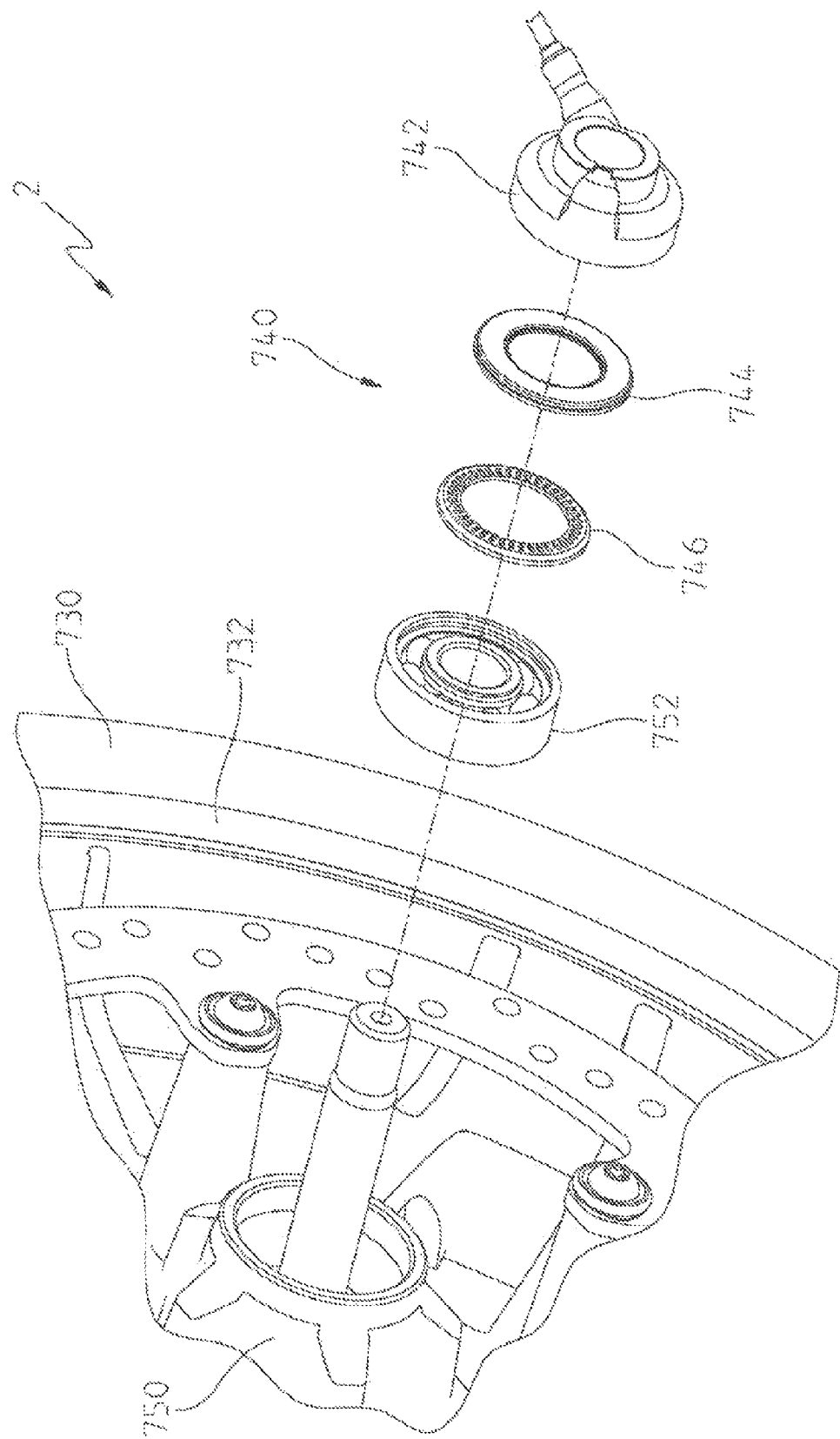
FIG. 63 is an exploded view of the wheel speed sensor assembly of FIG. 61.
Figure 64:
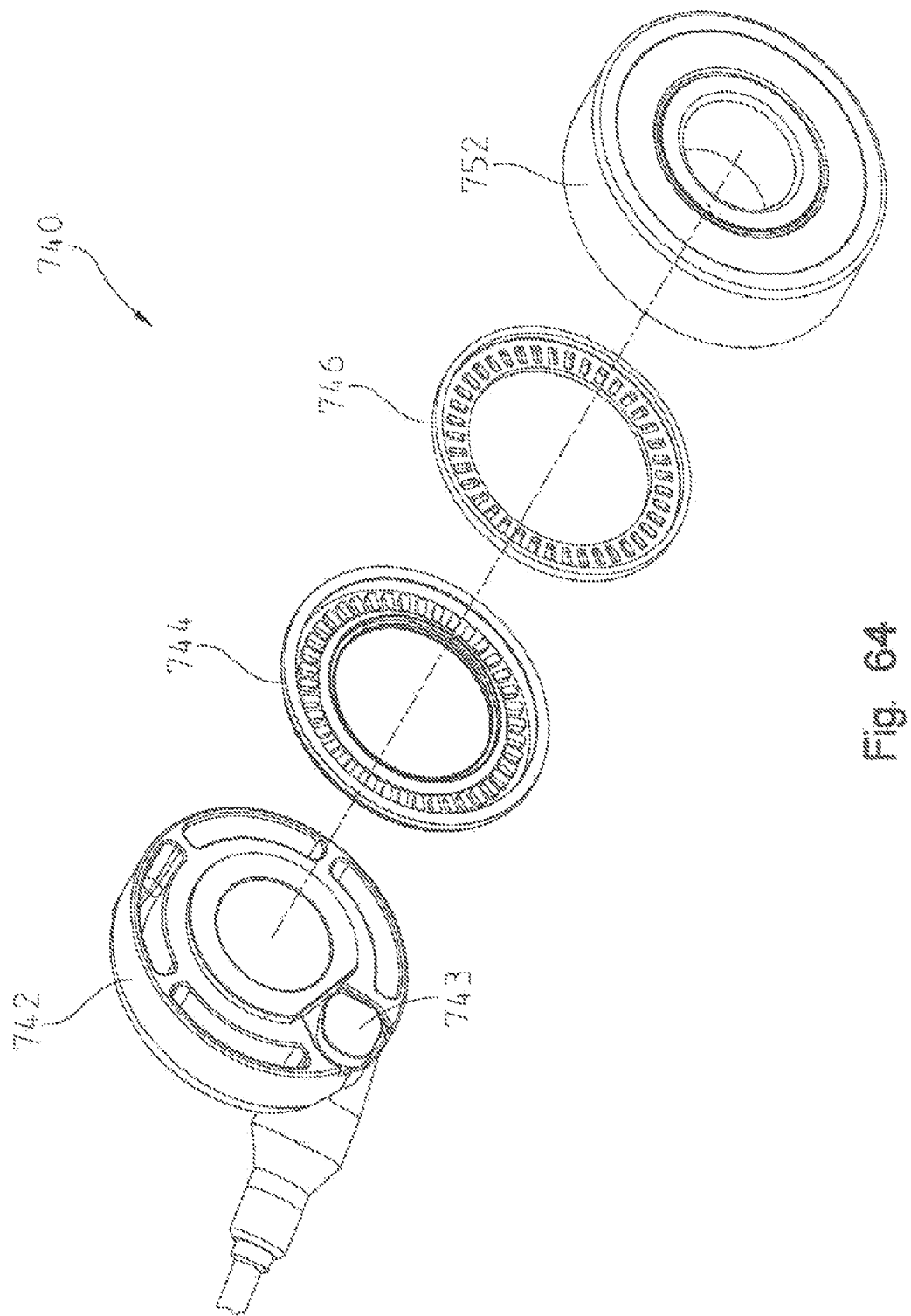
FIG. 64 is a further exploded view of the wheel speed sensor of FIG. 63.

Turning specifically to FIG. 68, unlock system 800 includes a vehicle control module ("VCM") 804, a wireless control module ("WCM") 806, an engine control module ("ECM") 808, an anti-lock brake system ("ABS") 809, microswitch 630, a digital display module 549 communicating with digital display 548, an integrated smart power supply module ("SPS") 810, a saddlebag unlock button 812, a fuel door unlock button 814, a saddlebag lock button 816, and audible tone generator 824. In the illustrative embodiment shown, microswitch 630 is communicatively coupled to VCM 804. As discussed herein, microswitch 630 provides an indication of whether fuel door 620 is in the open or closed position. Buttons 812, 814, 816 are individually coupled to wireless control module 806, which communicates with VCM 804 using a communication network or communication bus, illustratively controller area network ("CAN") 818. WCM 806 communicates information such as whether any of buttons 812, 814, 816 have been pushed across CAN 818. WCM 806 also communicates authentication and ignition status across CAN 818. ECM 808 communicates information such as engine speed to VCM 804 across CAN 820. ABS 809 communicates information such as vehicle speed to VCM 804 across CAN 821. Display module 549 communicates with VCM 804 using CAN 822. Display module 549 communicates information such as the operation status of engine 12 and whether fuel door 620 is open or closed. In turn, display module 549 communicates with SPS 810 using CAN 826. SPS 810 powers a horn or an audible tone generator 824; therefore, SPS 810 communicates speaker on and off information to SPS 810.

Figure 69:
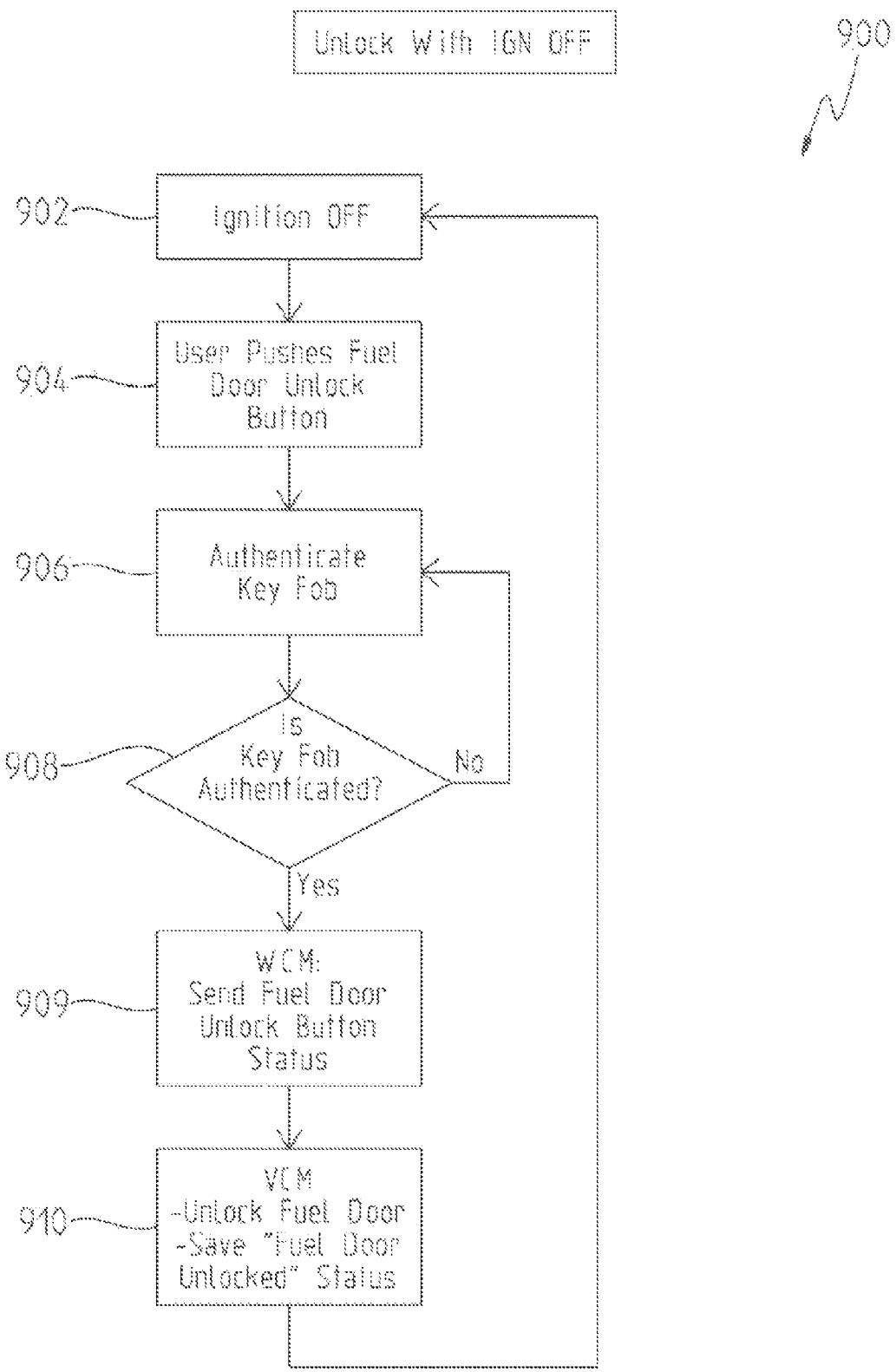
FIG. 69 is a schematic diagram of a first operational process for unlocking the fuel door when the ignition is off.

Referring specifically to FIG. 69, a first operational process 900 of unlock system 800 illustrates the process wherein an ignition of vehicle 2 off and an operator presses fuel door unlock button 814. First operational process 900 begins at block 902 where the ignition is turned off. At block 904, an operator actuates fuel door unlock button 814 to unlock fuel door 620. Fuel door unlock button 814 may be located on a wireless key fob or be dash mounted. At block 906, WCM 806 authenticates the operator's wireless key fob used by the operator. At block 908, WCM 806 determines whether the wireless key fob satisfies the authentication criterium. If not, first operational process 900 returns to block 906. If the wireless key fob satisfies the authentication criterium, first operational process 900 continues to block 909. At block 909, WCM 806 sends a fuel door unlock button status to VCM 804. At block 910, VCM 804 actuates motor 638 to unlock fuel door 620 and saves the current fuel door status (i.e., unlocked) in its memory. First operational process 900 then returns to block 902.

Figure 70A:
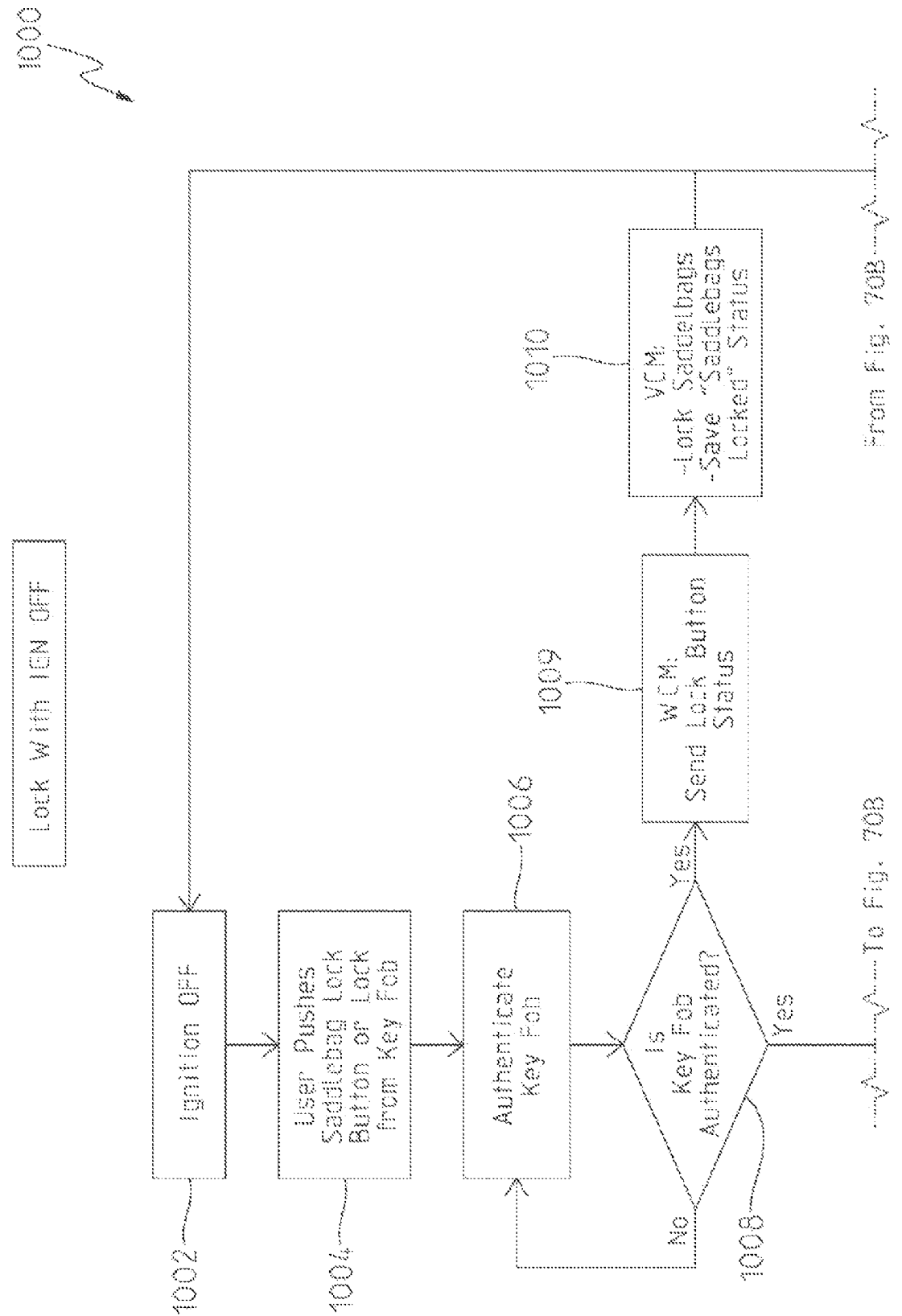
FIGS. 70A and 70B are a schematic diagram of a second operational process for unlocking the fuel door when the ignition is off
Figure 70B:
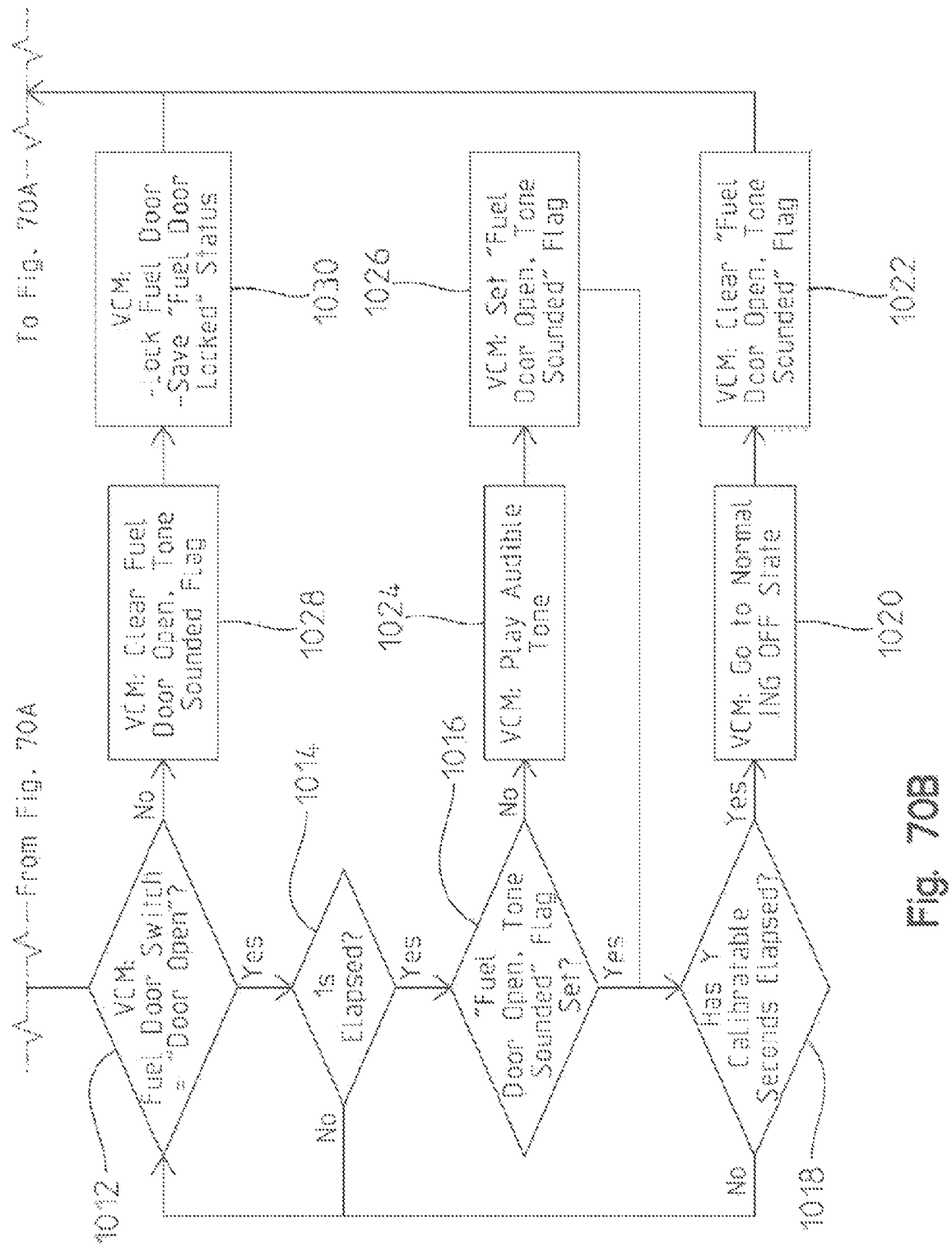

Referring specifically to FIGS. 70A and 70B, a second operational process 1000 of unlock system 800 illustrates the process wherein an ignition of vehicle 2 is off and an operator presses either saddlebag lock button 816 or unlock button 770₂ of wireless key fob 760. Second operational process 1000 begins at block 1002 where the ignition is turned off. At block 1004, an operator actuates either saddlebag lock button 816 or unlock button 770₂ of wireless key fob 760. At block 1006, WCM 806 authenticates the wireless key fob used by the operator. At block 1008, WCM 806 determines whether the wireless key fob satisfies the authentication criterium. If not, second operational process 1000 returns to block 1006. If yes, block 1008 simultaneously proceeds to blocks 1009, 1012. At block 1009, WCM 806 sends the lock button status to VCM 804. From block 1009, second operational process 1000 proceeds to block 1010. At block 1010, VCM 804 locks saddlebags 790 and saves the current saddlebag status (i.e., locked) in its memory. From block 1010, second operational process 1000 returns to block 1002.

At block 1012, VCM 804 determines whether fuel door 620 is open by polling microswitch 630. If VCM 804 determines that fuel door 620 is open, second operational process 1000 moves to block 1014. At block 1014, second operational process 1000 waits for a timer to expire, illustratively 1 second. Once the timer has elapsed, second operational process 1000 proceeds to block 1016 where VCM 804 determines if the "Fuel Door Open, Tone Sounded" flag is set. If this flag is set, second operational process 1000 proceeds to block 1018 where VCM 804 determines whether Y calibratable seconds have elapsed. If Y seconds have elapsed, second operational process 1000 proceeds to block 1020 where the VCM 804 goes to "Normal Ignition Off State." second operational process 1000 then proceeds to block 1022 where VCM 804 clears the "Fuel Door Open; Tone Sounded" flag. Second operational process 1000 then returns to block 1002.

At block 1012, if VCM 804 determines that fuel door 620 is not open, second operational process 1000 proceeds to block 1028 and VCM 804 clears the "Fuel Door Open; Tone Sounded" flag, if necessary. Second operational process 1000 then proceeds to block 1030 where VCM 804 locks fuel door 620 and saves the current fuel door status (i.e., unlocked) in its memory. Second operational process 1000 then returns to block 1002. At block 1014, if the timer has not elapsed, second operational process 1000 returns to blocks 1012. At block 1016, if the "Fuel Door Open; Tone Sounded" flag is not set, second operational process 1000 proceeds to block 1024 where the VCM 804 sounds a horn X times fast. Second operational process 1000 then proceeds to block 1026 where the VCM 804 sets the "Fuel Door Open, Tone Sounded" flag and proceeds to block 1018. At block 1018, if Y seconds has not yet elapsed, second operational process 1000 returns to blocks 1012.

Figure 71A:
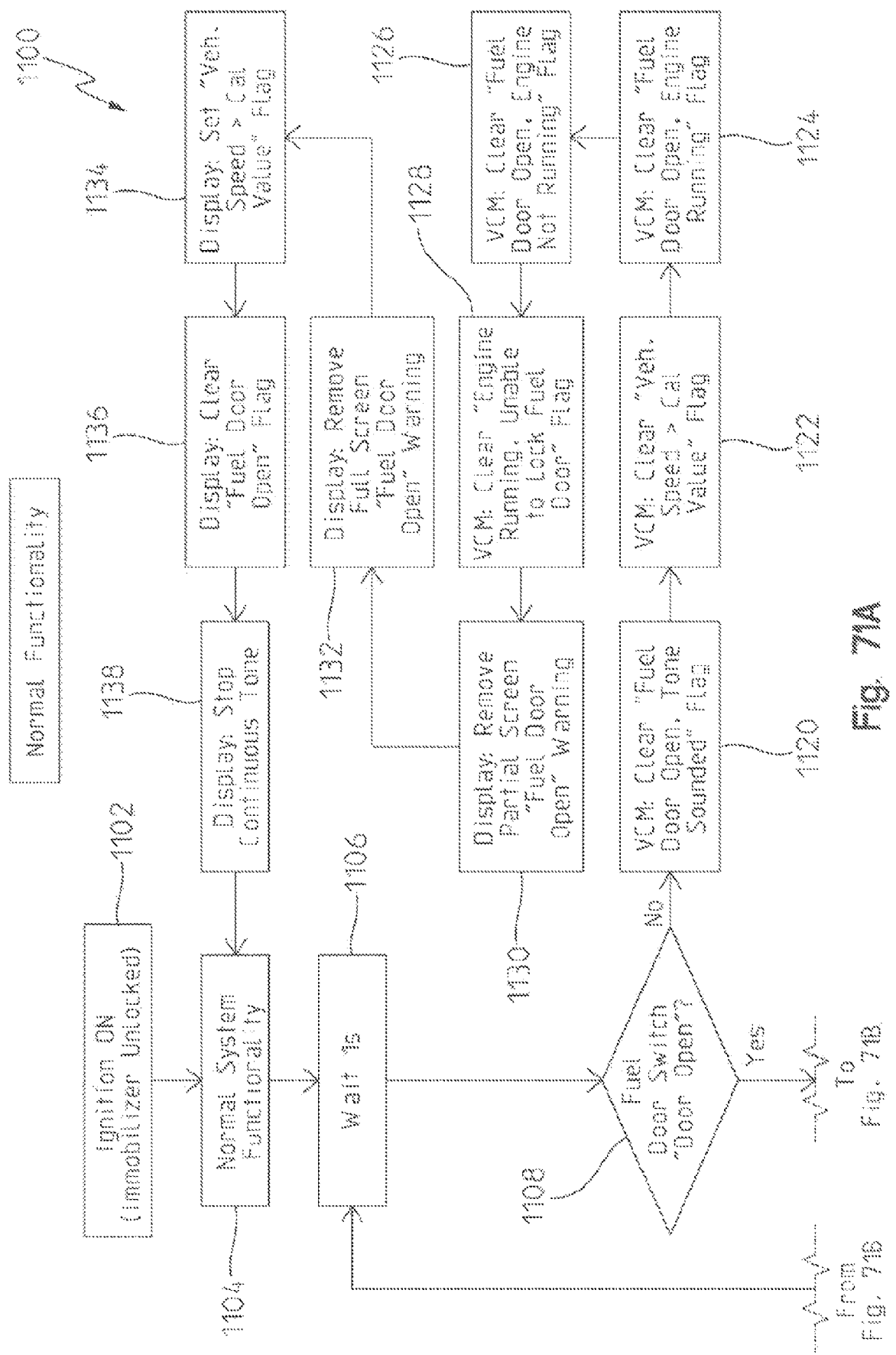
FIGS. 71A-71C are a schematic diagram of a third operational process for locking and unlocking the fuel door.
Figure 71B:
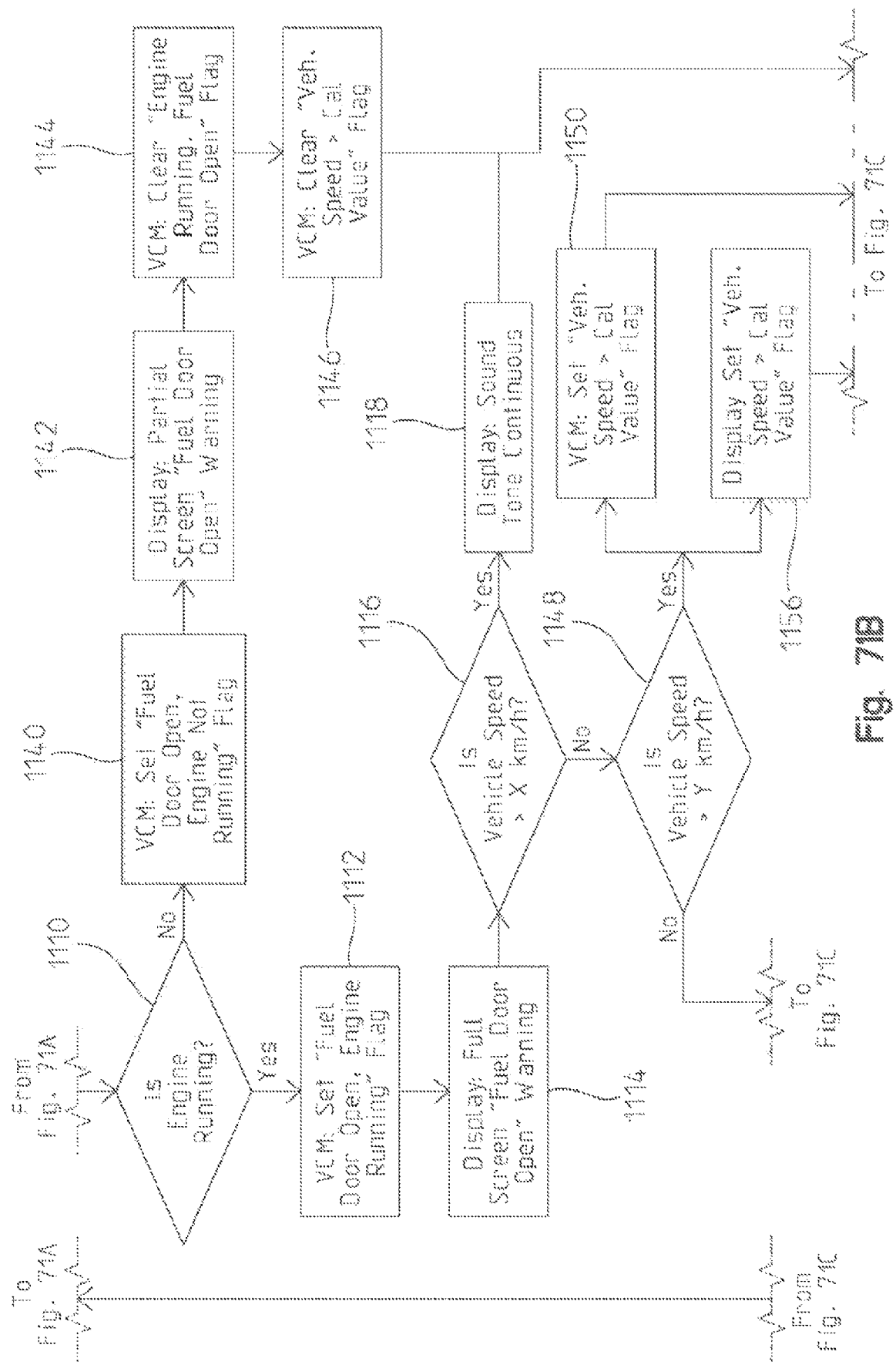
Figure 71C:
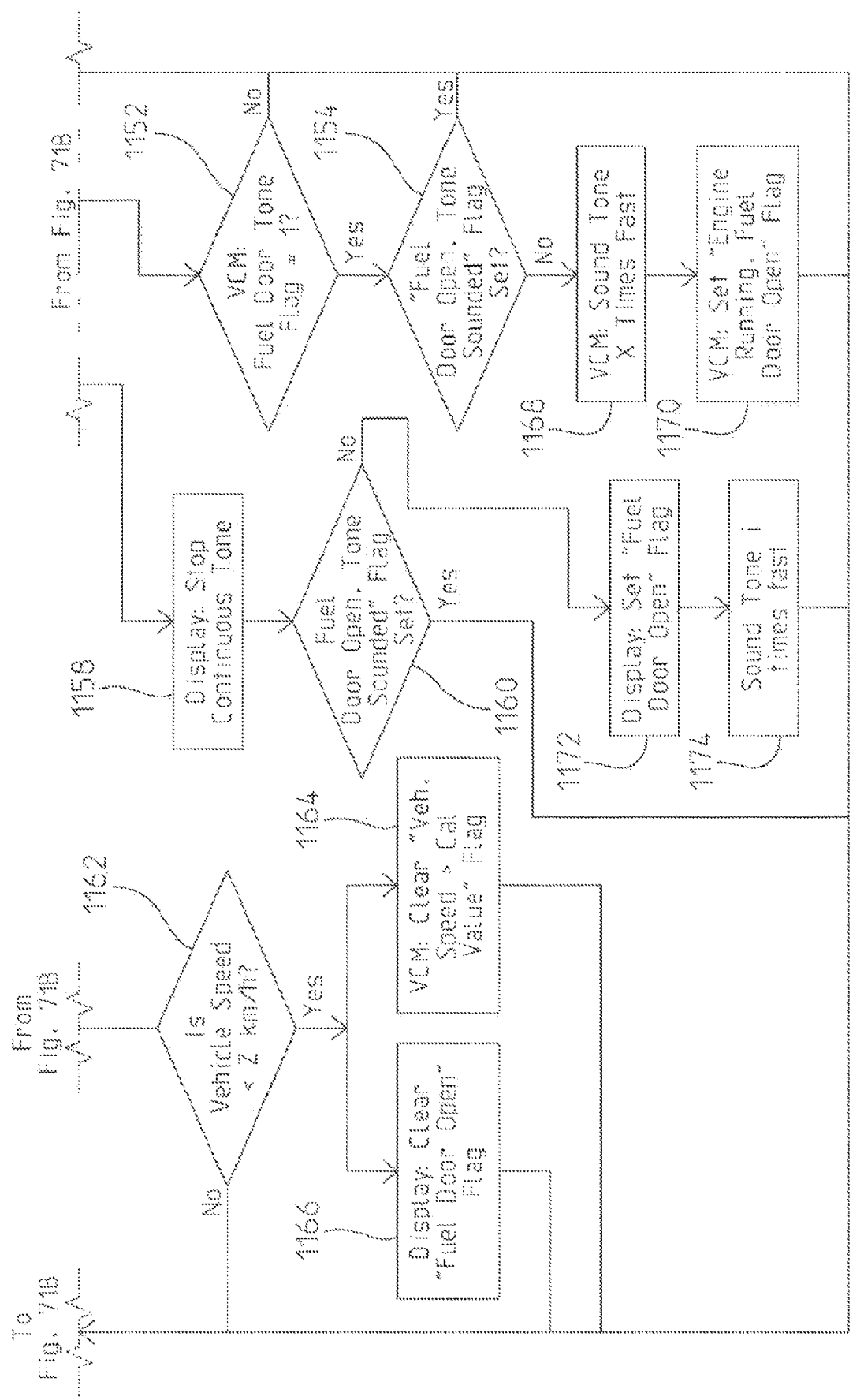

Turning specifically to FIGS. 71A-71C, a third operational process 1100 of unlock system 800 illustrates the normal operation of vehicle 2. Third operational process 1100 begins at block 1102 where an ignition of vehicle 2 is on. At block 1104, unlock system 800 is operation at normal system functionality. At block 1106, third operational process 1100 waits for a timer to expire, illustratively 1 s. At block 1108, VCM 804 determines if fuel door 620 is open by polling microswitch 630. If fuel door 620 is open, third operational process 1100 proceeds to block 1110, where VCM 804 communicates with ECM 808 to determine if engine 12 is running. If engine 12 is running, VCM 804 sets the "Fuel Door Open, Engine Running" flag at block 1112. At block 1114, digital display 548 displays the "Fuel Door Open" full screen warning. At block 1116, VCM 804 communicates with ECM 808 to determine if the vehicle speed is greater than a set value X If the vehicle speed is greater than X, digital display 548 sounds a continuous, audible tone or alert via audible tone generator 824 at block 1118. Third operational process 1100 then returns to block 1106.

If at block 1108, VCM 804 determines that fuel door 620 is not open, third operational process 1100 proceeds to block 1120. At block 1120, VCM 804 clears the "Fuel Door Open, Tone Sounded" flag. At block 1122, VCM 804 clears the "Vehicle Speed>Calibration Value" flag. At block 1124, VCM 804 sets the state to "Fuel Door Open, Engine Running." At block 1126, VCM 804 sets the state to "Fuel Door Open, Engine Note Running." At block 1128, VCM 804 sets the state to "Engine Running, Unable to Lock Fuel Door." At block 1130, digital display 548 removes the "Fuel Door Open" partial screen warning, if necessary. At block 1132, digital display 548 removes the "Fuel Door Open" full screen warning, if necessary. At block 1134, display module 549 sets the "Vehicle Speed>Calibration Value" flag. At block 1136, display module 549 clears the "Fuel Door Open" flag, if necessary. At block 1138, display module 549 stops, if necessary, the continuous tone or alert, and third operational process 1100 returns to block 1104.

If at block 1110, VCM 804 determines that engine 12 is not running, third operational process 1100 proceeds to block 1140. At block 1140, VCM 804 sets "Fuel Door Open, Engine Not Running" flag. At block 1142, digital display 548 displays a "Fuel Door Open" partial screen warning. At block 1144, VCM 804 clears the "Engine Running, Fuel Door Open" flag. At block 1146, VCM 804 clears the "Vehicle Speed>Calibration Value" flag, and third operational process 1100 returns to block 1106.

If at block 1116, VCM 804 determines the vehicle speed is not greater than X, VCM 804 determines whether the vehicle speed is greater than a set value Y at block 1148. If the vehicle speed is greater than Y, third operational process 1100 proceeds simultaneously to blocks 1150, 1156. At block 1150, VCM 804 sets the "Vehicle Speed>Calibration Value" flag. At block 1152, VCM 804 determines if the "Fuel Door Tone Flag" flag equals 1. If this flag equal 1, VCM 804 determines whether the "Fuel Door Open, Tone Sounded" flag is set at block 1154. If this flag is set, third operational process 1100 returns to block 1106. At block 1156, display module 549 sets the "Vehicle Speed>Calibration Value" flag. At block 1158, display module 549 stops, if necessary, the continuous tone or alert. At block 1160, VCM 804 determines if the "Fuel Door Open, Tone Sounded" flag is set. If this flag is set, third operational process 1100 returns to block 1106.

If at block 1148, VCM 804 determines that the vehicle speed is less than Y, VCM 804 determines whether the vehicle speed is less than a set value Z at block 1162. If the vehicle speed is greater than Z, third operational process 1100 simultaneously proceeds to blocks 1164, 1166. At block 1164, VCM 804 clears the "Vehicle Speed>Calibration Value" flag, and third operational process 1100 returns to block 1106. At block 1166, display module 549 clears the "Fuel Door Open" flag, and third operational process 1100 returns to block 1106. If at block 1162, VCM 804 determines that the vehicle speed is less than Z, third operational process 1100 returns to block 1106.

If at block 1154, VCM 804 determines that the "Fuel Door Open, Tone Sounded" flag is not set, VCM 804 sounds horn X times fast at block 1168. At block 1170, VCM 804 sets the "Engine Running, Fuel Door Open" flag, and third operational process 1100 returns to block 1106.

If at block 1160, display module 549 determines that the "Fuel Door Open, Tone Sounded" flag is not yet, display module 549 sets the "Fuel Door Open" flag at block 1172. At block 1174, digital display 548 sounds tone i times fast.

Figure 72:
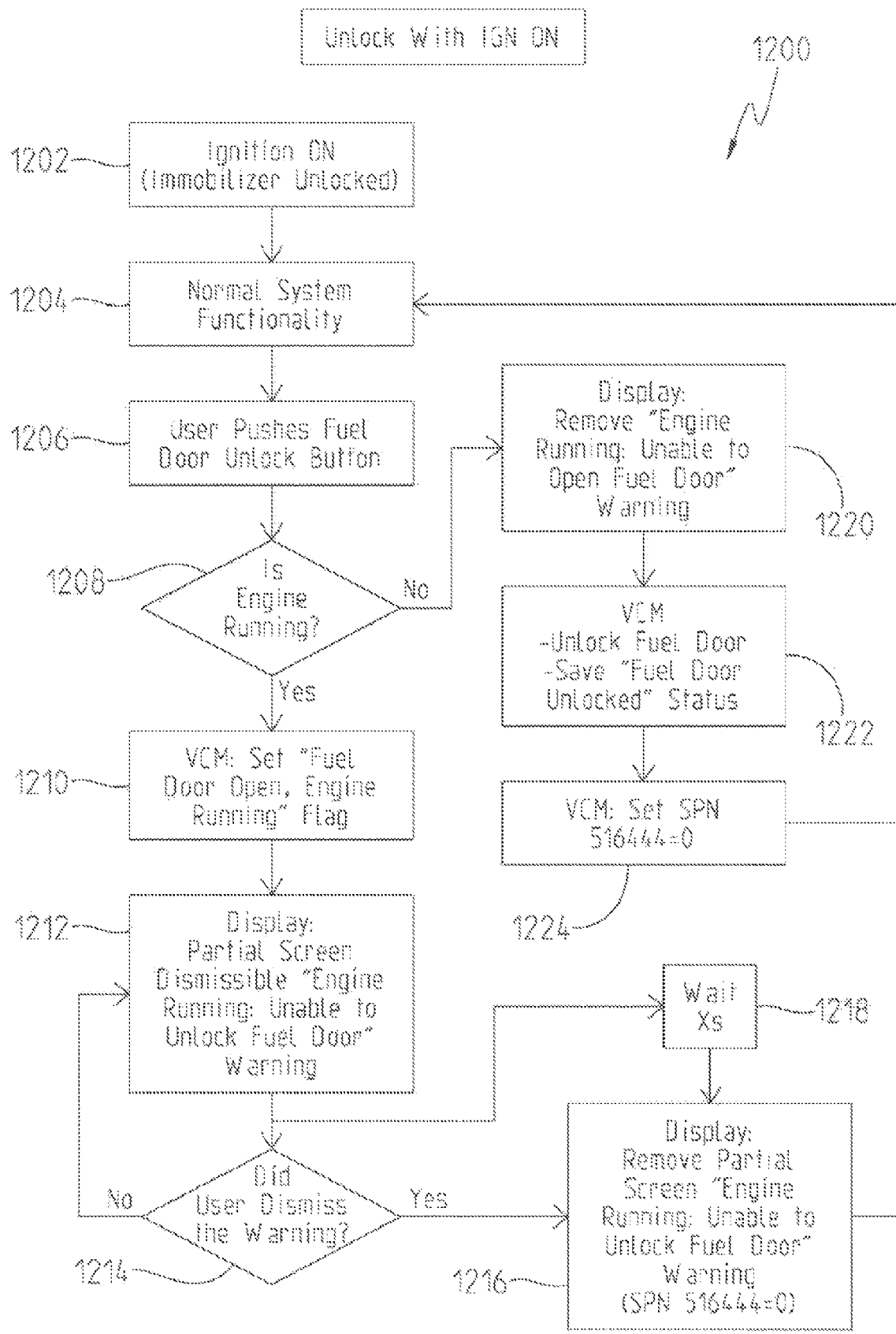

Referring now to FIG. 72, fourth operational process 1200 illustrates the process when an ignition of vehicle 2 is on, unlock system 800 is operating at normal system functionality, and an operator presses fuel door unlock button 814. Fourth operational process 1200 begins at block 1202 where the ignition of vehicle 2 is on. At block 1204, unlock system 800 is operation at normal system functionality. At block 1206, an operator actuates fuel door unlock button 814 to unlock fuel door 620. At block 1208, VCM 804 communicates with ECM 808 to determine if engine 12 is running. If VCM 804 determines engine 12 is running, VCM 804 sets the "Fuel Door Open, Engine Running" flag at block 1210.

At block 1212, digital display 548 displays a dismissible "Engine Running: Unable to Unlock Fuel Door" partial screen warning. At block 1214, display module 549 determines whether the operator dismissed this partial screen warning. If the operator dismissed the warning, display module 549 removes the "Engine Running: Unable to Unlock Fuel Door" partial screen warning, and fourth operational process 1200 returns to block 1204. If at block 1214, display module 549 determines that the operator did not dismiss the warning, fourth operational process 1200 returns to block 1212 and continues to display the warning. Fourth operational process 1200 cycles between blocks 1212, 1214 waiting for the operator to dismiss the warning. If after X seconds, the operator has not dismissed the warning, display module 549 determines that X seconds has passed at block 1218, and fourth operational process 1200 proceeds to block 1216.

If at block 1208, VCM 804 determines that engine 12 is not running, digital display 548 removes, if necessary, the "Engine Running: Unable to Open Fuel Door" partial screen warning at block 1220. At block 1222, VCM 804 unlocks fuel door 620 and saves the current fuel door status (i.e., unlocked) in its memory. At block 1224, VCM 804 clears the "Fuel Door Open, Engine Running" flag, and fourth operational process 1200 returns to block 1204.

Figure 73A:
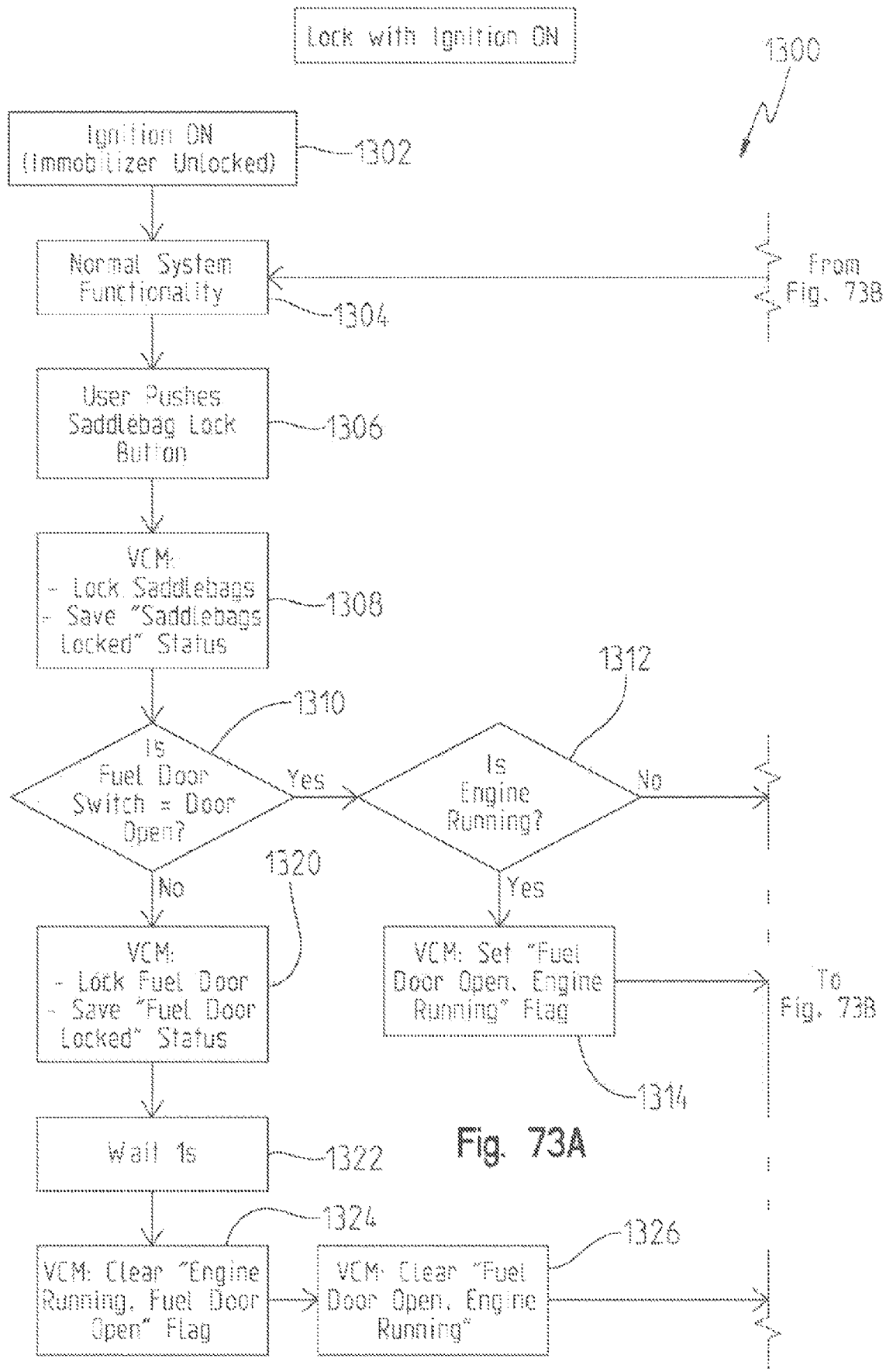
Figure 73C:
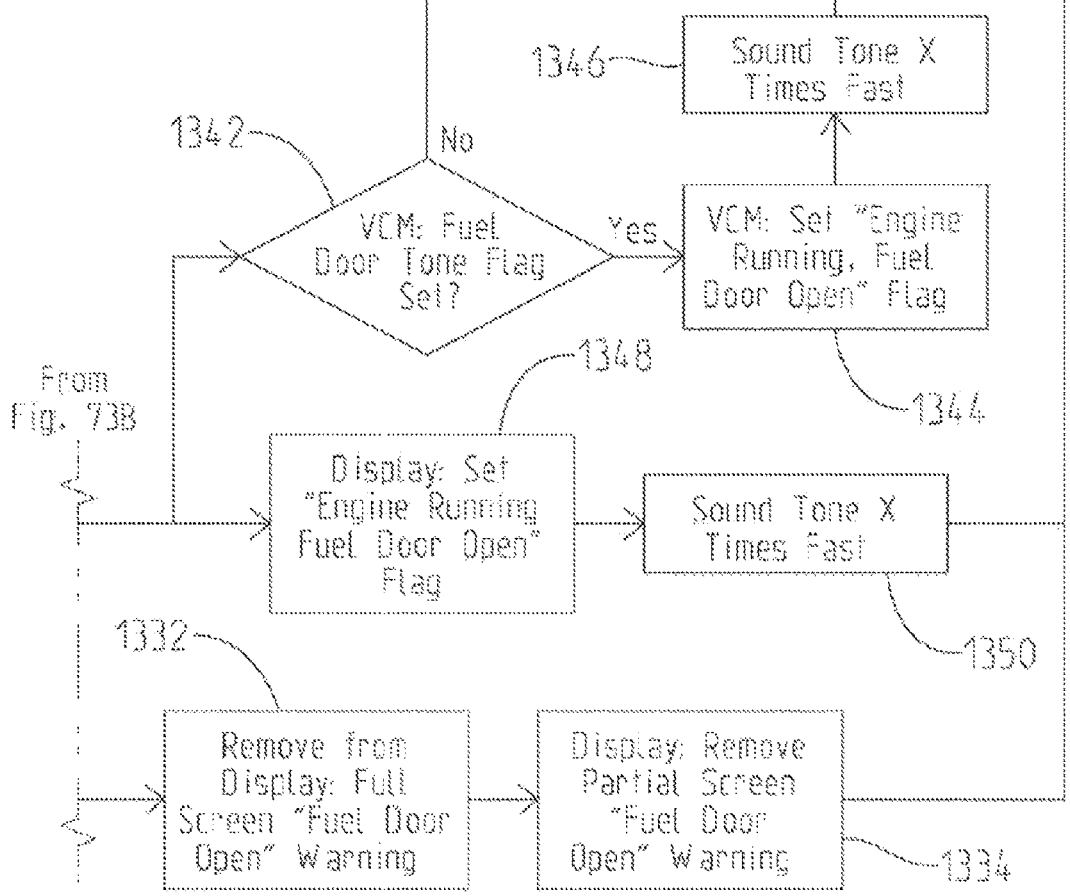

Turning now to FIGS. 73A-73C, a fifth operational process 1300 illustrates the process when an ignition of vehicle 2 is on, unlock system 800 is operating at normal system functionality, and an operator actuates saddlebag lock button 816. Fifth operational process 1300 begins at block 1302 where the ignition of vehicle 2 is on. At block 1304, unlock system 800 is operating at normal system functionality. At block 1306, an operator actuates saddlebag lock button 816 to lock saddlebags 790. At block 1308, VCM 804 locks vertical frames 490 and saves the current saddlebag status (i.e., locked) in its memory. At block 1310, VCM 804 polls microswitch 630 to determine whether fuel door 620 is open. If VCM 804 determines that fuel door 620 is open, VCM 804 communicates with ECM 808 to determine if engine 12 is running at block 1312. If VCM 804 determines that engine 12 is running, VCM 804 sets the "Fuel Door Open, Engine Running" flag at block 1314. At block 1316, digital display 548 displays a "Fuel Door Open" full screen warning. At block 1318, digital display module 549 determines if the "Engine Running, Fuel Door Open" flag is set. If this flag is set, fifth operational process 1300 returns to block 1304.

If at block 1310, VCM 804 determines that fuel door 620 is not open, VCM 804 locks fuel door 620 and saves the current fuel door status (i.e., locked) in its memory at block 1320. At step 1322, VCM 804 waits until a set time has expired, illustratively 1 second. At block 1324, VCM 804 clears the "Engine Running, Fuel Door Open" flag. At blocks 1326, 1328, VCM 804 clears the "Fuel Door Open, Engine Running" and the "Fuel Door Open, Engine Not Running" flags. At block 1330, digital display module 549 clears the "Engine Running, Fuel Door Open" flag. At block 1332, digital display 548 removes, if necessary, the "Fuel Door Open" full screen warning. At block 1334, digital display 548 removes, if necessary, the "Fuel Door Open" partial screen warning, and fifth operational process 1300 returns block 1304.

If at block 1312, VCM 804 determines that engine 12 is not running, VCM 804 sets the "Fuel Door Open, Engine Not Running" flag at block 1336. At block 1338, digital display 548 displays a "Fuel Door Open" partial screen warning, and fifth operational process 1300 returns to block 1304.

If at block 1318, digital display module 549 determines that the "Engine Running, Fuel Door Open" flag is set, digital display module 549 determines if a set period of time has expired, illustratively 1 second, at block 1340. If the set period of time has expired, VCM 804 simultaneously proceeds to blocks 1342, 1348. At block 1342, VCM 804 determines if the "Fuel Door Tone" flag is equal to 1. If this flag is equal to 1, VCM 804 sets the "Engine Running, Fuel Door Open" flag at block 1344, and VCM 804 sounds a horn X times fast at block 1346. Fifth operational process 1300 then returns to block 1304. At block 1348, digital display module 549 sets the "Engine Running, Fuel Door Open" flag, and digital display 548 sounds a tone or alert X times fast at block 1350. Fifth operational process 1300 then returns to block 1304.

If at block 1340, the set period of time had not expired, fifth operational process 1300 returns to block 1316. If at block 1342, VCM 804 determines that the "Fuel Door Tone" flag is not equal to 1, fifth operational process 1300 returns to block 1304.

Figure 74A:
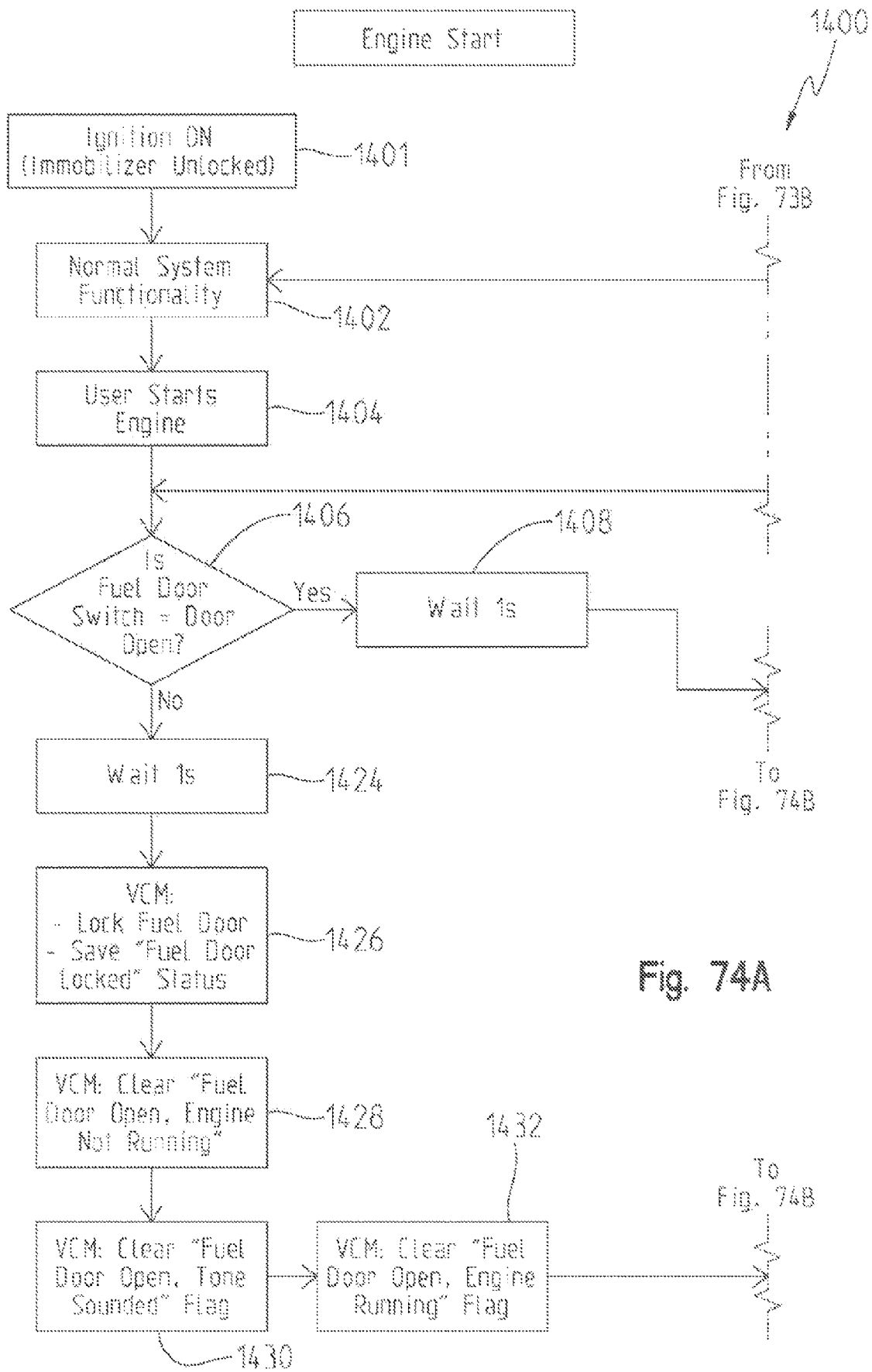
Figure 74C:
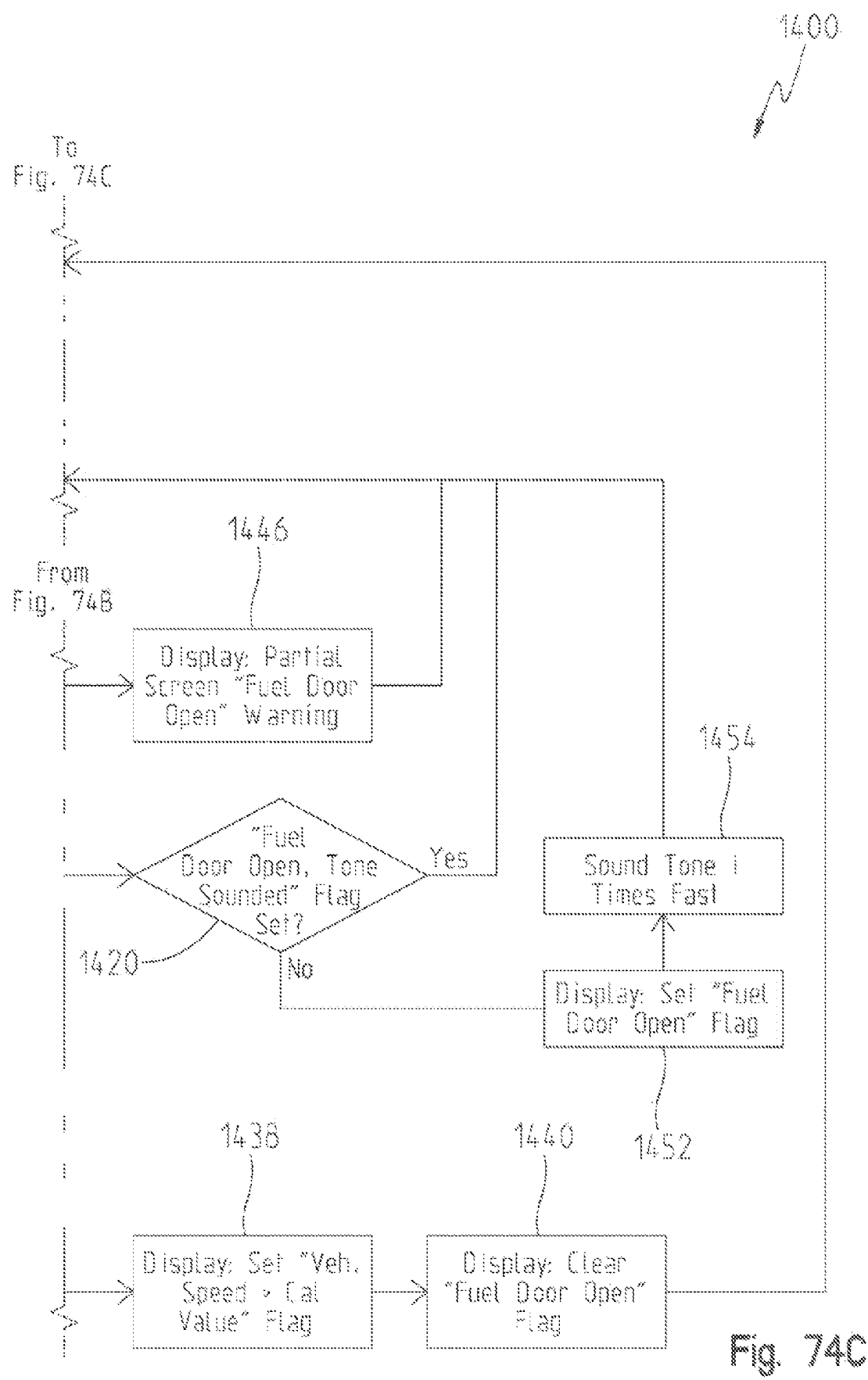

Referring specifically to FIGS. 74A-74C, a sixth operational process 1400 illustrates the process when an ignition of vehicle 2 is on, unlock system 800 is operating at normal system functionality, and an operator starts engine 12. Sixth operational process 1400 begins at block 1401 where the ignition of vehicle 2 is on. At block 1402, unlock system 800 is operating at normal system functionality. At block 1404, an operator starts engine 12. At block 1406, VCM 804 polls microswitch 630 to determine if fuel door 620 is open. If VCM 804 determines that fuel door 620 is open, VCM 804 waits for period of time to expire, illustratively 1 second, at block 1408. At block 1410, VCM 804 communicates with ECM 808 to determine if engine 12 is running. If VCM 804 determines that engine 12 is running, VCM 804 sets the "Fuel Door Open, Engine Running" flag at block 1412. At block 1414, digital display 548 displays a "Fuel Door Open" full screen warning, and sixth operational process 1400 proceeds to block 1420. At block 1420, digital display module 549 determines if the "Fuel Door Open, Tone Sounded" flag is set. If the flag is set, sixth operational process 1400 returns to block 1406.

If at block 1406, VCM 804 determines that fuel door 620 is not open, VCM 804 waits for a set period of time to expire, illustratively 1 second, at block 1424. At block 1426, VCM 804 locks fuel door 620 and saves the current fuel door status (i.e., locked) in its memory. At block 1428, VCM 804 clears the "Fuel Door Open, Engine Not Running" flag. At block 1430, VCM 804 clears a "Fuel Door Open, Tone Sounded" flag. At block 1432, VCM 804 clears an "Engine Running, Fuel Door Open" flag. At block 1434, digital display 548 removes, if necessary, the "Fuel Door Open" full screen warning. At block 1436, digital display 548 removes, if necessary, the "Fuel Door Open" partial screen warning. At block 1438, digital display module 549 sets the "Vehicle Speed>Calibration Value" flag. At block 1440, digital display module 549 clears the "Fuel Door Open" flag, and sixth operational process 1400 returns to block 1402.

If at block 1410, VCM 804 determines that engine 12 is not running, VCM 804 sets the "Fuel Door Open, Engine Not Running" flag at block 1442. At block 1446, digital display 548 displays a "Fuel Door Open" partial screen warning, and sixth operational process 1400 returns to block 1406.

If at block 1420, digital display module 549 determines that the "Fuel Door Open, Tone Sounded" flag is not set, digital display module 549 will set the "Fuel Door Open" flag at block 1452. At block 1454, digital display 548 will sound a tone or alert i times fast, and sixth operational process 1400 will return to block 1402.

While this invention has been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising:
A frame assembly extending longitudinally from a front end to a second end, the frame assembly including a forward frame member, a fairing support mount, and a down tube assembly, wherein the down tube assembly is coupled to the forward frame member, wherein the down tube assembly includes a first down tube member and a second down tube member, each of the first and second down tube members having an upper shoulder;
a plurality of ground-engaging members supporting the frame assembly on a ground surface;
a fairing coupled to the forward frame member and the down tube assembly; and
a pair of brackets, each bracket removably coupled to the down tube assembly and the fairing support mount, where each bracket is coupled to the upper shoulder of one of the first down tube member and the second down tube member.

2. The two-wheeled vehicle of claim 1, further comprising a steering assembly, and the forward frame member includes a head tube configured to receive a portion of the steering assembly, and the bracket extends from a position longitudinally forward of the head tube to a position longitudinally rearward of the head tube.

3. The two-wheeled vehicle of claim 1, wherein the fairing comprising an outer fairing member and an inner fairing member, and the bracket is coupled to the inner fairing member.

4. The two-wheeled vehicle of claim 3, wherein the bracket includes a generally vertical leg coupled to the down tube assembly and a generally horizontal leg coupled to the inner fairing member.

5. The two-wheeled vehicle of claim 4, wherein the down tube assembly supports a radiator.

* * * * *